United States Patent
Conway

(12) 
(10) Patent No.: US 6,272,672 B1
(45) Date of Patent: *Aug. 7, 2001

(54) DATAFLOW PROCESSING WITH EVENTS

(76) Inventor: Melvin E. Conway, 8 Brook Head Ave., Beverly, MA (US) 01915

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/524,170

(22) Filed: Sep. 6, 1995

(51) Int. Cl.$^7$ ........................................ G06F 9/44
(52) U.S. Cl. ................................................ 717/1
(58) Field of Search ................................ 395/701, 702, 395/703, 704, 705, 706, 707, 708, 709, 710, 712; 345/326, 333–335; 717/1

(56) References Cited

U.S. PATENT DOCUMENTS

| | | | |
|---|---|---|---|
| 4,901,221 | | 2/1990 | Kodosky et al. . |
| 4,914,568 | | 4/1990 | Kodosky et al. . |
| 5,535,322 | * | 7/1996 | Hecht ........................... 717/1 |
| 5,537,630 | * | 7/1996 | Berry et al. .................. 345/326 |
| 5,546,519 | * | 8/1996 | Berry ............................ 345/326 |
| 5,553,002 | * | 9/1996 | Dangelo et al. .............. 364/489 |
| 5,598,524 | * | 1/1997 | Johnston, Jr. et al. ....... 395/348 |
| 5,642,511 | * | 6/1997 | Chow et al. .................. 395/701 |
| 5,736,984 | * | 4/1998 | Jellinek et al. ............... 345/338 |
| 5,790,857 | * | 8/1998 | Clifford et al. ............... 395/703 |
| 5,822,521 | * | 10/1998 | Gartner et al. ............... 709/230 |
| 5,826,239 | * | 10/1998 | Du et al. ...................... 705/8 |
| 5,870,605 | * | 2/1999 | Bracho et al. ................ 709/302 |
| 5,920,725 | * | 7/1999 | Ma et al. ...................... 395/712 |
| 5,924,101 | * | 7/1999 | Bach et al. ................... 707/103 |
| 5,937,388 | * | 8/1999 | Davis et al. .................. 705/8 |
| 6,009,405 | * | 12/1999 | Leymann et al. ............ 705/9 |
| 6,014,673 | * | 1/2000 | Davis et al. .................. 707/202 |
| 6,032,124 | * | 2/2000 | Saito et al. ................... 705/9 |

OTHER PUBLICATIONS

"Business Process Management with FlowMark", F. Leymann et al. Software Dev. Lab., IBM Germany Dev. Inc. Compcom Spring 94, Mar. 1994.*
"WWWorkflow: World Wide Web based Workfow", C.K. Ames et al. IEEE pp. 397–404, 1997.*
"Object Models for Business Transaction Processing Systems", Francis Anderson, Feb. 2000.*
OOPSLA '97 Business Object Workshop, Business Object Design and Implementation III,"www.acm.org/pubs/", Oct. 1997.*
ACM Digital Library, Communications of the ACM vol. 38, Issue 10 (1995) The Promise and the cost of object technology: a five–year forecast, 1995.*

(List continued on next page.)

Primary Examiner—Tariq R. Hafiz
Assistant Examiner—Todd Ingberg
(74) Attorney, Agent, or Firm—Fish & Richardson P.C.

(57) ABSTRACT

Interactive event-driven programs are structured and executed using two types of constructs: interconnectable processing components and flow objects with associated data. Components are interconnected in a hierarchical dataflow network, and references which provide access to flow objects flow on the interconnections. Response to events and bidirectional coordination over multicomponent data paths, even in a distributed object system, employ unidirectional dataflows and intercomponent message sequences mediated by flow objects. Scaling and abstraction of complexity are facilitated by encapsulation of constructed networks into new component definitions. An interactive debugger preserves state as an executing program is edited, permitting an event-driven program to be modified in the intervals between processing of events without reinitialization. A component protection method employs multiple Levels of usage authorization within components, enabling developers to define and distribute new protected components in a decentralized component market.

151 Claims, 77 Drawing Sheets

OTHER PUBLICATIONS

"Is Workflow "Fascist" Software?", R. T. Marshak. Workgroup Computing Report vol. 19. No. 7, Unknown.*

ACM Annual Computer Science Conference, A workplan for business process reengineering and a challenge for information science and technology, Mar. 2, 1995.*

Policy Resolution for a workflow management system, C. Butler et al. IEEE Proceedings of the 28th Annual Hawaii Int'l Conf. on System Sciences, 1995.*

Simulation Modeling within workflow Technology, J. A. Miller et. al. ACM Digital Library Winter Simulation Conference, Dec. 1995.*

Workflow Handbook 1997, P. Lawrence, Nov. 1996.*

A Framework for Dynamic Changes in Workflow Management Systems, M. Reichert et al., Sep. 1997.*

The Dependency Manager: a base service for transactional workflow management, R. Gunmor IBM, Germany Feb. 1996.*

"Type On Call User's Guide", Adobe Systems Incorporated, Mountain View, CA, pp. 5–13, 1996.

Borning, "ThingLab—A Constraint–Oriented Simulation Laboratory", Xerox, Palo Alto Research Center, SSL–79–3, Jul. 1979.

"Serius Programmer Users Guide" (Introduction and Tutorial only), Serius Corporation, Salt Lake City, UT, 1992.

"Getting Started" document accompanying "IBM VisualAge for Java", Chapters 3, 4, and 5 of Tutorial, Second Edition, IBM Canada Ltd. Laboratory, Aug. 1998, 46pp.

Ingalls et al., "Fabrik, A Visual Programming Environment", OOPSLA '88 Proceedings, Sep. 25–30, 1988, pp. 176–190.

Frank Ludolph et al., "The Fabrik Programming Environment", 1988 IEEE.

Brad J. Cox, Ph.D., "Planning the Software Industrial Revolution The Impact of Object–Oriented Technologies", IEEE Software Magazine, Nov. 1990.

Borning, et al., "Constraint Hierarchies and Their Applications," IEEE COMPCON Spring '91, pp. 388–393, Mar. 1, 1991.*

Freeman–Benson, et al., "The Design and Implementation of Kaleidoscope '90, A Constraint Imperative Programming Language," IEEE Proc. of the '92 Int. Conf. on Comp. Langs., pp. 174–180, Apr. 23, 1992.*

Designing Object–Oriented User Interfaces Dave Collins, Jan. 1995.*

Microsoft Visual C++ Reference Library I, Class Library Reference for Micrsoft Foundation Class Library version 1.0, 1993.*

Object–Oriented Information Systems Planning and Implementation David Taylor, Apr. 1992.*

* cited by examiner

Dependent Set of Z

| Component | Sink |
|---|---|
| Text Entry 1 | Sink 1 |

FIG. 10

Dependent Set of Y

| Component | Sink |
|---|---|
| Text Entry 1 | Sink 1 |

FIG. 11

Menu of Letters Used in Definiendum Names form

- E editable
- I instance
- L library
- X executable object

- C component
- G program
- K sink
- M composite (component)
- P primitive (component)
- R source
- S subcomponent
- W wire class

- T type
- U output modifier

- N inside
- O outside
- F reference structure

- A array description

- D description
- V value

FIG. 50

| No | Subcomponent |
|---|---|
| 1 | SubdirectoriesFilter |
| 2 | SubfilesFilter |
| 3 | TextSource (lower left) |
| 4 | Register (left) |
| 5 | Register (right) |
| 6 | PickAtRun |
| 7 | IndexedCollector |
| 8 | ListBox (left) |
| 9 | ListBox (right) |
| 10 | TextSource (top) |
| 11 | IndirectSelector (left) |
| 12 | IndirectSelector (right) |
| 13 | ResizableWindow |
| 14 | WourceConnector |

FIG. 53

| No | Internal Component | Sources |
|---|---|---|
| 1 | SubdirectoriesFilter | 1 |
| 2 | SubfilesFilter | 1 |
| 3 | TextSource (lower left) | 1 |
| 4 | Register (left) | 2 |
| 5 | Register (right) | 2 |
| 6 | PickAtRun | 0 |
| 7 | IndexedCollector | 1 |
| 8 | ListBox (left) | 1 |
| 9 | ListBox (right) | 1 |
| 10 | TextSource (top) | 1 |
| 11 | IndirectSelector (left) | 2 |
| 12 | IndirectSelector (right) | 2 |
| 13 | ResizableWindow | 2 |
| 14 | SourceConnector | N/A |

FIG. 55

| No | <CTF>, i.e., <type name> | <VA> | <LUD> |
|---|---|---|---|
| 1 | SubdirectoriesFilter | | ((1)) |
| 2 | SubfilesFilter | | ((2)) |
| 3 | TextSource (lower left) | "c:" | ((3)) |
| 4 | Register (left) | | ((4), (5,6)) |
| 5 | Register (right) | | ((7),(8)) |
| 6 | PickAtRun | | () |
| 7 | IndexedCollector | | ((9)) |
| 8 | ListBox (left) | | ((10)) |
| 9 | ListBox (right) | | ((11)) |
| 10 | TextSource (top) | "File navigator" | ((12)) |
| 11 | IndirectSelector (left) | | ((13),(14)) |
| 12 | IndirectSelector (right) | | ((15),(16)) |
| 13 | ResizableWindow | | ((17),()) |
| 14 | SourceConnector | | 1 |

FIG. 56

| No | Terminal Component | Sink no |
|---|---|---|
| 1 | 11 | 1 |
| 2 | 12 | 1 |
| 3 | 4 | 2 |
| 4 | 8 | 2 |
| 5 | 2 | 1 |
| 6 | 1 | 1 |
| 7 | 9 | 2 |
| 8 | 14 | 1 |
| 9 | 13 | 3 |
| 10 | 7 | 1 |
| 11 | 7 | 2 |
| 12 | 13 | 1 |
| 13 | 8 | 1 |
| 14 | 4 | 1 |
| 15 | 9 | 1 |
| 16 | 5 | 1 |
| 17 | 6 | 1 |

FIG. 57

| No | <CTF>, i.e., <type name> | <VA> | <LUD> |
|---|---|---|---|
| 1 | ResizableWindow | | ((2),) |
| 2 | PickAtRun | | () |
| 3 | TextSource | "Contents" | ((1)) |
| 4 | FileDialog | | ((3)) |
| 5 | FielContentsFilter | | ((4)) |
| 6 | GenericPort | | ((5)) |

FIG. 60

| No | Terminal component | Sink no |
|---|---|---|
| 1 | 1 | 1 |
| 2 | 2 | 1 |
| 3 | 5 | 1 |
| 4 | 6 | 1 |
| 5 | 1 | 3 |

FIG. 61

|  | Argument of P() | <XGA> |
|---|---|---|
| 1 | anon | 1:anon |
| 2 | ResizableWindow | 1:anon,2:Resiz |
| 3 | PickAtRun | 1:anon,2:Resiz,3:Pick |
| 4 | TextSource | 1:anon,2:Resiz,3:Pick,4:Text |
| 5 | FileDialog | 1:anon,2:Resiz,3:Pick,4:Text,5:File |
| 6 | SubdirectoriesFilter | 1:anon,2:Resiz,3:Pick,4:Text,5:File,6:Subdir |
| 7 | SubfilesFilter | 1:anon,2:Resiz,3:Pick,4:Text,5:File,6:Subdir,7:Subfile |
| 8 | TextSource | (unchanged) |
| 9 | Register | 1:anon,2:Resiz,3:Pick,4:Text,5:File,6:Subdir,7:Subfile,8:Reg |
| 10 | Register | (unchanged) |
| 11 | PickAtRun | (unchanged) |
| 12 | IndexedCollector | 1:anon,2:Resiz,3:Pick,4:Text,5:File,6:Subdir,7:Subfile,8:Reg,9:IndCol |
| 13 | ListBox | 1:anon,2:Resiz,3:Pick,4:Text,5:File,6:Subdir,7:Subfile,8:Reg,9:IndCol,10:List |
| 14 | ListBox | (unchanged) |
| 15 | TextSource | (unchanged) |
| 16 | IndirectSelector | 1:anon,2:Resiz,3:Pick,4:Text,5:File,6:Subdir,7:Subfile,8:Reg,9:IndCol,10:List,11:IndirSel |
| 17 | IndirectSelector | (unchanged) |
| 18 | ResizableWindow | (unchanged) |
| 19 | SourceConnector | 1:anon,2:Resiz,3:Pick,4:Text,5:File,6:Subdir,7:Subfile,8:Reg,9:IndCol,10:List,11:IndirSel,12:SourceConn |
| 20 | FileContentsFilter | 1:anon,2:Resiz,3:Pick,4:Text,5:File,6:Subdir,7:Subfile,8:Reg,9:IndCol,10:List,11:IndirSel,12:SourceConn,13:FileConFil |
| 21 | GenericPort | 1:anon,2:Resiz,3:Pick,4:Text,5:File,6:Subdir,7:Subfile,8:Reg,9:IndCol,10:List,11:IndirSel,12:SourceConn,13:FileConFil,14:GenPort |

FIG. 63

| No | Element |
|---|---|
| 1 | top-level anonymous type |
| 2 | ResizableWindow |
| 3 | PickAtRun |
| 4 | TextSource |
| 5 | FileDialog |
| 6 | SubdirectoriesFilter |
| 7 | SubfilesFilter |
| 8 | Register |
| 9 | IndexedCollector |
| 10 | ListBox |
| 11 | IndirectSelector |
| 12 | SourceConnector |
| 13 | FileContentsFilter |
| 14 | GenericPort |

FIG. 64

| No | Element |
|---|---|
| 1 | top-level anonymous type |
| 2 | ResizableWindow |
| 3 | PickAtRun |
| 4 | TextSource |
| 5 | FileDialog |
| 6 | SubdirectoriesFilter |
| 7 | SubfilesFilter |
| 8 | Register |
| 9 | IndexedCollector |
| 10 | ListBox |
| 11 | IndirectSelector |
| 12 | SourceConnector |
| 13 | FileContentsFilter |
| 14 | GenericPort |

FIG. 69

| I(t,s) | <IGA> |
|---|---|
| I(1,nil) | 1:anon |
| I(2,1) | 1:anon,2:Resiz |
| I(3,1) | 1:anon,2:Resiz,3:Pick |
| I(4,1) | 1:anon,2:Resiz,3:Pick,4:Text |
| I(5,1) | 1:anon,2:Resiz,3:Pick,4:Text,5:FileDialog |
| I(6,5) | 1:anon,2:Resiz,3:Pick,4:Text,5:FileDialog,6:Subdir |
| I(7,5) | 1:anon,2:Resiz,3:Pick,4:Text,5:FileDialog,6:Subdir,7:Subfiles |
| I(4,5) | 1:anon,2:Resiz,3:Pick,4:Text,5:FileDialog,6:Subdir,7:Subfiles,8:Text |
| I(8,5) | 1:anon,2:Resiz,3:Pick,4:Text,5:FileDialog,6:Subdir,7:Subfiles,8:Text,9:Register |
| I(8,5) | 1:anon,2:Resiz,3:Pick,4:Text,5:FileDialog,6:Subdir,7:Subfiles,8:Text,9:Register,10:Register |
| I(3,5) | 1:anon,2:Resiz,3:Pick,4:Text,5:FileDialog,6:Subdir,7:Subfiles,8:Text,9:Register,10:Register,11:Pick |
| I(9,5) | 1:anon,2:Resiz,3:Pick,4:Text,5:FileDialog,6:Subdir,7:Subfiles,8:Text,9:Register,10:Register,11:Pick,12:IndxColl |
| I(10,5) | 1:anon,2:Resiz,3:Pick,4:Text,5:FileDialog,6:Subdir,7:Subfiles,8:Text,9:Register,10:Register,11:Pick,12:IndxColl, 13:ListBox |
| I(10,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox |
| I(4,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text |
| I(11,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel |
| I(11,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel,17:IndirSel |
| I(2,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel,17:IndirSel,18:Resiz |
| I(12,5) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel,17:IndirSel18:Resiz,19:SourceConn |
| I(3,1) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel,17:IndirSel18:Resiz,19:SourceConn,20:FileContFilt |
| I(14,1) | 1:anon,2:Resiz,3:Pick,4:Text,5:FileDialog,6:Subdir,7:Subfiles,8:Text,9:Register,10:Register,11:Pick,12:IndxColl, 13:ListBox,14:ListBox,15:Text,16:IndirSel,17:IndirSel18:Resiz,19:SourceConn,20:FileContFilt,21:GenericPort |

FIG. 70

| No | Super | Type | Subcomponents or Primitive (p) |
|---|---|---|---|
| 1 | nil | anonymous | 2,3,4,5,20,21 |
| 2 | 1 | ResizableWindow | p |
| 3 | 1 | PickAtRun | p |
| 4 | 1 | TextSource | p |
| 5 | 1 | FileDialog | 6,7,8,9,10,11,12,13,14,15,16,17,18,19 |
| 6 | 5 | SubdirectoriesFilter | p |
| 7 | 5 | SubfilesFilter | p |
| 8 | 5 | TextSource | p |
| 9 | 5 | Register | p |
| 10 | 5 | Register | p |
| 11 | 5 | PickAtRun | p |
| 12 | 5 | IndexedCollector | p |
| 13 | 5 | ListBox | p |
| 14 | 5 | ListBox | p |
| 15 | 5 | TextSource | p |
| 16 | 5 | IndirectSelector | p |
| 17 | 5 | IndirectSelector | p |
| 18 | 5 | ResizableWindow | p |
| 19 | 5 | SourceConnector | p |
| 20 | 1 | FileContentsFilter | p |
| 21 | 1 | GenericPort | p |

FIG. 71

(anonymous) XCTD permissions, version

XGF
<XGA> memory reference

CTF
(empty),1

LCTOD
LKTDA
(empty)

LRTDA
(empty)

LMTND
LSFA
```
      <CTF>            <VA>   <LUD>  <ESD>
1: (ResizableWindow,2)        ((2),()) (272,24)
2: (PickAtRun,3)                ()   (373,35)
3: (TextSource,4)   "Contents" ((1))  156,3)
4: (FileDialog,5)               ((3))  (4,52)
5: (FileContentsFilter,13)      ((4))  (109,52)
6: (GenericPort,14)             ((5))  (184,42)
```

LWDA
```
   x<LSFA>  x<LKTDA> <EWD>
1:    1        1      ()
2:    2        1      ()
3:    5        1      ()
4:    6        1      ()
5:    1        3      ()
```

ETD
<type graphic>
<graphic region>
    (type help>

FIG. 79

| Aspect | Prerequisite | Remarks |
|---|---|---|
| Advertisement or Application Note. Any number per component type | None | Does not require assembly tool; might accompany component |
| Application License (AL) License to execute but not distribute packaged form of component type. | None | An end-use license which exists only for packaged applications. User does not require assembly tool. |
| Help License (HL) A license to view/run the help facility associated with the component type and with each outside connector. | None | As a practical matter, producer might wish to grant access to everyone in posession of component type. |
| Running License (RL) License to instantiate and run components of this type as subcomponents within the assembly tool. | If composite, RL for all subcomponents | Permits use of component types containing this type as a subcomponent, without conferring the right directly to manipulate it in the workspace. Required for encapsulation of a wiring diagram containing references to this type. |
| Wiring License (WL) is addition to the rights of RL, a license to copy a reference to the component type from the library into the tool's wiring workspace any number of times, and to wire these references. | If composite, RL for all subcomponents | Permits the user to create wiring diagrams incorporating references to this component type. |
| Opening License (OL) A license to view the inside of the component type within the assembly tool. | WL | Each immediate subcomponent type reference is shown but is openable only if its type's OL is present. Opened type's wiring diagram is not modifiable without DL |
| Packaging License (PL) A license to package a freestanding application containing any number of references to this component type. | RL If composite, PL for all subcomponents | Permits application developers to proliferate and distribute component type in freestanding form. |
| Export License (EL) A license to export composite types containing this type as a subcomponent. | RL If composite, EL for all subcomponents. | Permits component producers to proliferate and distribute component type as a subcomponent of a component type description in interchange form. |
| Derivation License (DL) In addition to the rights of OL, a license to modify the inside of a component type and to encapsulate the resulting wiring | WL, OL, PL, EL | DL grantee becomes producer of a new type. |

FIG. 113

DATAFLOW PROCESSING WITH EVENTS

BACKGROUND OF THE INVENTION

The invention relates to programs with graphical user interfaces.

Graphical user interfaces typically employ graphical displays for output to the user and one or more devices for input from the user, possibly including a keyboard and a pointing device like a "mouse" with one or more buttons for signalling the application program. The term "display-out event-in" is used here to describe such user interfaces. The emphasis of the present discussion is on reducing the complexity with which the designers and builders of these systems must deal.

The display-out event-in user interface was largely pioneered at Xerox Palo Alto Research Center (PARC). Many of the ideas developed at PARC were embodied in the Smalltalk and Alto systems developed there. The PARC group used the term "modeless user interface" to mean, among other ideas, that the interpretation of input events depends on the position of the mouse pointer with respect to the possibly several figures being displayed, and also on the relative positions of these several figures with respect to each other. Thus, in more recent systems descended from Smalltalk and Alto, particularly in the Apple Macintosh and the Microsoft Windows operating systems, characters typed on the keyboard are interpreted as input to the "window" figure which is the "top" of several possibly "overlapping" windows, and a mouse-button depression is interpreted as being "directed to" the visible figure, such as a "button," which is "under" (i.e., whose graphical region encloses the position of) the mouse pointer. We assume that this context-dependent character of event interpretation is present in the display-out event-in user interfaces being discussed here.

Implementation of a data processing system employing a display-out event-in user interface is complex and difficult, being centered about a low-level "event loop" which is continually sampling the input devices for input events. Once an event is detected, a possibly quite complex decision sequence is undertaken to discover the display figure with respect to which this input event is to be interpreted. Once this display figure is isolated, some form of signal is sent to an entity, usually a software object or function, associated with this display figure. This entity then interprets the event in the context of the application program in whose service all this machinery exists.

The design of a "user-interface management system" (UIMS) consists, in part, of deciding what desirably maximum set of functions (such as the event-identification function described above) can be isolated from the application program and packaged as a general set of services available to all application programs, thus reducing the total complexity of multiple application programs which use the UIMS. Even with such UIMSs, the construction of application programs with display-out event-in user interfaces remains complex and difficult.

Many designers have employed two common strategies for simplifying the structure and construction of application programs. The first strategy is based on the observation that the sequential aspects of programming contribute substantially to the difficulty of the task. This first strategy consists of finding a way to divide the structure of the program into a sequential part and a static part in such a way that the builder of the application program needs to pay minimal attention to the sequential part. The second strategy consists of finding a way to partition the remaining sequential part so its subparts are typically simple and have minimal interaction with each other.

The first simplification strategy is facilitated by dividing the universe of applications into similarity-groups, such that all the members of each similarity-group share a common design for the sequential part. Then a "sequence engine" common to all members of the similarity-group can be built and used by all application program builders as the implementation of the common sequential part. The task of a builder of an application from one of these similarity-groups is ideally reduced to a static parameterization of the sequence engine; the builder can largely ignore the internal details of the sequence engine.

An historically important application of the first simplification strategy has been with respect to the similarity-group of report-generation programs based on sequential files. The strategy was employed in the design of the wiring panels of nonstored-program punched-card tabulating machines such as the IBM 407 (whose underlying sequential "card cycle" is largely implicit in the wiring panel) and then subsequently to the successors of the IBM 407, including the RPG programming system for the IBM 1401 computer and a long line of report-generator program successors to RPG. All of these instances of the first simplification strategy insulated the application program builder from the sequential details of the underlying record-processing cycle and focused on the static formats of data in files and reports, with the choice of alternative report formats based on data values.

Applications with display-out event-in user interfaces form a similarity-group in the sense described above, because they have in common the underlying event-loop processing cycle. Attempts to exploit the first simplification strategy with respect to the similarity-group of display-out event-in programs (and thus to make construction of application programs from this group a simpler, more static process) have had some success.

The earliest well developed application of the first simplification strategy to display-out event-in systems is the Model-View-Controller (MVC) design paradigm developed at PARC as part of the Smalltalk programming system. In the MVC paradigm the application is divided into three parts: the View part expresses display appearance, the Controller part expresses event-identification behavior, and the Model part expresses everything else, namely the "internal" (i.e., non-user-interface) application logic, which communicates with the user via the View and Controller parts. All three parts are built using the Smalltalk language. Importantly, the application program developer can largely limit his/her attention to the Model part, since the View and Controller parts are incorporated into the Smalltalk system. (The sequence engine is hidden in the Controller part.)

Microsoft Visual Basic (VB) is a representative and widely-used contemporary example of both simplification strategies. In VB the structure of an application program is organized into two major portions, which we can call Forms and Procedures. Forms express the visual aspects of the user interface and contain collections of "controls," which are specific visual features with specific behaviors, for example, buttons. (It is an additional benefit of major practical importance, although that benefit is not immediately relevant to the present discussion, that the specification of Forms in VB is entirely pictorial.)

VB is an application of the second simplification strategy in that Procedures consist of many (typically) small modules of code and, furthermore, that these modules are grouped by, and logically associated with, the controls appearing in the Forms. Each code module is dedicated to the handling of one event which "originates" from its associated control. Thus the design of VB assigns each code module uniquely to a point in the space of ordered pairs (control, event). This partitioning is an effective application of the second simplification strategy because there is typically little interaction between these ordered pairs.

In the current art as widely practiced, sequential procedure code has been largely removed from the specification of the appearance of the display but remains in the specification of the handling of events and in the specification of application logic, namely those aspects of the design which, in the MVC paradigm, are collectively called the Model. A program constructed according to contemporary practice consists of two quite distinct specification "layers:" a static (and visual) Form layer and a Procedure layer containing a collection of partially interacting code modules. There is in such practice an undesirable conceptual and cognitive discontinuity between these two layers.

As distinct from the two-layer model described above, Fabrik [D. Ingalls et al, "Fabrik: A Visual Programming Environment," Proceedings of OOPSLA (Conference on Object-Oriented Programming Systems, Languages, and Applications), September 1988] conceptualizes a display-out event-in application program as a constraint network [A. H. Borning, "ThingLab, a Constraint-Oriented Simulation Laboratory," Tech. Report SSL-79-3, Xerox Palo Alto Research Center, July 1979]. This constraint network is visualized as a set of components with connectors on their edges. Wires can be drawn between the connectors. Typically of constraint-oriented specification models, the Fabrik conceptual model is quasi-static and does not embody the two-layer conceptual discontinuity described above. The hidden sequence engine of Fabrik is in two parts. It consists of the above-described sequence engine of the display-out event-in user interface as contained in certain components associated with user-interface events, plus a distributed constraint-maintenance protocol associated with the set of wires. The distributed constraint-maintenance protocol assures that the dataflow values at both ends of each wire are the same. The constraint-maintenance protocol is local (i.e., it deals only with the values at the two ends of each wire) and it permits bidirectional flow along certain wires. As an example of the practical consequence of the locality of Fabrik's constraint-maintenance protocol, the extended path from a data value in a database component to its user-interface display component must be fully bidirectional, in order to manage the propagation of data changes which can occur either in the database or at the user interface. This need for full bidirectionality in extended data paths adds substantial complexity to the task of building practical programs and to the task of building components, particularly for the majority of components which have more than two connectors, because of the combinatorial growth of the number of cases of change propagation which must be handled.

SUMMARY

In general, in one aspect, the invention features a computer software method in which references to a flow object are flowed through a network of processing components, and the processing components are enabled to have direct access to a common version of the flow object for the purpose of performing operations with respect to the flow object.

Implementations of the invention may include one or more of the following features.

The reference to the flow object may flow in only one direction through the network. One of the operations may include modification of the flow object. The flow object reference may be used by a component to send a message directly to the flow object. The flow object may use a reference to a component to send a message directly to the component. The flow object may have an owner component, may contain a reference to its owner component, and may use the reference to refer to its owner component. The flow object may have one or more dependent components and may contain references to refer to the one or more dependent components. The reference may be used in message-passing communication acts to keep the components synchronized in their use of the flow object. The message-passing communication acts may occur in alternating patterns of messages, component to flow object, flow object to component, and so on. The message-passing communication acts may give notice that a flow object has been operated on.

The processing of a component may project the flow object onto an event driven user interface. Every displayed element of the user interface may be a projection of a flow object. The events may include key strokes and pointer actions. The components may be hierarchical.

The flow object may include a reference to an object. The object referred to in the flow object may be a not-pure-data object. The not-pure-data object may include a process to be executed, or a flow object, or a collection of flow objects. At least one of the components may operate on the flow object by means of a reference without flowing references to the flow object through the network. A component which is operating on a flow object may advise the flow object's owner component, by a message-passing communication act, when the flow object has been operated on. The component which is operating on the flow object may apply the communication act to the flow object. The owner component may advise dependent components, by message-passing communication acts, when the flow object has been operated on. Action on the advice to dependent components may be blocked at the operating component.

At least some communication between components may be achieved by flowing references to the flow object from a serving component through the network including into another component, and then having the other component engage in message-passing communication acts directly with the serving component. A component may generate and operate on a derivative of the flow object without copying the parts of the flow object, by using references to the parts of the flow object. Components may be organized in types, instances of which comprise the components of the network.

Flow objects may be organized in types, instances of which comprise the flow objects the references to which flow in the network. One of the flow object types may be a type that has at least one MO instance. One of the flow object types may represent a component type. Instances of the flow object type may be spawned by an instance of one of the component types. Instances of one of the component types may invoke the component type represented by a flow object instance. Flow objects may include any of DoIt, port, dialog projector, component type description, tool, or child window projector. A flow object may yield an identifier which can be used to distinguish it from other flow objects, e.g., a picture or text. The flow object may include a wrapper which yields a value of the identifier, or yields component references. A component may use the identifier in taking an action, such as displaying of the identifier onto a user interface, or a table lookup.

A component may include a persistent value, which may be set when a network containing the component is encapsulated. The value may be changed either before or after encapsulation.

In general, in another aspect, the invention features a reusable component type comprising a template according to which the component type may create component instances, the template including information about external characteristics of the type and about internal characteristics of the type.

Implementations of the invention may include one or more of the following. The internal characteristics may include information about actions that may be taken by the component instances, e.g., operating on a flow object, or originating a flow from a source. The component instance may contain or receive via a sink connector a representation of a flow object type and the action may include creating an instance of that type. The action may include the origination of a message-passing communication act. The effect of the action when a flow object referred to at a sink is MO may be the same as if the flow-object reference in the sink were invalid. The action may occur in response to receipt by the component instance of an event or of a flow or a message-passing communication act.

The internal characteristics may include the ability of the component instances to respond to and to initiate flows and message-passing communication acts. The external characteristics may include the ability of the sinks of the component instances to respond to invalidate sink connector and receive flow messages. The component instances may respond to owner be notified and dependent be notified messages from flow objects, to stop, idle, and run messages, and to event messages and to pick messages from DoIts of which they are the server.

The external characteristics may also include a connector type which acts as a template for creating connector instances according to which the component instance comprises the connector instance, and the connector instance has storage which holds a flow object reference. The flow object reference may be valid or invalid, and, if invalid, does not refer to a flow object and, if valid, refers to a flow object. The connector type may include a sink type whose instances receive references via connections from source connector instances of components or a source type whose instances send references via connections to source connector instances of components.

The component type may include a mechanism for communicating with a flow object referred to. The component type may be embodied in one data structure and the component instance may be embodied in another data structure. The component type data structure may be persistent and the component instance data structure may be transient. The component type may include a primitive component type. The component type may include a composite component type which contains a reference to a component type. Except for the number of sink connector types and source connector types comprised therein, the component type may be indistinguishable in its external characteristics from other component types. The boundaries of a composite component instance may be hidden with respect to message-passing communication acts.

In general, in another aspect, the invention features a connector component type which includes expressions of the functional relationship between internal network interconnections of a composite component type and external connections of a reference to the composite component type in a manner that represents encapsulation of the internal network interconnections whose only connections to the outside of the component type are through connector component instances.

Implementations of the invention may include one or more of the following. The connector component type may include a sink connector component type, or a source connector component type. The connector component type may be configured to be effectively transparent to flows.

In general, in another aspect, the invention features an indirect selector component type which creates a component instance used in a network. The type includes a sink connector for sinking a reference to a flow object which contains a reference to a collection, and a source connector for sourcing a reference to a selected collection flow object which refers to the original collection and to a selection on it.

Implementations of the invention may include one or more of the following. The selection may include zero or any number of elements of the collection. The collection may be of flow objects. A source connector may source a reference to a flow object which is either MO or is a selection from the collection. The flow object may include MO when the selected collection flow object refers to an empty selection and otherwise may include the selection referred to by the selected collection flow object. The selected collection flow object may be sourced to a choose-one component. The choose-one component may make an empty selection or a selection comprising any number of elements of the collection. The choose-one component may include a user interface element. The selection may be expressed in a modification of the selected collection flow object. The indirect selector component may be notified when the selected component flow object is modified. The choose-one component may display identifiers obtained from the elements of the collection. The choose-one component may make a selection based on an event received from the user interface. The choose-one component may make a selection based on the values of the identifiers obtained from the elements of the collection.

In general, in another aspect, the invention features a software application. In the software application, a program array contains objects representing component type descriptions, some component type descriptions of which array may contain references to elements of the array and information about interconnections between these references. The application includes a network of component instances derived from the elements of the program array, including the interconnection information, and a single projection mechanism sufficing to enable a user to edit, debug, and run the application.

All of the elements of the program array may occur uniquely. Each component type in the array may include a set of command behaviors specific to the type of the component. The activation of a command behavior may trigger a behavior, e.g., any behavior of the kind that may be triggered by the picking of a DoIt.

For editing, the elements of the program array may be projected onto the user interface. A designator of each command behavior may be projected onto the user interface and may be selected for activation. For running, user-interface components of the network may be projected onto the user interface based on a program which includes component instances, component type descriptions, and information about pending processes. The information about pending processes may include a processor stack, or a pending-action list used to defer processing of component instances having multiple sinks.

The application may be debugged while running, using the single projection mechanism, by using information about component types and their interconnections obtained from the program array, and using component instance information including flow object information and communication act information obtained from the running program. Flow object information may be projected onto the user interface by means of flow object references in connectors. The projection may be done by user-interface components. The state of a component instance may be projected onto the user interface. The state of the component instance may include the values of settings and of flow objects referenced by the component's connectors.

For debugging, the information about message-passing and flow communication acts may be projected onto the user interface by visual modification of interconnections and components in the network. The information may be projected a step at a time under control by a user. The debugging may be single stepped by pausing the running of the program after each of the message-passing or flow communication acts. The projection mechanism may control editing and running by sending stop, idle, and run messages to the application which then sends these messages to the component instances. The stop messages may invalidate the flow-object references of all connectors. The message passing and flow communication-act behavior of the application may begin upon issuance of the idle message to component instances, which precedes the start point of the application at the time the run message issues.

For running, the stop-idle-run sequence may be sent all at once. For editing and debugging, the stop-idle may be sent together, and the run message may be sent when chosen by a developer. Editing may be permitted after a stop-idle sequence. Activation of command behavior may be permitted after a stop-idle sequence. Adding a connection between component type references during editing may force a flow to occur in the running of the corresponding program. Removing a connection between component type references during editing may force an MO flow. Adding a component type reference to the network may force creation of a corresponding component instance.

In general, in another aspect, the invention features a setting component type for use in a network of references to component types, the setting component type comprising a variable which can have a distinct value for each reference to the setting component type.

Implementations of the invention may include one or more of the following. Each instance of this reference to this type is an owner of a flow object referencing a distinct copy of this reference's value and which sources a reference to this flow object when the instance receives an idle message. The value associated with each reference can be changed, before a network of component instances corresponding to the network containing this reference is encapsulated, by means of the activation of a command behavior of the component type. The value associated with each instance can be changed by means of a transaction register component.

In general, in another aspect, the invention features a command component type for use in a network of references to component types comprising a sink connector and a setting.

Implementations of the invention may include the following features. After a network in which it occurs is encapsulated, the network may impart a command behavior to the resulting composite component type such that the designator of the command behavior is determined by the setting. When the command behavior is activated, the instance of the component type may cause a DoIt flow object referenced by the sink connector of the instance to be picked.

In general, in another aspect, the invention features a method of handling control flow in a network of components, in which a transaction register component manages a transaction object, and flows and message-passing communication acts to and from the transaction register component are used to control actions on the transaction object.

Implementations of the invention may include the following features. The transaction object may contain a current object and a reference to an underlying object. The transaction object may receive an open message which creates a current object which is a copy of the underlying object. The transaction object may accept an abort message, which destroys the transaction object, and a confirm message, which first copies the instance variables of the current object to the underlying object and then destroys the transaction object. After the transaction object is created, the transaction register component may source a reference to a flow object which references the transaction object, the transaction register component being the owner of that flow object. A dialog component may sink a reference to the sourced flow object and may open a dialog projecting onto the user interface the instance variables of the current object of the referenced transaction object and permitting changes which the user makes to these variables in the user interface to be effected directly in the respective instance variables of the current object. The dialog component, upon receiving an abort or confirm event from the user interface, may close the dialog and cause the sending of an abort or confirm message to the transaction object referenced by the flow object, thereby changing the instance variables of the underlying object only if the confirm message is received.

In general, in another aspect, the invention features a user interface component type whose instances have a display-out/event in behavior that is defined entirely by flow objects.

Implementations of the invention may include the following. There may be a combination of component types. The component instance may accept a flow object to be projected onto the user interface, a projector class flow object, and a tool flow object. The projector class flow object may define the appearance of the display. The tool flow object may define the response to user-interface events.

In general, in another aspect, the invention features an item of commerce which includes a description of a component type expressed in an interchange format permitting the component type to be encapsulated hierarchically and referred to within a network defining interrelationships of component types, the component types being arranged to permit references to flow objects to pass into and out of their instances. In implementations of the invention, the component type description may be stored in libraries.

In general, in another aspect, the invention features a computer program comprising a component type. In implementations of the invention, the computer program may be expressed in an interchange format, and may be in a form capable of freestanding execution on a computer.

In general, in another aspect, the invention features an assembly tool which enables a user to store component type descriptions and to manipulate and interconnect references to component type descriptions to form other component type descriptions.

Implementations of the invention may include the following features. The assembly tool may be adapted to run and enable debugging for programs derived from component types. The assembly tool may be arranged to allow generation of an application which is executable independently of the assembly tool. The assembly tool may be arranged to provide a graphical work space enabling a user to manipulate representations of component types to form other component types. The assembly tool may be arranged to accept component type descriptions in an interchange format, and to export component type descriptions in an interchange format. The component type may have aspects defining what can be done with it and the assembly tool may include a restriction mechanism that controls use of different aspects by a holder of the component type.

In general, in another aspect, the invention features a type description component type, an instance of which has a setting whose value references a component type, and a source connector which, when the instance receives an idle message, sources a flow object representing the referenced component type.

In general, in another aspect, the invention features a type invocation component type, an instance of which includes a sink, which accepts a flow object representing a component type, a source which sources a DoIt, the type invocation component instance being the DoIt's server, and other sinks and sources. In implementations of the invention, when the DoIt is picked, an instance of the represented component type may be created; a program based on the represented component type and the instance may be built; stop and idle messages may be sent to the program; inputs derived from flows arriving at the additional sinks of the type invocation component type may be flowed to the corresponding sinks of the instance; a run message may be sent to the program; and any flows sourced by connectors of the represented component instance may be sent to the sinks which are connected to those additional sources of the type invocation component which correspond to the sources of the represented component instance.

Other advantages and features will be demonstrated by the following description and the claims.

DESCRIPTION

The invention employs a conceptually unified quasi-static constraint-network model. The constraint-maintenance protocol employs only unidirectional dataflows, greatly simplifying the design and construction of components, and it is nonlocal.

The nonlocal property of the constraint-maintenance protocol eliminates the need for the application builder's explicit management of bidirectional consistency constraints between related data in widely separated parts of the program network. For example, the practical programming issues associated with maintaining consistency among different displays of the same object value or among object values in databases and multiple displays of these values (even while any of these values might be caused to change) are handled automatically by the nonlocal constraint-maintenance protocol. The practical effect of this automatic maintenance of data consistency across the whole program network is the consequent greater conceptual simplicity of the total design and construction task.

One measure of the power of a construction paradigm which employs the simplification strategies discussed above is whether a programming tool which implements such a construction paradigm can be built using itself. With respect to the similarity-group of display-out event-in systems, this measure of power is rarely achieved. MVC exhibits this power, but MVC is all code. Conceptual systems extensively employing static description, such as VB and Fabrik for example, have not been realized by tools whose internal structures both are instances of these conceptual systems and which can build themselves. The present invention can be used to build a display-out event-in programming tool, based on the invention, which can then build itself.

Table of Contents of Description

Figure List

1 Structure and Behavior of Programs
1.1 Structure of a Program
1.2 Flow Objects
1.3 Communication Acts
1.4 The Routing Communication-act Function
1.5 The Message-passing Communication-act Function
1.6 Interpretation of Flows; The Projection Paradigm
1.7 Interpretation of Picks
1.8 Events
1.9 Interpretation of Notify Owner and Notify Dependent Communication Acts
1.10 Interpretation of Notify Hosts Communication Acts
2 Program Sequence Control
2.1 The Steady and Busy States of Applications
2.2 Sink State Change
2.3 Clear-before-send rule
2.4 An Example of Change Propagation
3 Composite Components
3.1 Primitive and Composite Components
3.2 Connector Components
3.3 Flows Into and Out of a Composite Component
3.4 Summary of Sink Behaviors
3.5 Structure of an Application Program
4 A Fundamental Set of Primitive Components
4.1 Settings
4.2 Collection Components
4.3 Window Components
4.4 Filter Components
4.5 Glue Components
4.6 An Analysis of a Wiring Diagram
5 Component Forms
5.1 Data Structure Definitions
5.2 The Component Forms
5.3 Definitions of Library Forms
5.4 Example of a Library Form
5.5 Definitions of Executable Forms
5.6 Example of an Executable Form
5.7 Definitions of Instance Forms
5.8 Example of an Instance Form
5.9 On the Distinction Between "Wiring Time" and "Run Time"
5.10 Components Which Participate in the Development Process
5.11 Definitions of Editable Forms
5.12 Example of an Editable Form
5.13 What the Wiring Workspace Does
Using Flow Objects for Control
6.1 Transactions 6.2 Dialog Projectors
6.3 An Example of Branching
6.4 Coupling Protocol
6.5 Component Invocation Components
6.6 Tools
6.7 Child Window Projectors
6.8 Example of Projection
7 Example of a Recursive Algorithm
7.1 Program Description vs. Algorithm Description
7.2 A Conditional Component
7.3 Computational Components
7.4 Bootstrapping Recursive Definitions
8 A Component Type Market Model
8.1 Component Type Interchange
8.2 Assembly Tool Structure
8.3 The Structure of Restriction
How The Use of Components Is Restricted
9.1 Licensing of Component-type Aspects
9.2 Forwarding of Licenses

FIGURE LIST

FIG. 10 shows the dependent set of the flow object z.

FIG. 11 shows the dependent set of the flow object Y after the Y button is pushed.

FIG. 50 shows a menu of letters used in the naming of forms.

FIG. 53 shows a table of the subcomponents of the example, with the subcomponent numbers as they appear in the library form.

Figure 45:
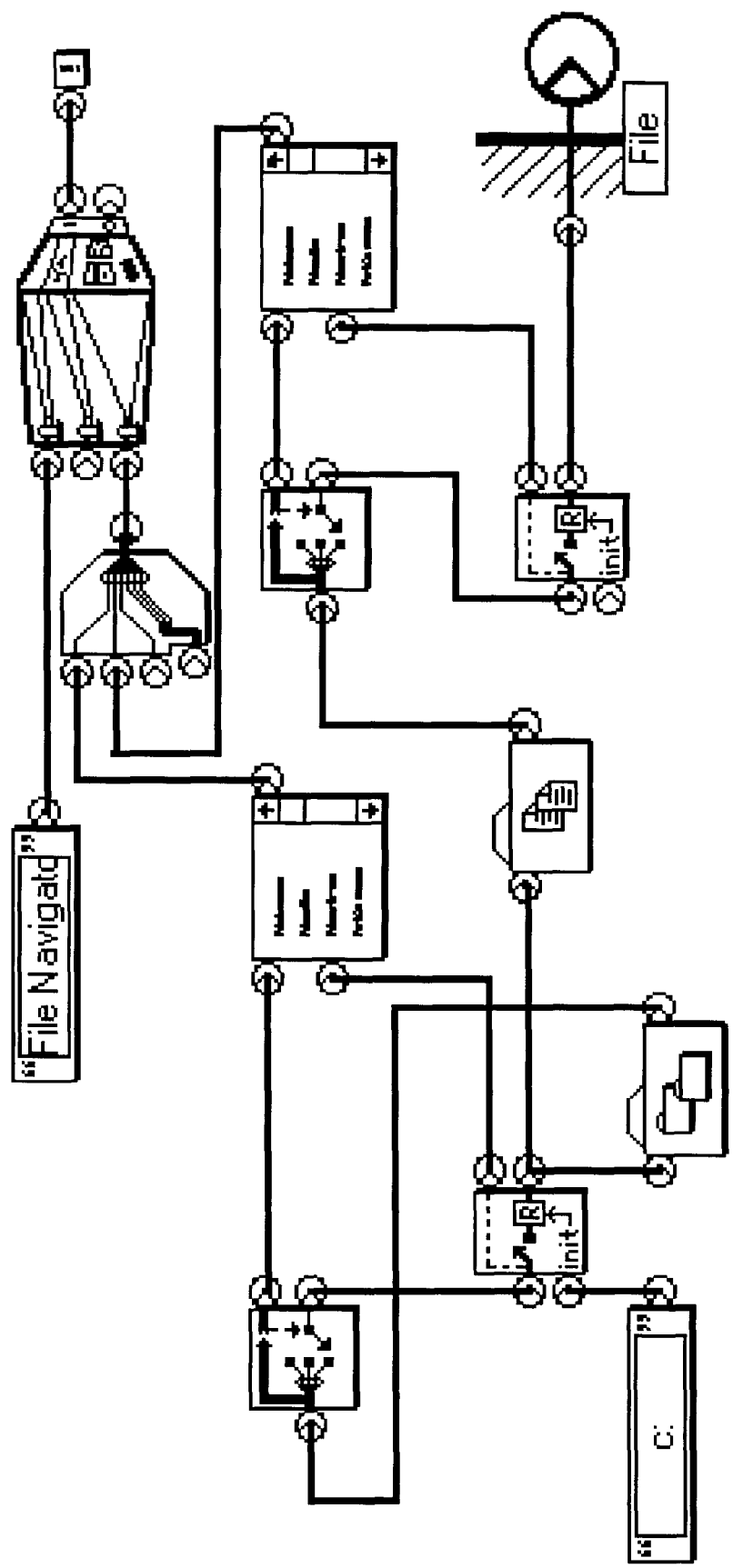
FIG. 45 shows the same example program as FIG. 1.
Figure 54:
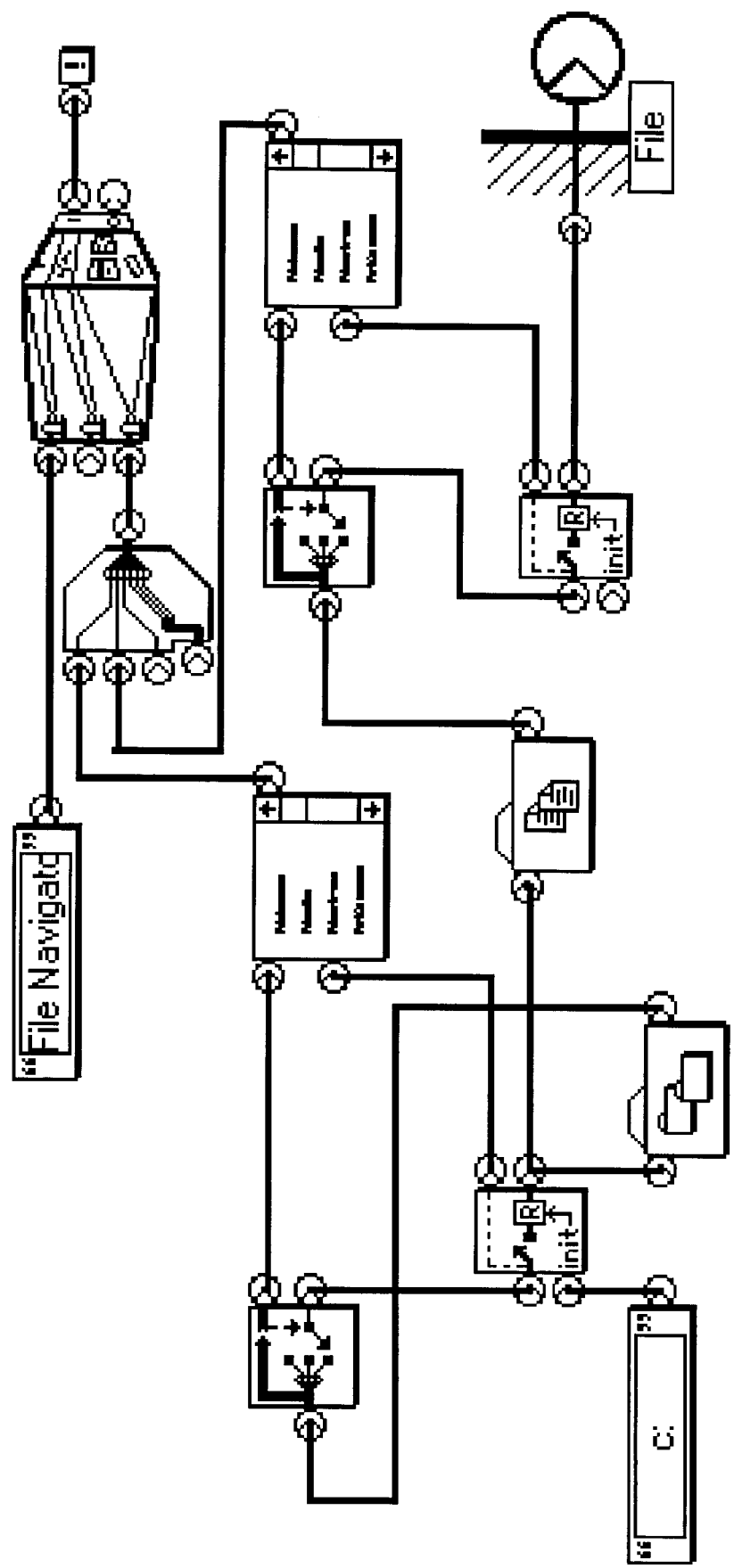

FIG. 54 repeats the wiring diagram of FIG. 45 with the addition of subcomponent and wire numbers.

FIG. 55 augments the table of FIG. 53 by the addition of the number of sources on each subcomponent.

FIG. 56 adds the <VA> and <LUD> structures to the table of FIG. 53.

FIG. 57 shows the <LWDA> wire array structure.

Figure 52:
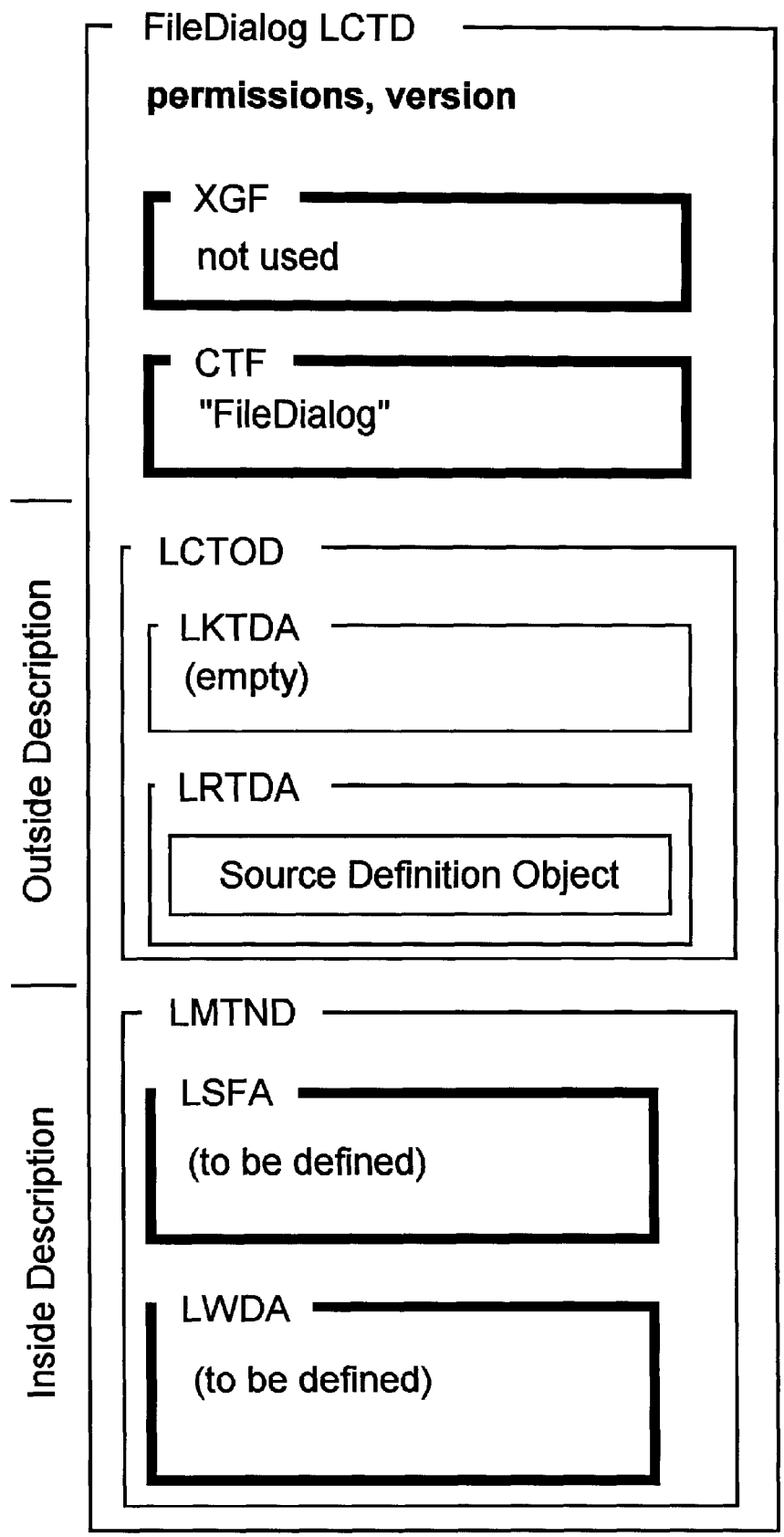
FIG. 52 shows the general structure of the library form of the composite component defined by the example in FIG. 45.
Figure 58:
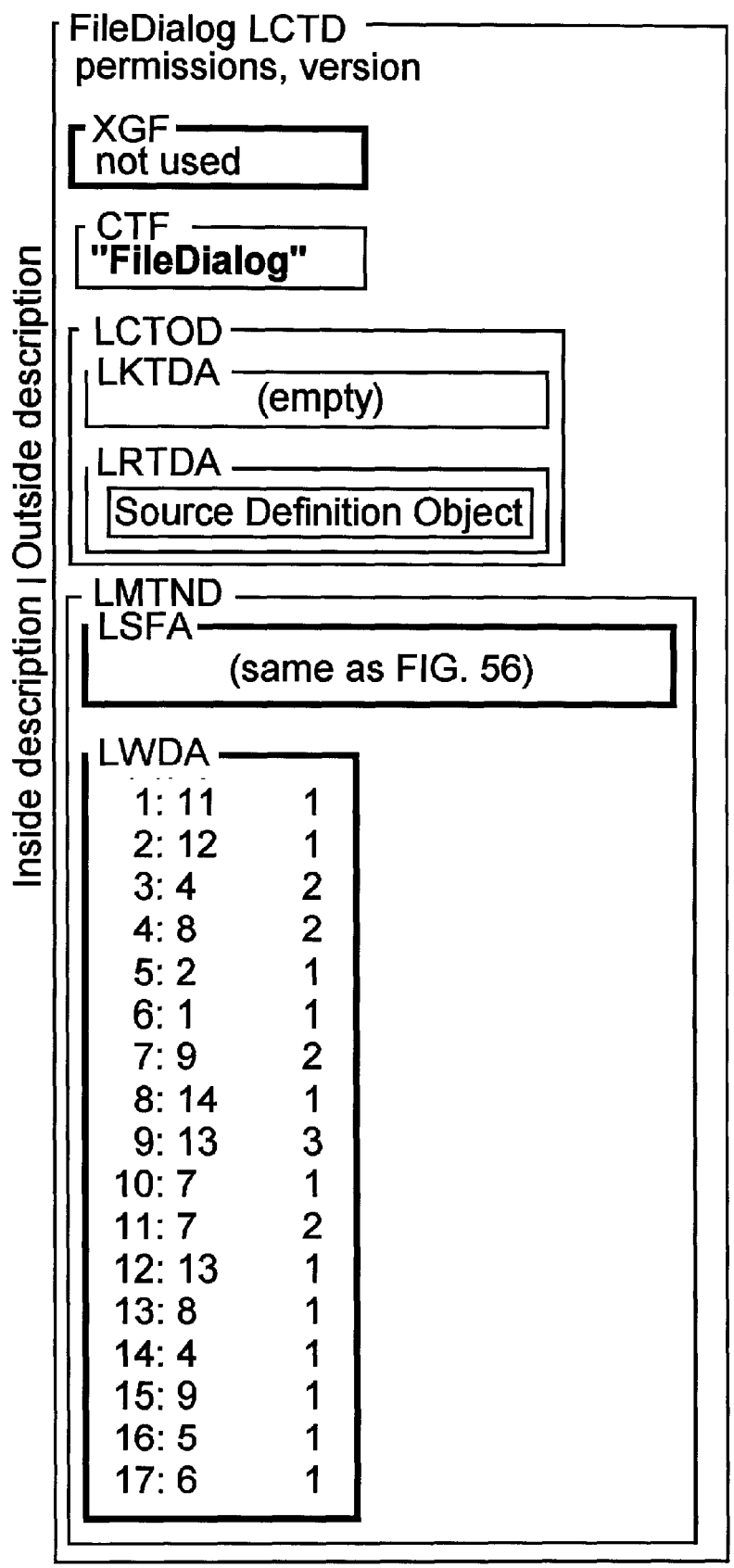

FIG. 58 shows the complete structure of the library form shown in FIG. 52.

Figure 59:
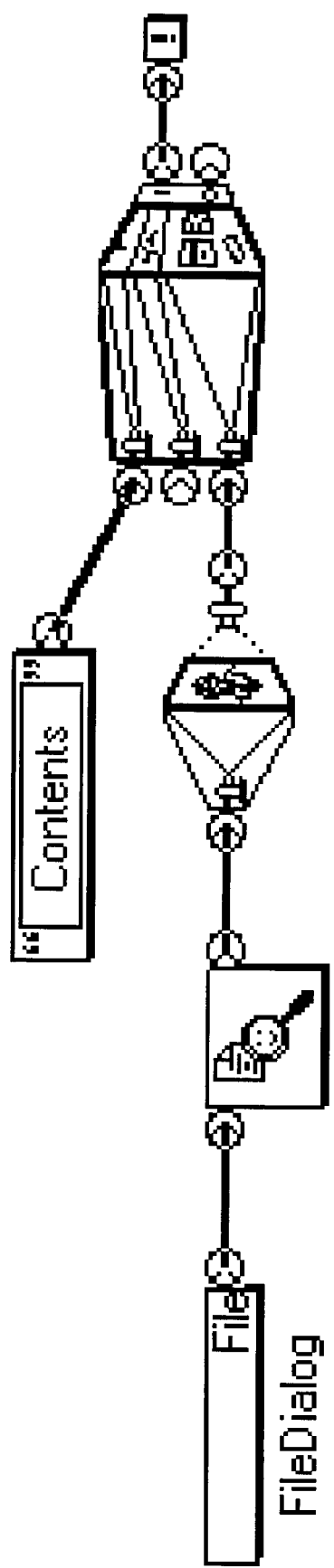

FIG. 59 shows the wiring diagram of an example file content browser.

FIGS. 60 and 61 show the subcomponent array and the wire array of the file browser type description.

Figure 62:
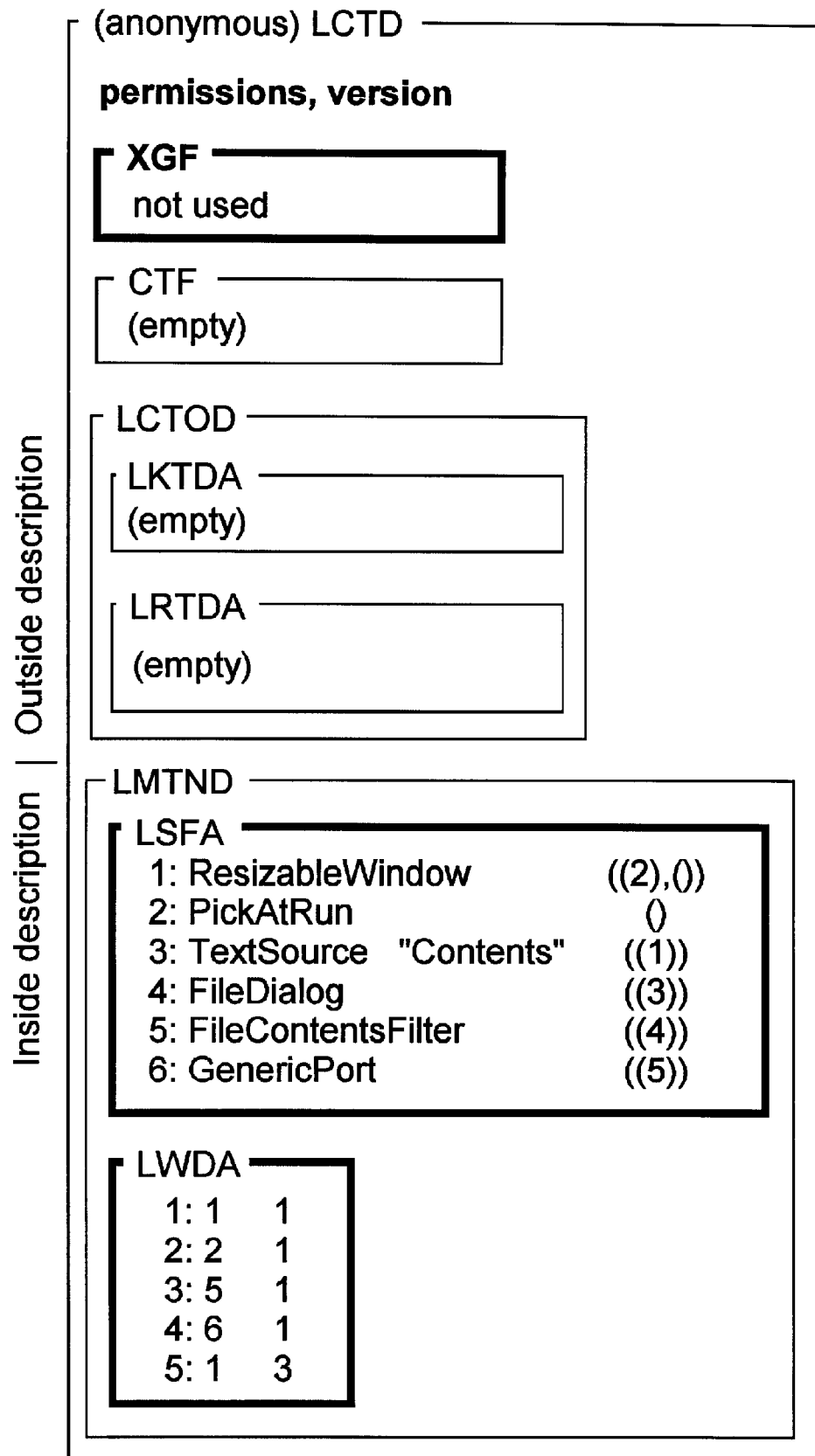

FIG. 62 shows the library form of the file browser type description.

FIG. 63 shows the stages of the application of the P() function applied to the file browser.

FIG. 64 shows the <XGA> of the file browser program.

Figure 65:
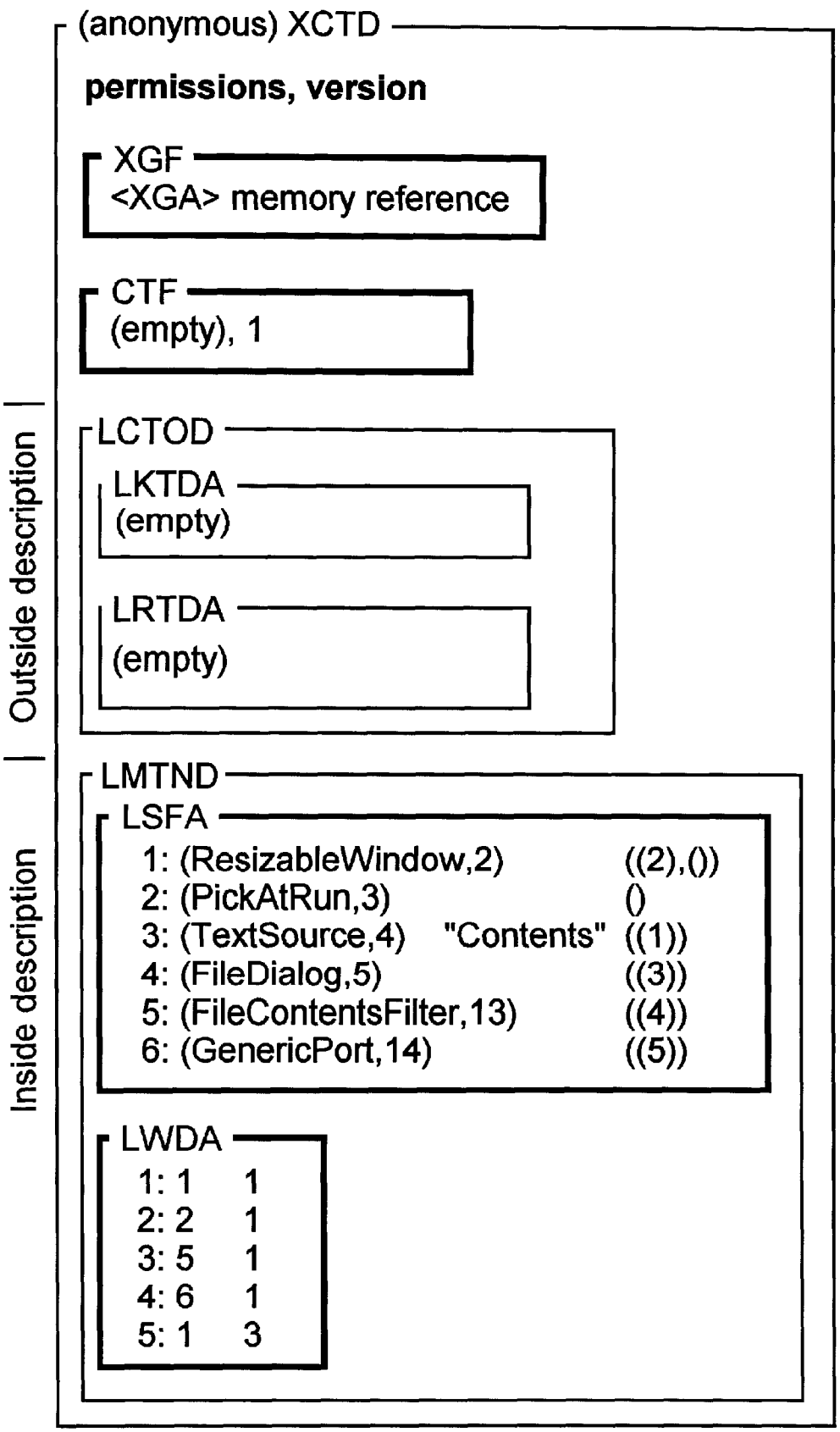
Figure 66:
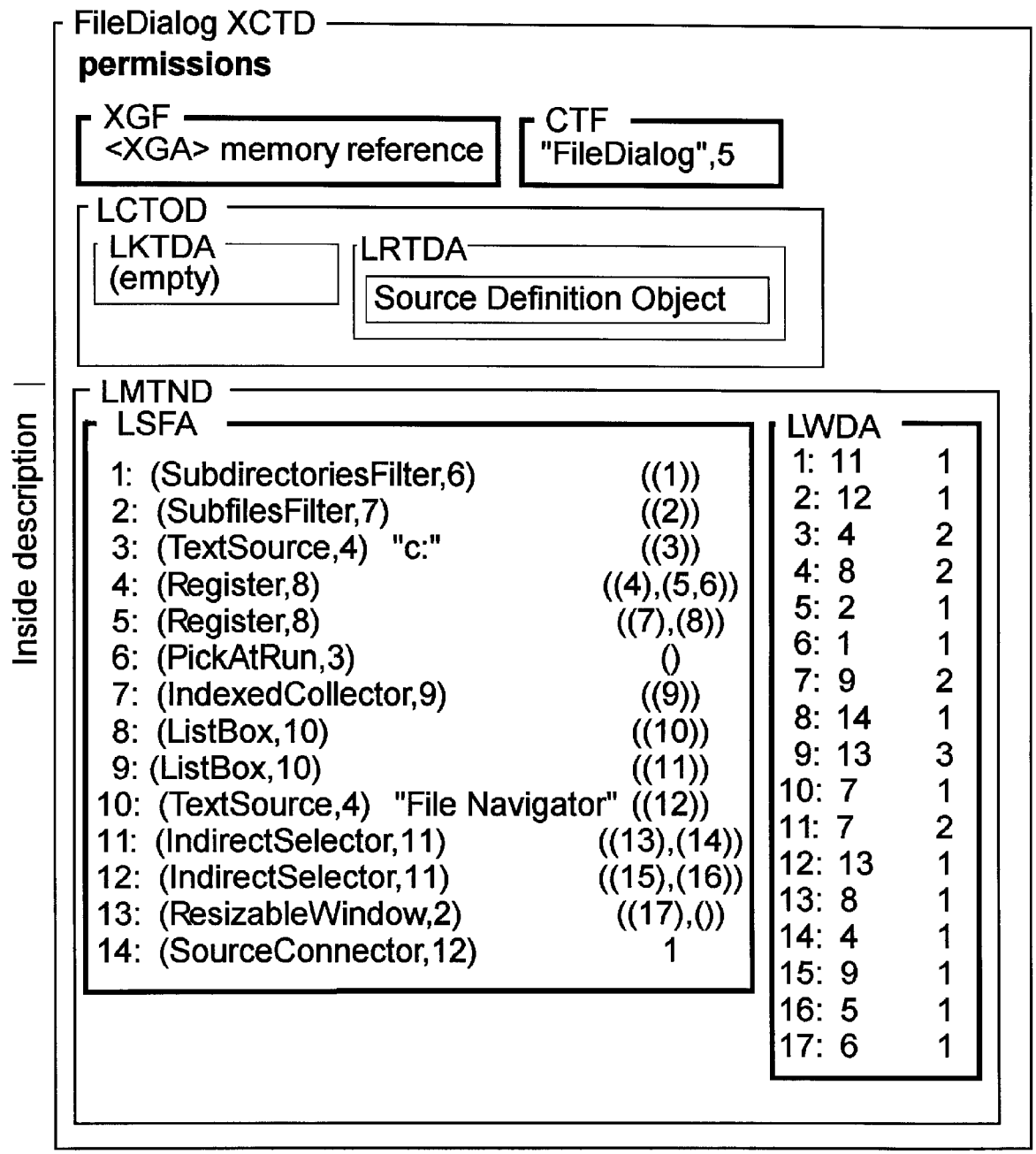

FIGS. 65 and 66 show the X-form type descriptions for the file browser and the file dialog type descriptions.

Figure 67:
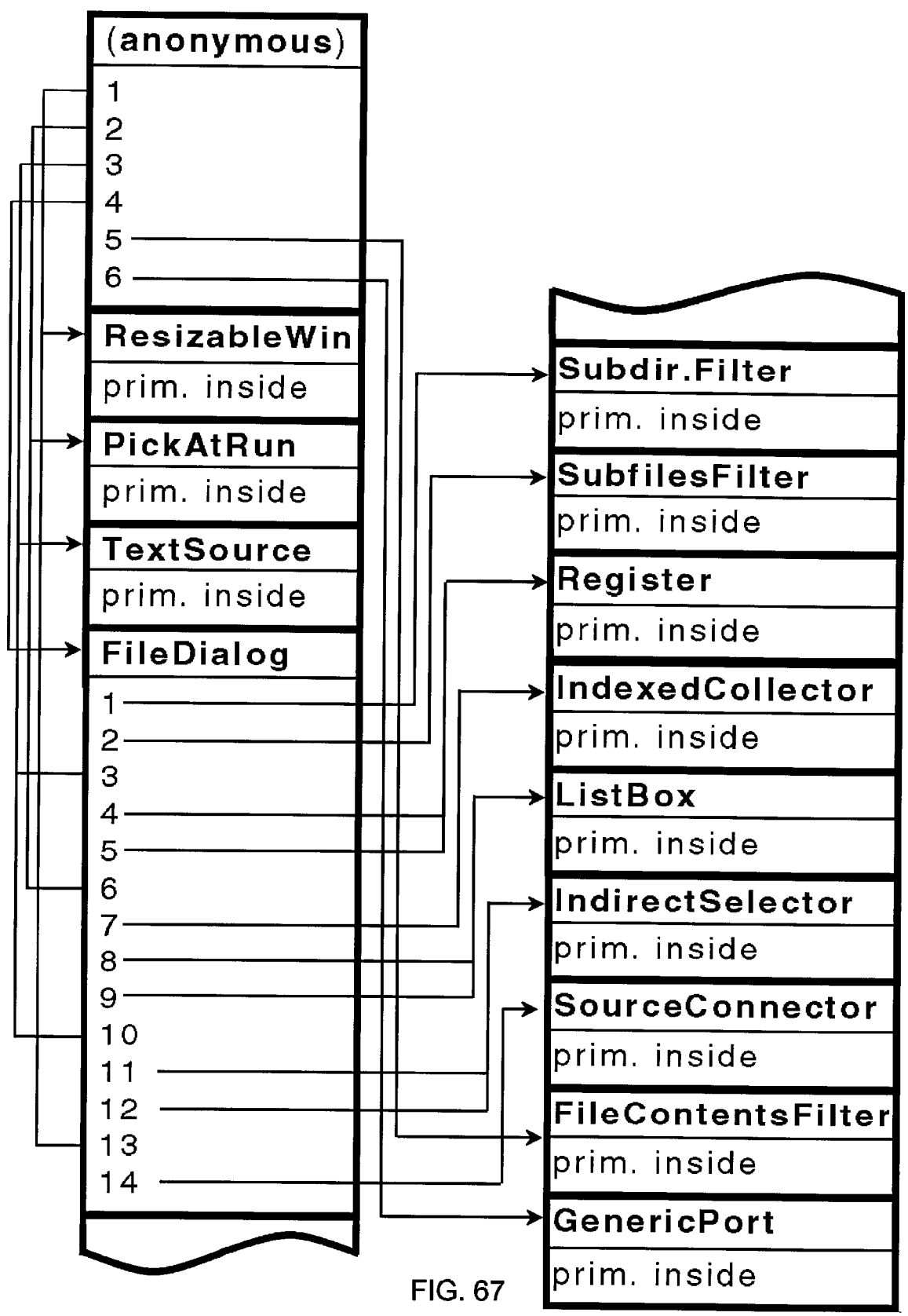

FIG. 67 shows the overall structure of the <XGA> of the file browser program.

Figure 68:
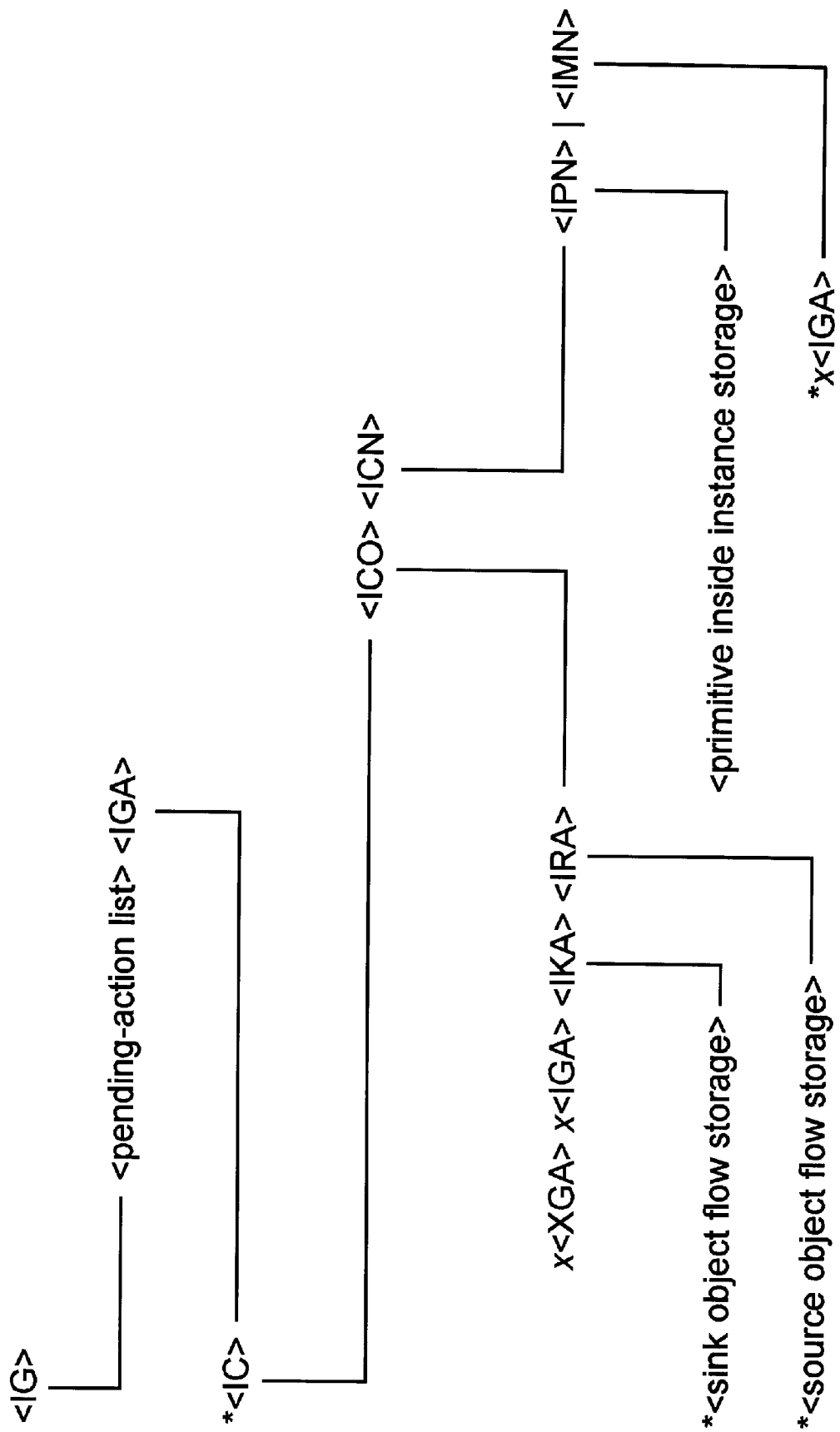

FIG. 68 shows a syntax diagram for instance forms.

FIG. 69 repeats FIG. 64, the gross structure of the file browser program definition <XGA>.

FIG. 70 shows the stages of the application of the I() function applied to the file browser program definition.

FIG. 71 shows a table of the key features of the 21 component instances in the file browser program.

Figure 72:
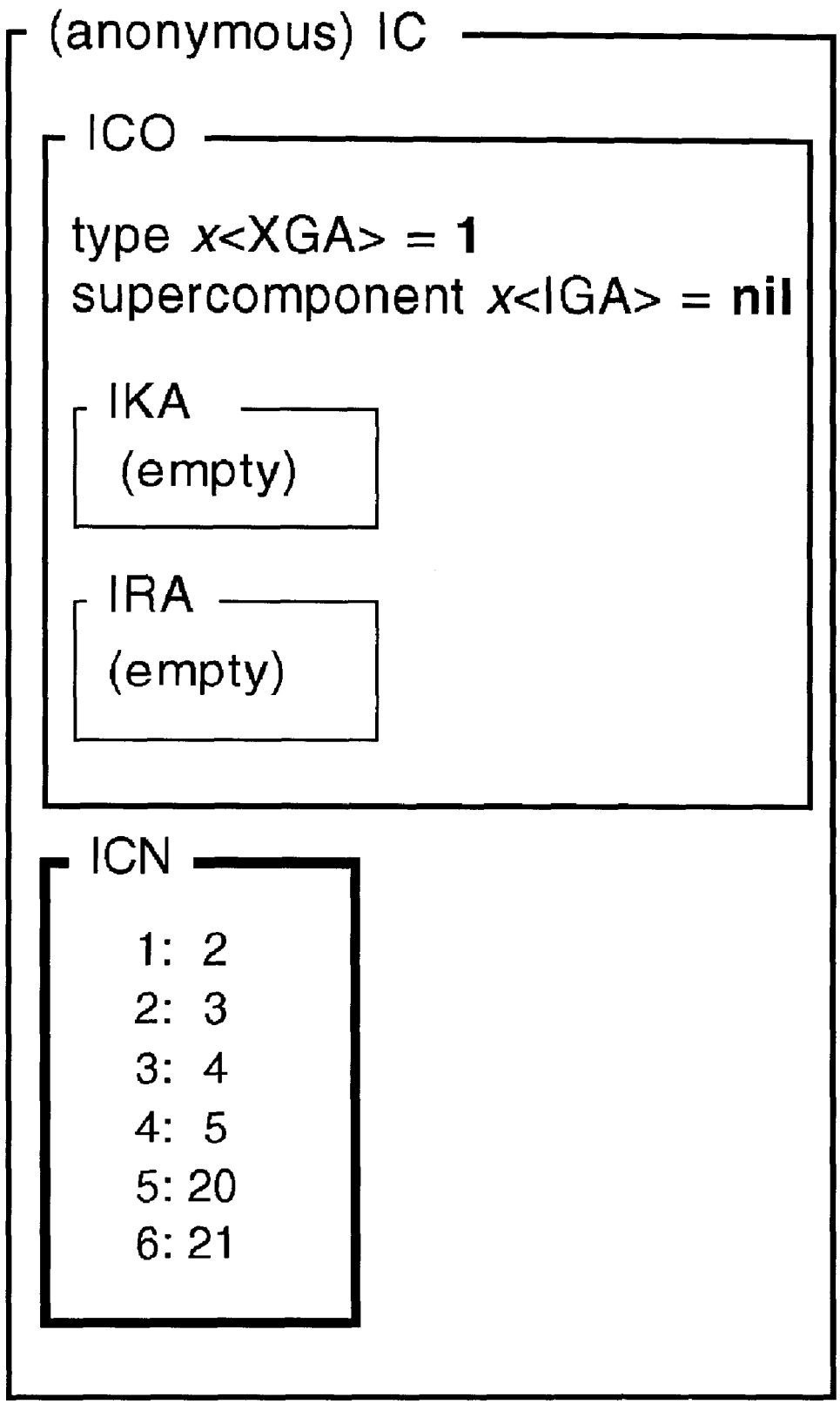
Figure 73:
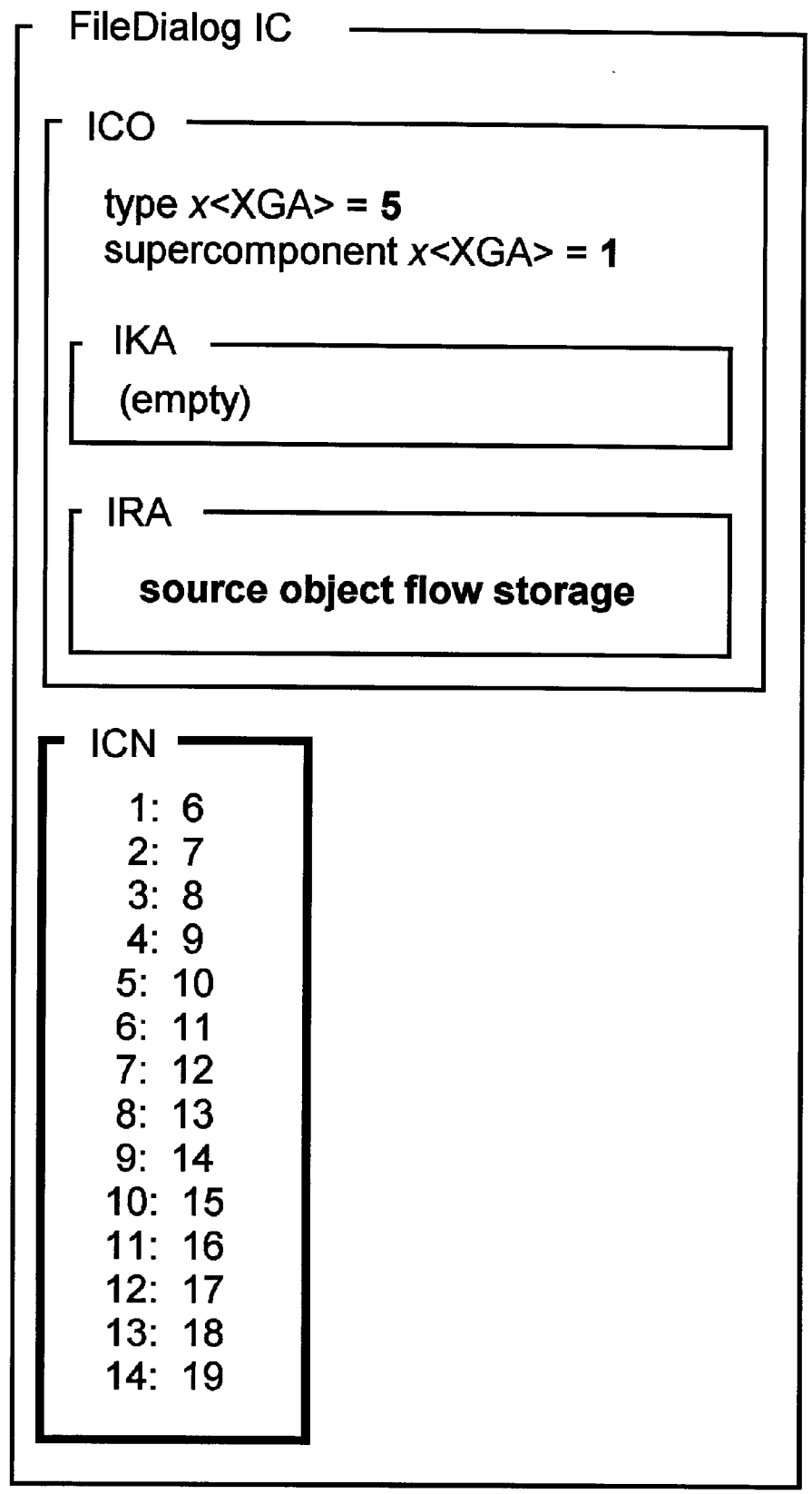

FIGS. 72 and 73 show the instance structures for the two composite components in the file browser: the top-level anonymous component and the file dialog component.

Figure 74:
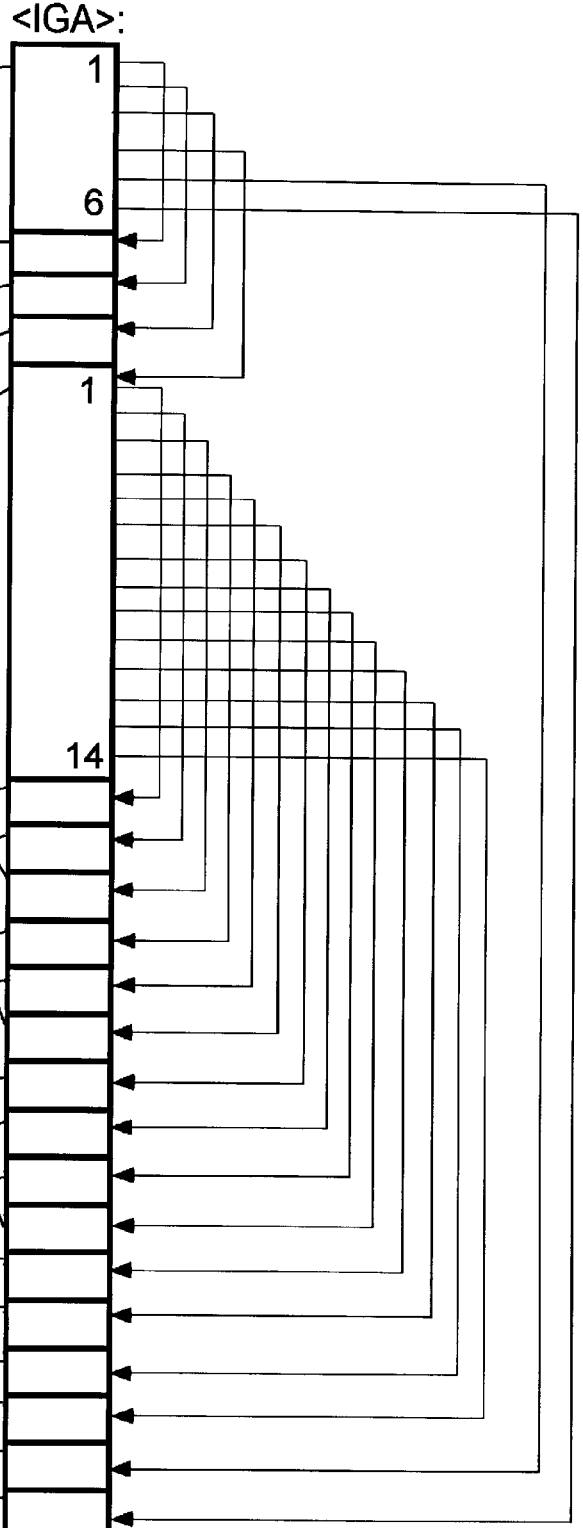

FIG. 74 shows the gross structures of the instance array and the program definition array, with the references between and within them.

Figure 75:
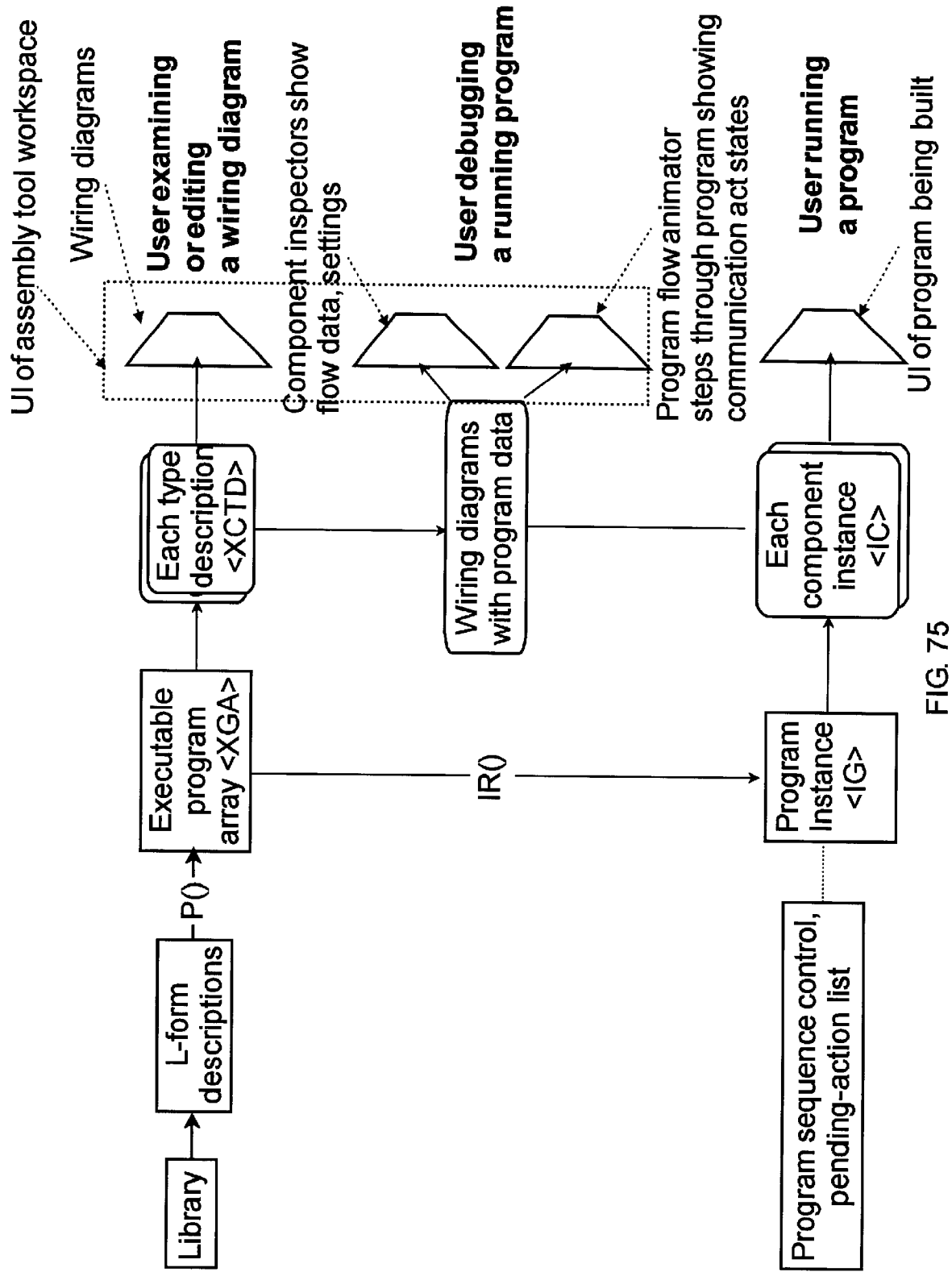

FIG. 75 applies the projection paradigm to the process of wiring, debugging, and running a program.

Figure 76:
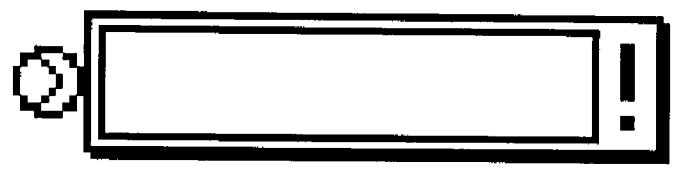

FIG. 76 shows a Command component.

Figure 77:

FIG. 77 shows a Probe component.

Figure 78:
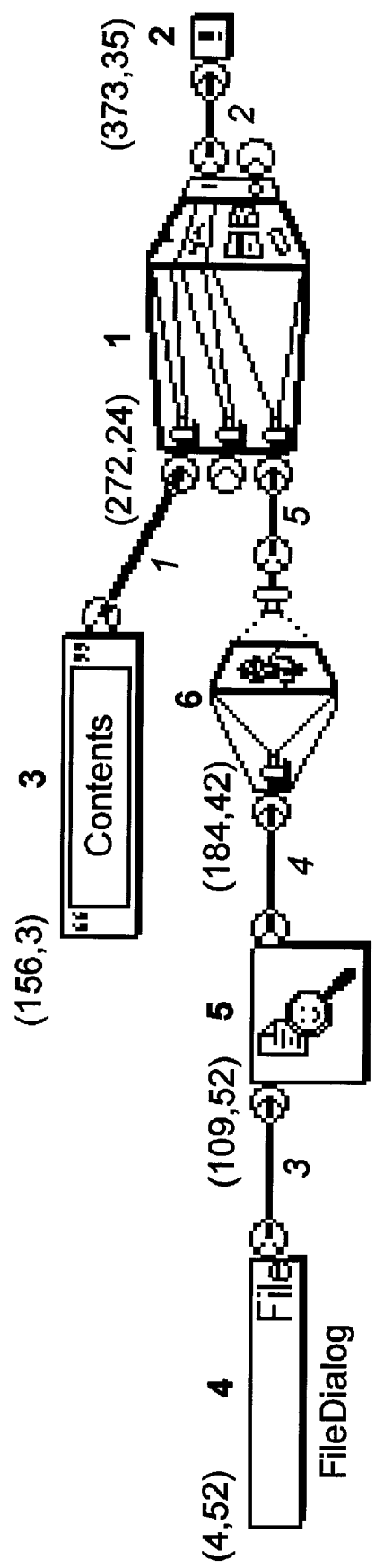

FIG. 78 shows the wiring diagram of the file browser enhanced by the addition of coordinates for the positions of the components.

FIG. 79 shows the file browser type definition with all E-form information present.

Figure 80:
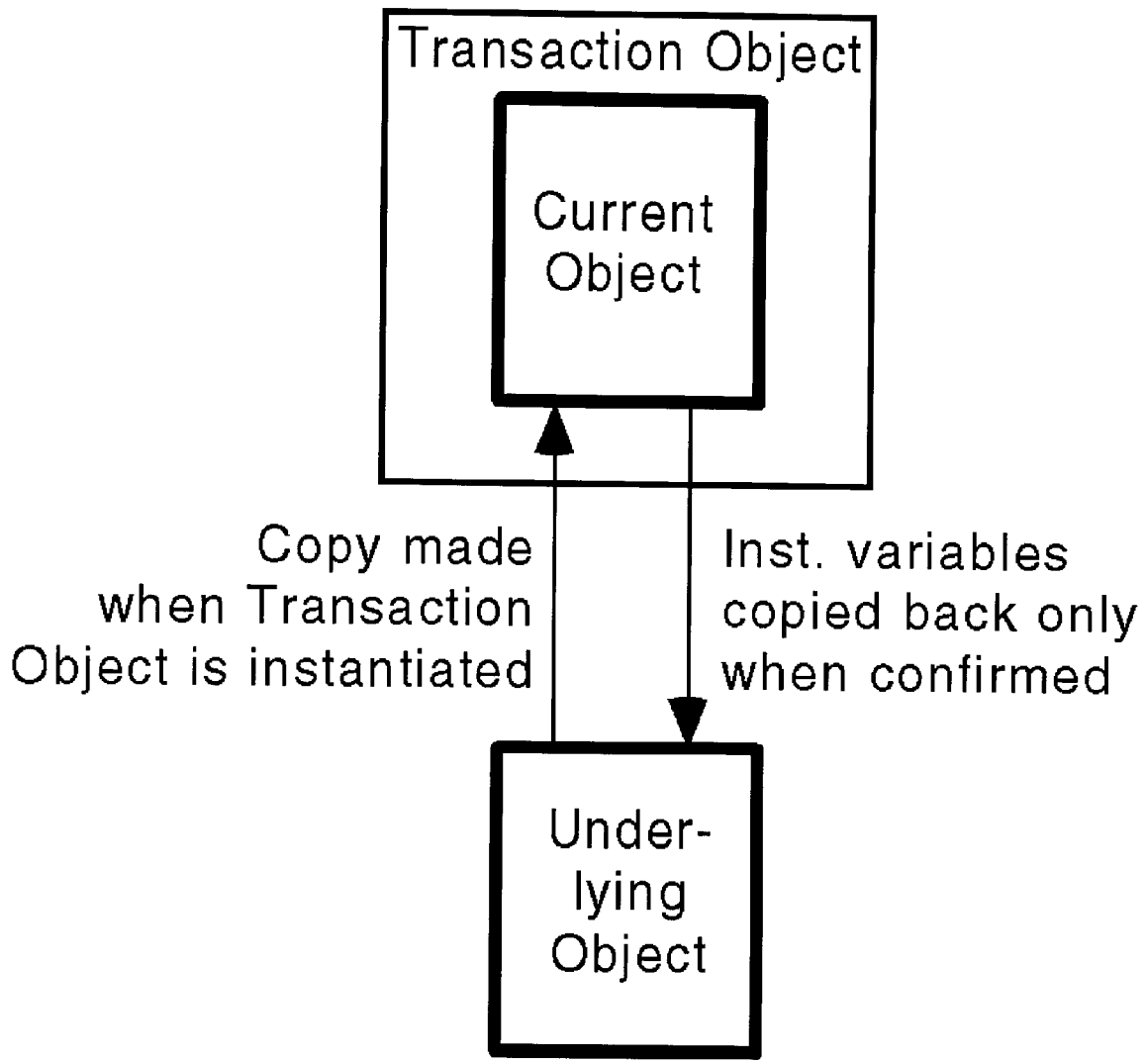

FIG. 80 shows a transaction object and its relationship to its current object and the underlying object.

Figure 81:
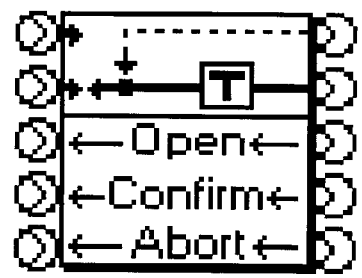

FIG. 81 shows a Transaction Register component.

Figure 82:
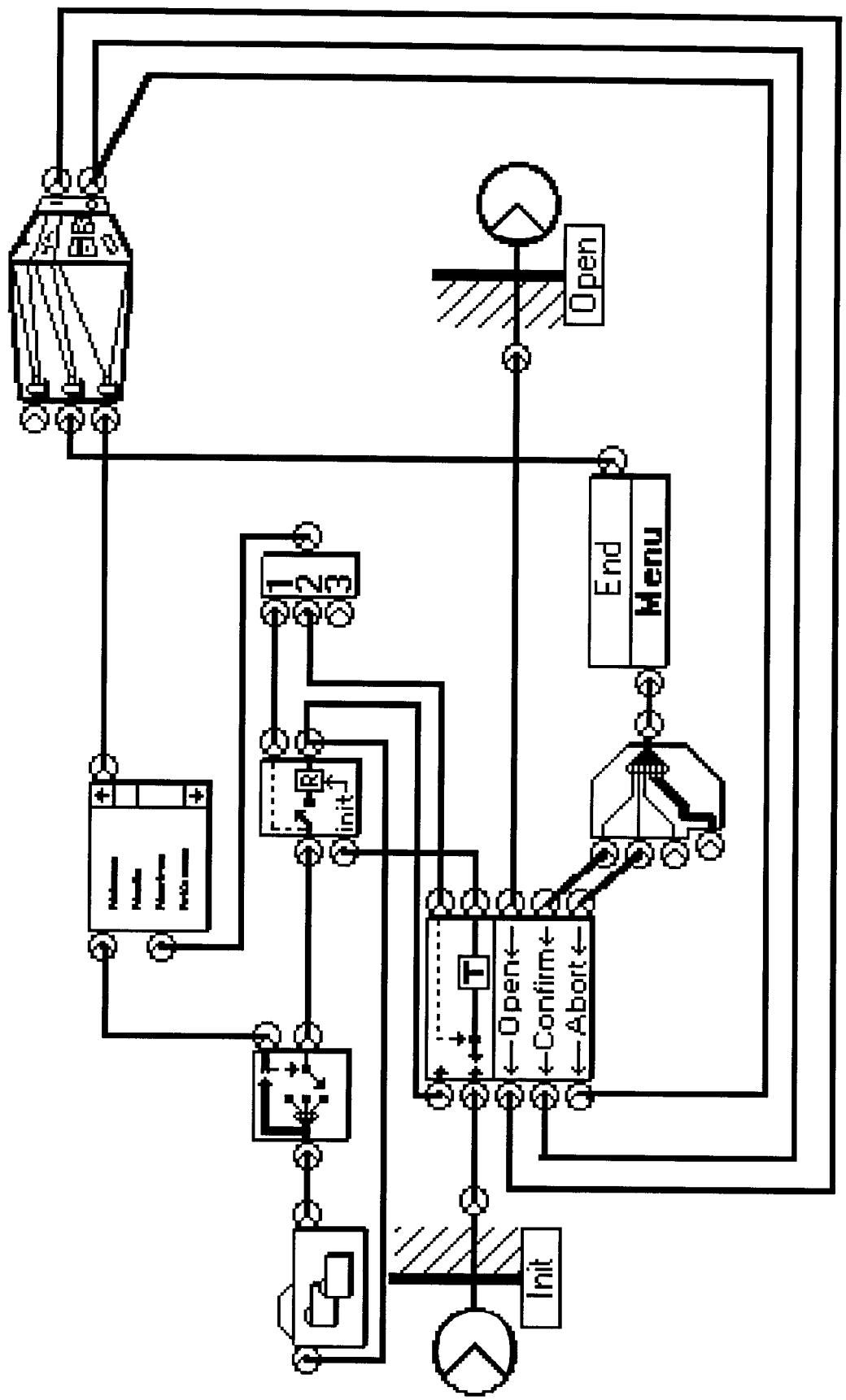

FIG. 82 shows the use of a Transaction Register component in the construction of a dialog.

Figure 83:
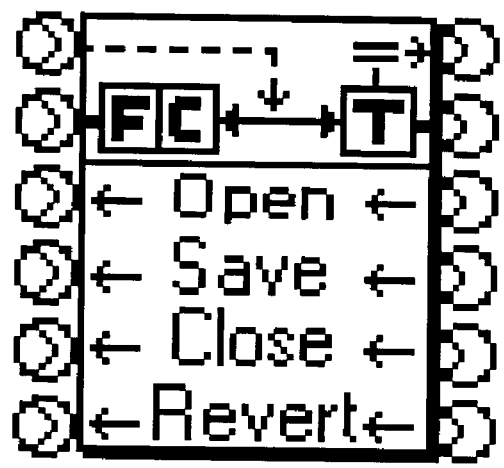

FIG. 83 shows a File Transaction Register component.

Figure 84:
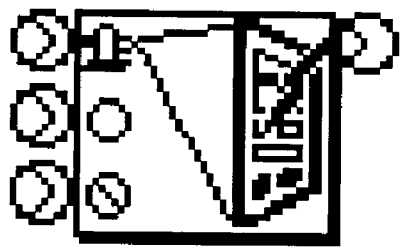

FIG. 84 shows an Open Dialog component.

Figure 85:
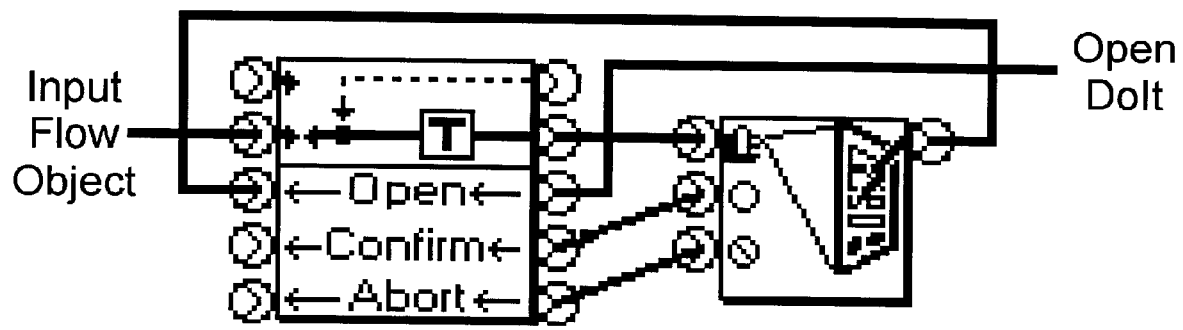

FIG. 85 shows a characteristic idiom combining a Transaction Register component and an Open Dialog component.

Figure 86:
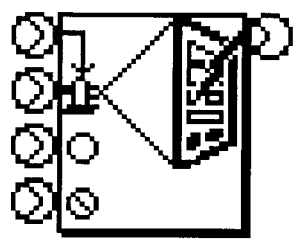

FIG. 86 shows an Open Dialog Projector component.

Figure 87:
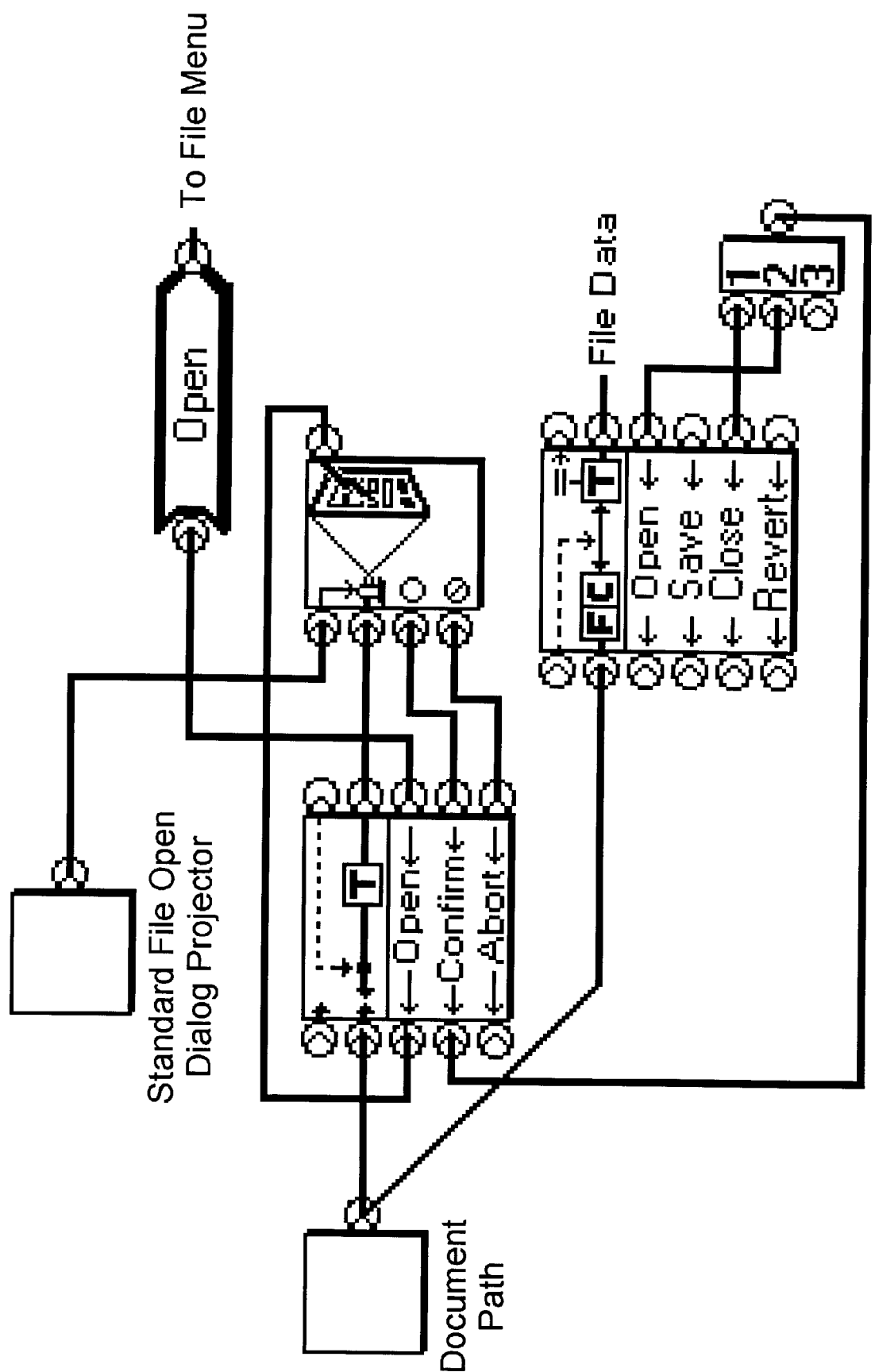

FIG. 87 shows a first approximation to a file-open wiring diagram.

Figure 88:
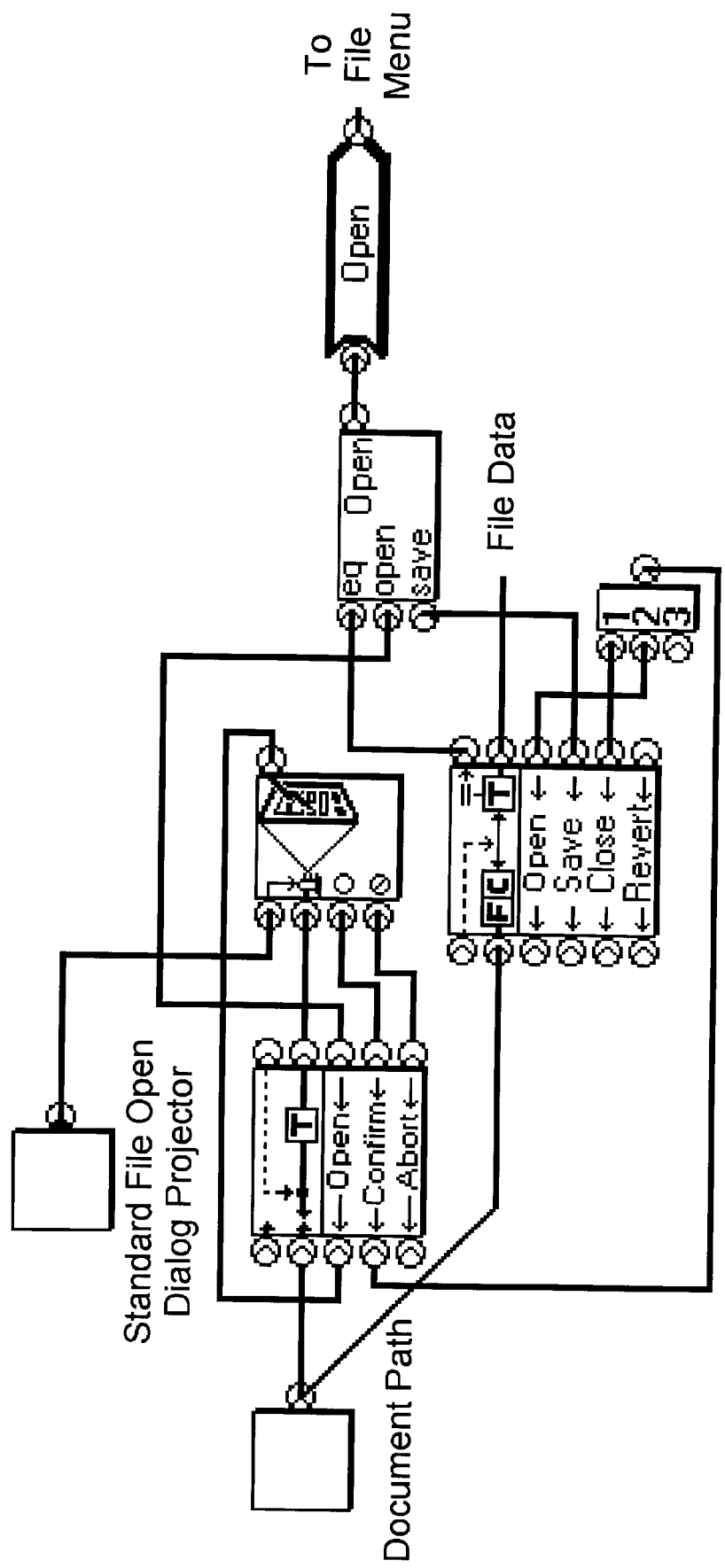

FIG. 88 shows the final form of the file-open wiring diagram after addition of a new composite component.

Figure 89:
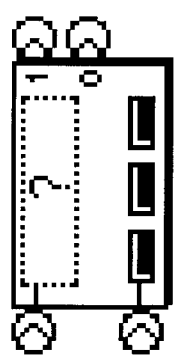

FIG. 89 shows a Question Box component.

Figure 90:
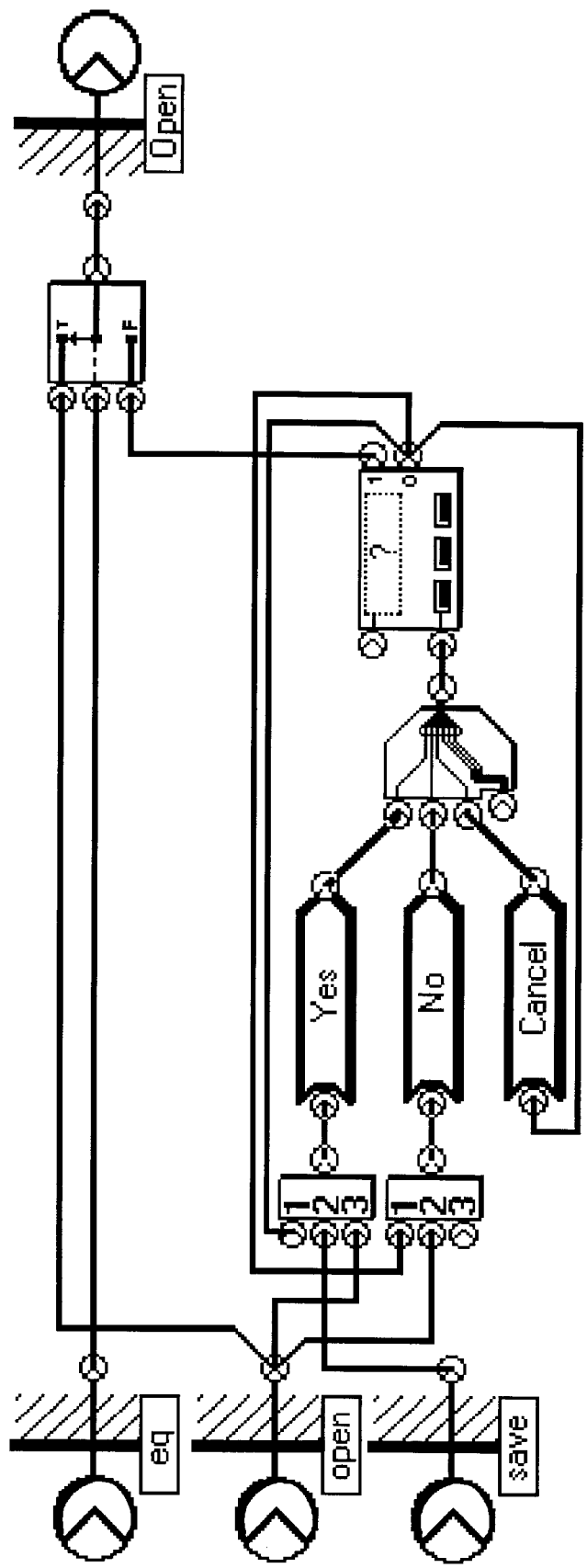

FIG. 90 shows the wiring diagram of the new composite component added to the file-open wiring diagram.

Figure 91:
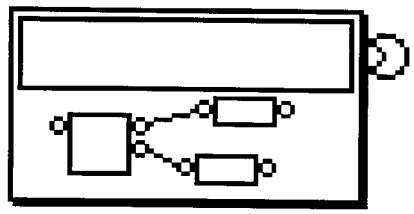
Figure 92:
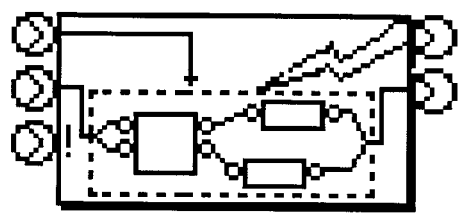

FIGS. 91 and 92 show a Component Description component and a Component Invocation component.

Figure 93:

FIG. 93 shows a Display List Child Window component.

Figure 94:
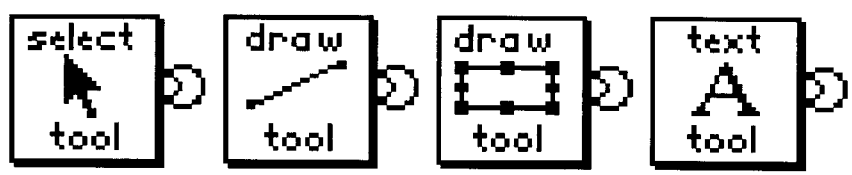

FIG. 94 shows four Drawing Tool components.

Figure 95:
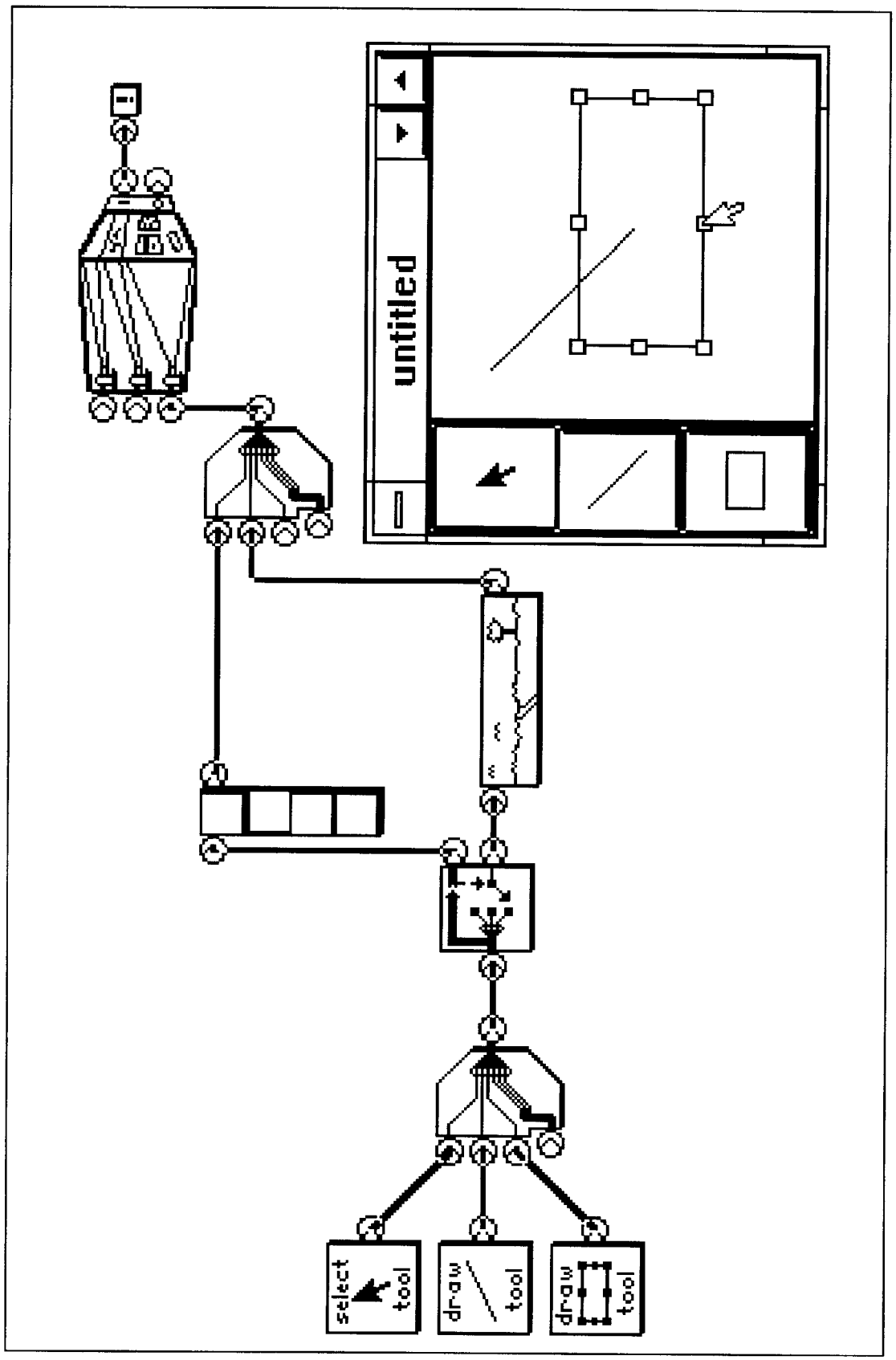

FIG. 95 shows an example drawing program.

Figure 96:
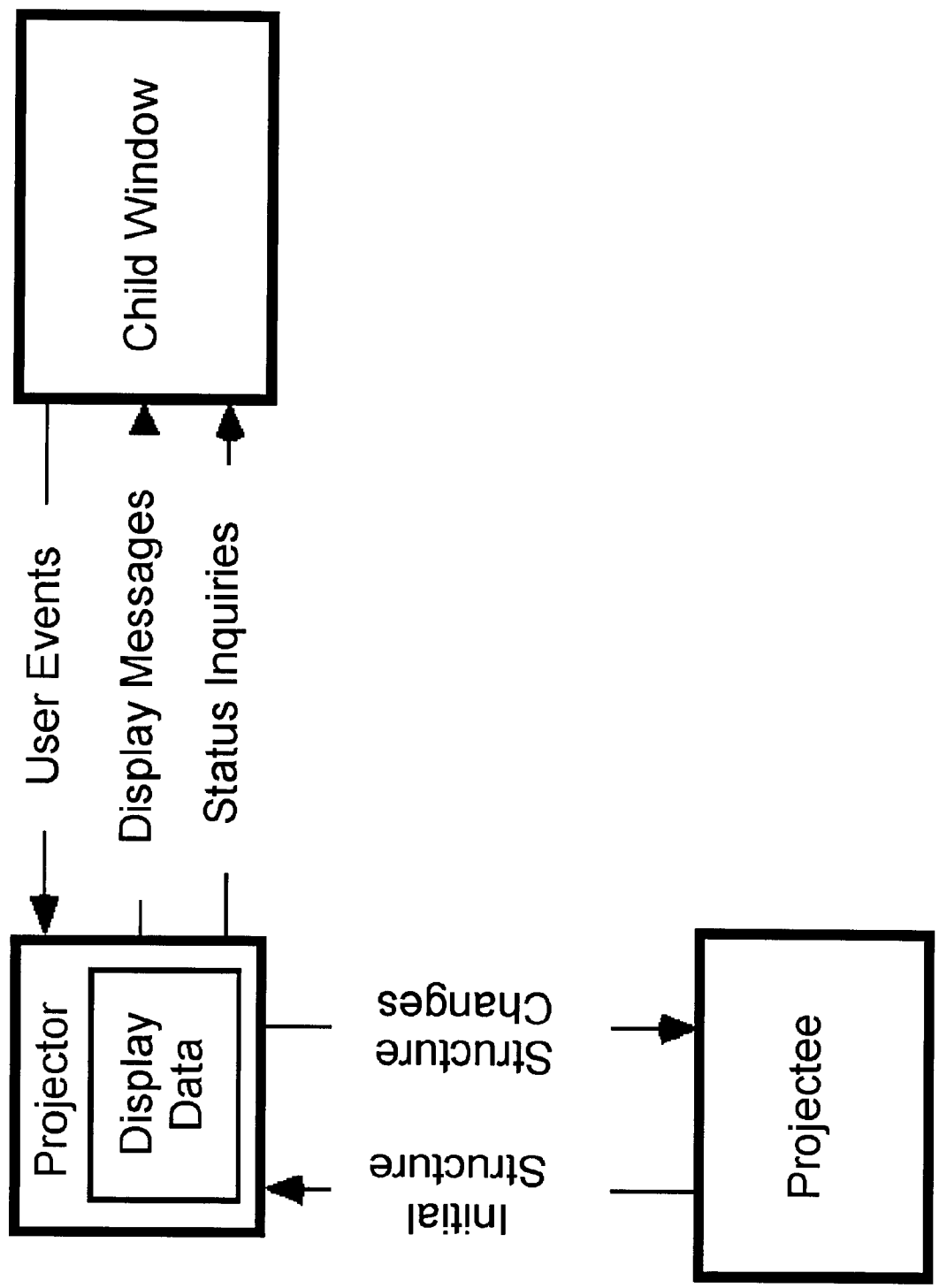

FIG. 96 shows the communication paths among a Projector object, a Projectee object, and a child window.

Figure 97:
Figure 98:

FIGS. 97 and 98 show a Generic Projector Child Window component and a Projector Engine component.

Figure 99:
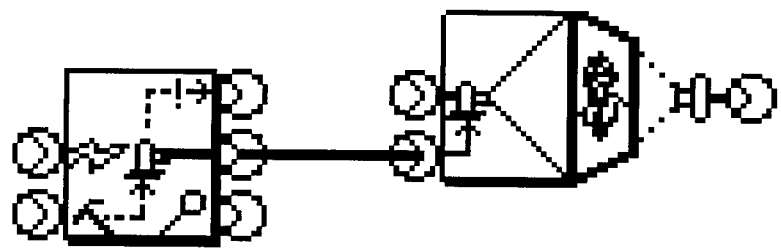

FIG. 99 shows how the Generic Projector Child Window component and Projector Engine component are wired together.

Figure 100:
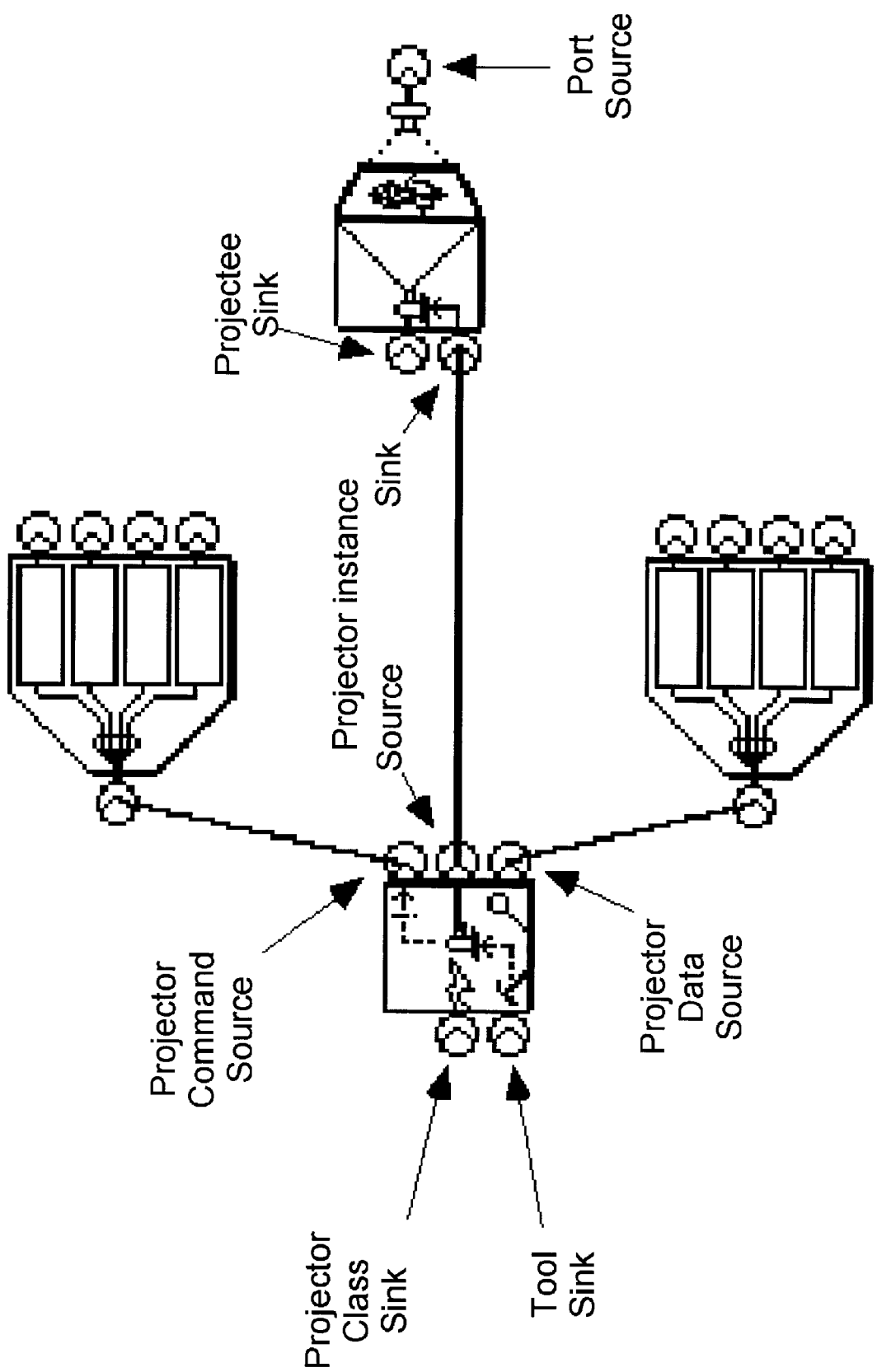

FIG. 100 shows the most general form of the wiring of the Generic Projector Child Window component and Projector Engine component.

Figure 101:
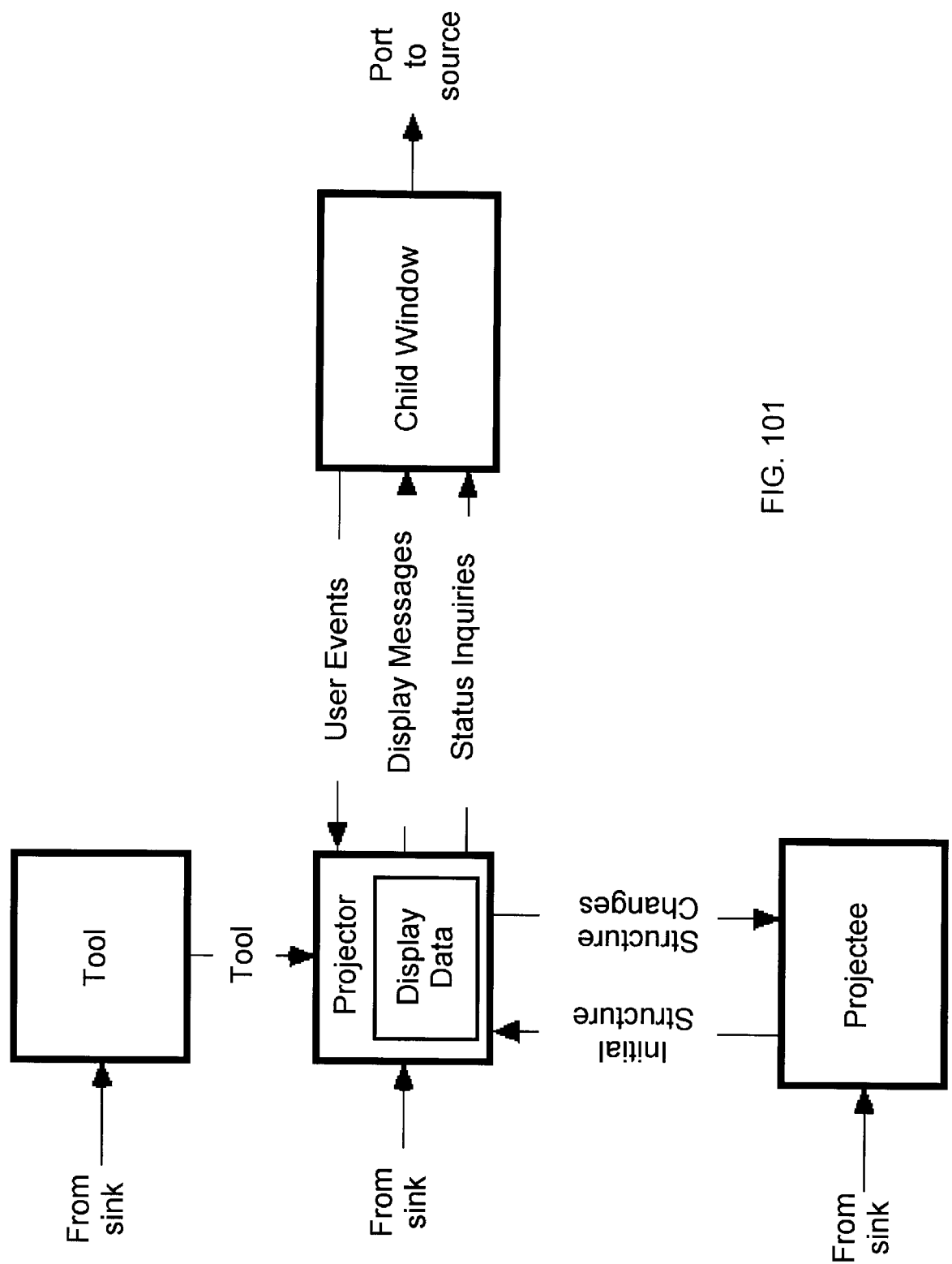

FIG. 101 shows the communication paths among a Tool object, a Projector object, a Projectee object, and a child window.

Figure 102:
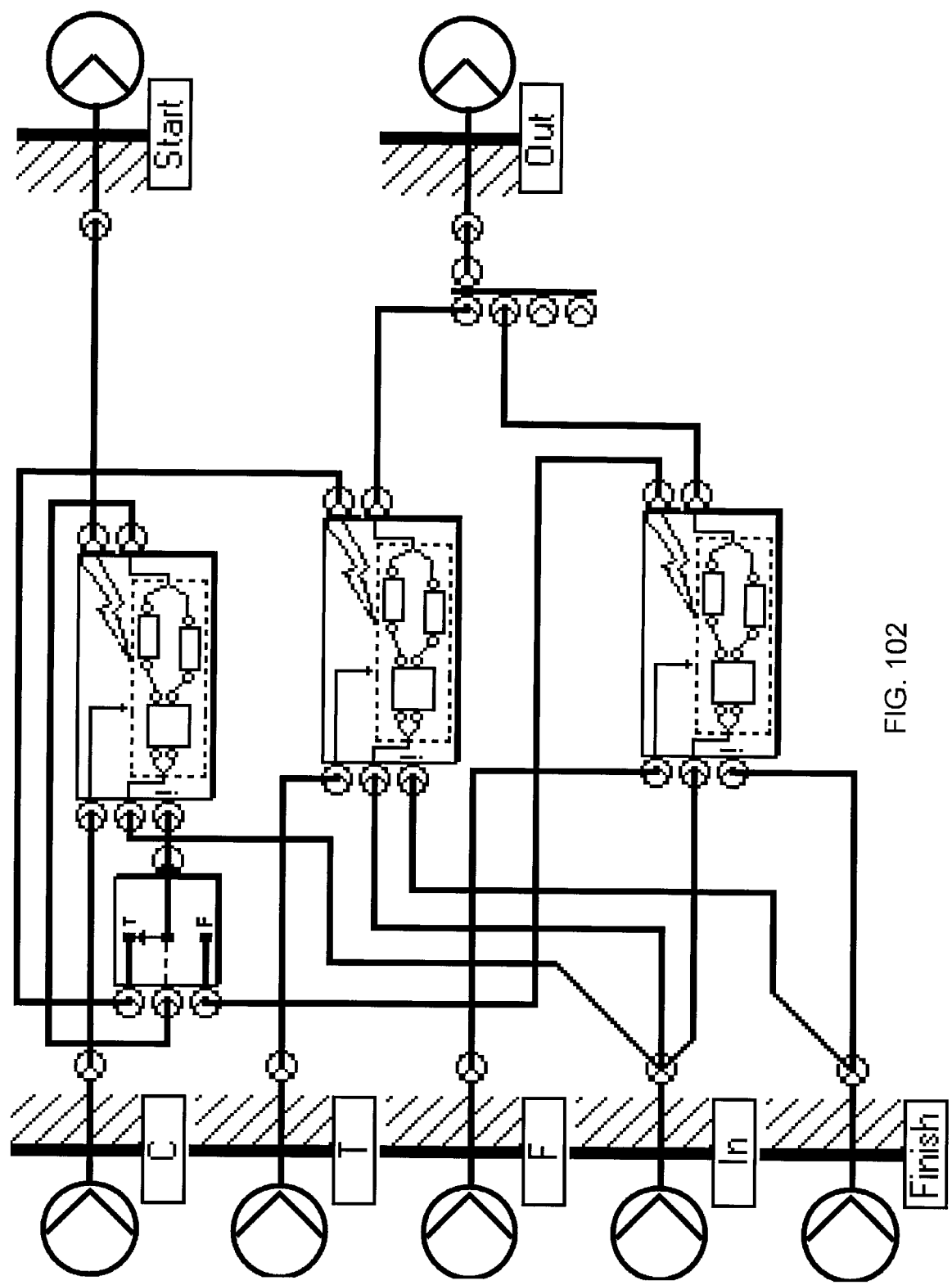

FIG. 102 shows the wiring diagram of a composite component which implements a conditional functional.

Figure 103:

FIG. 103 shows a constant computational component.

Figure 104:
Figure 105:

FIGS. 104 and 105 show two applications of a unary computational component.

Figure 106:
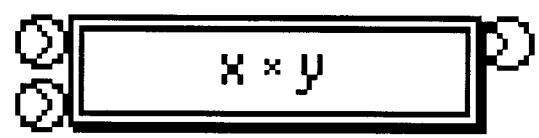

FIG. 106 shows a binary computational component used for multiplication.

Figure 107:
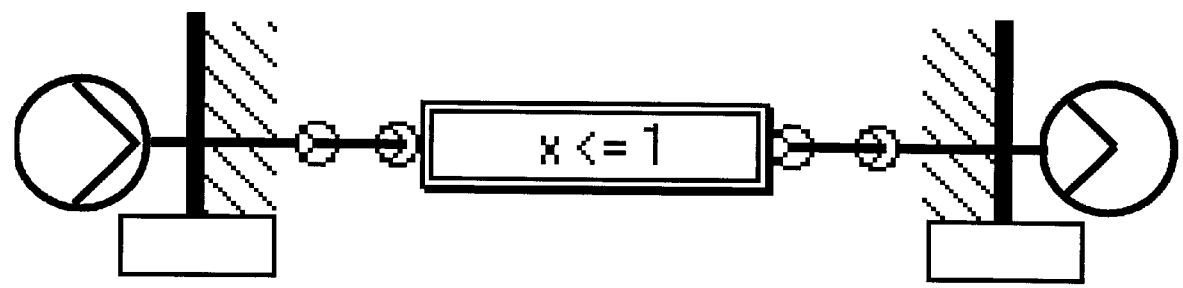
Figure 108:
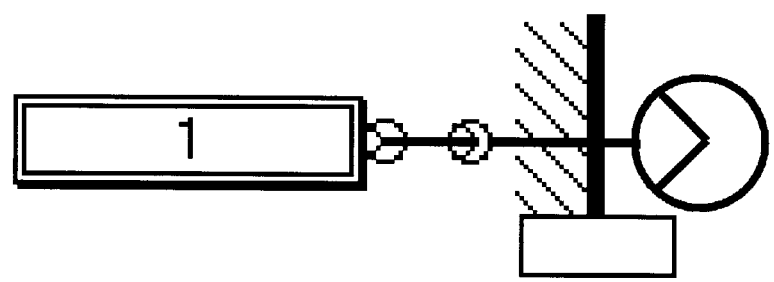
Figure 109:
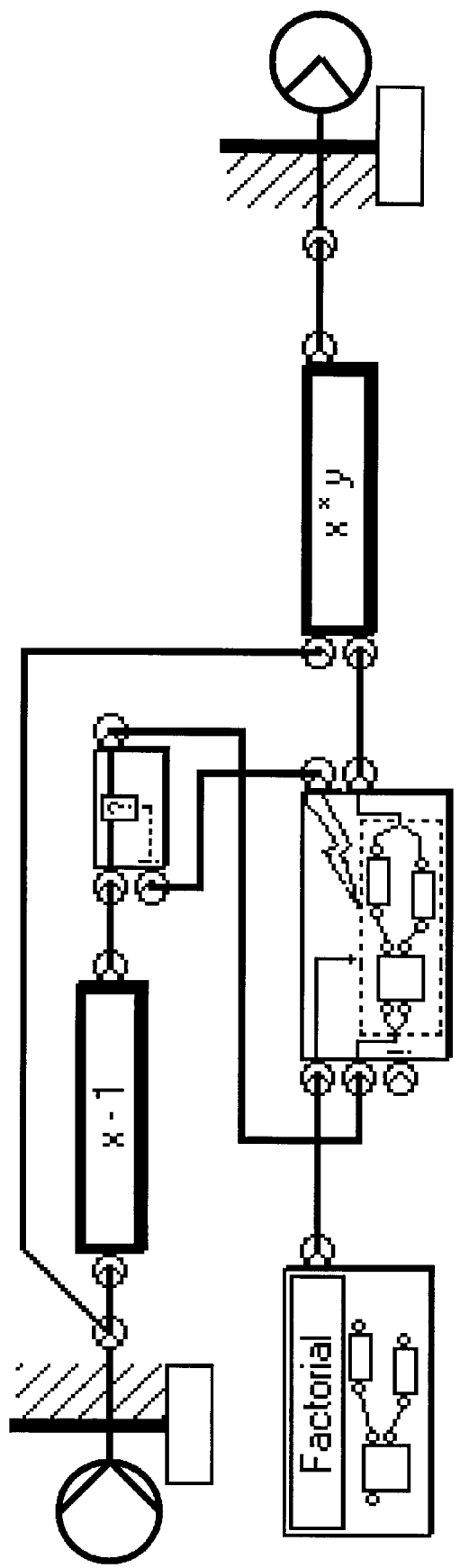

FIGS. 107, 108, and 109 show the wiring diagrams of the three function composite components used as inputs to the conditional functional component.

Figure 110:
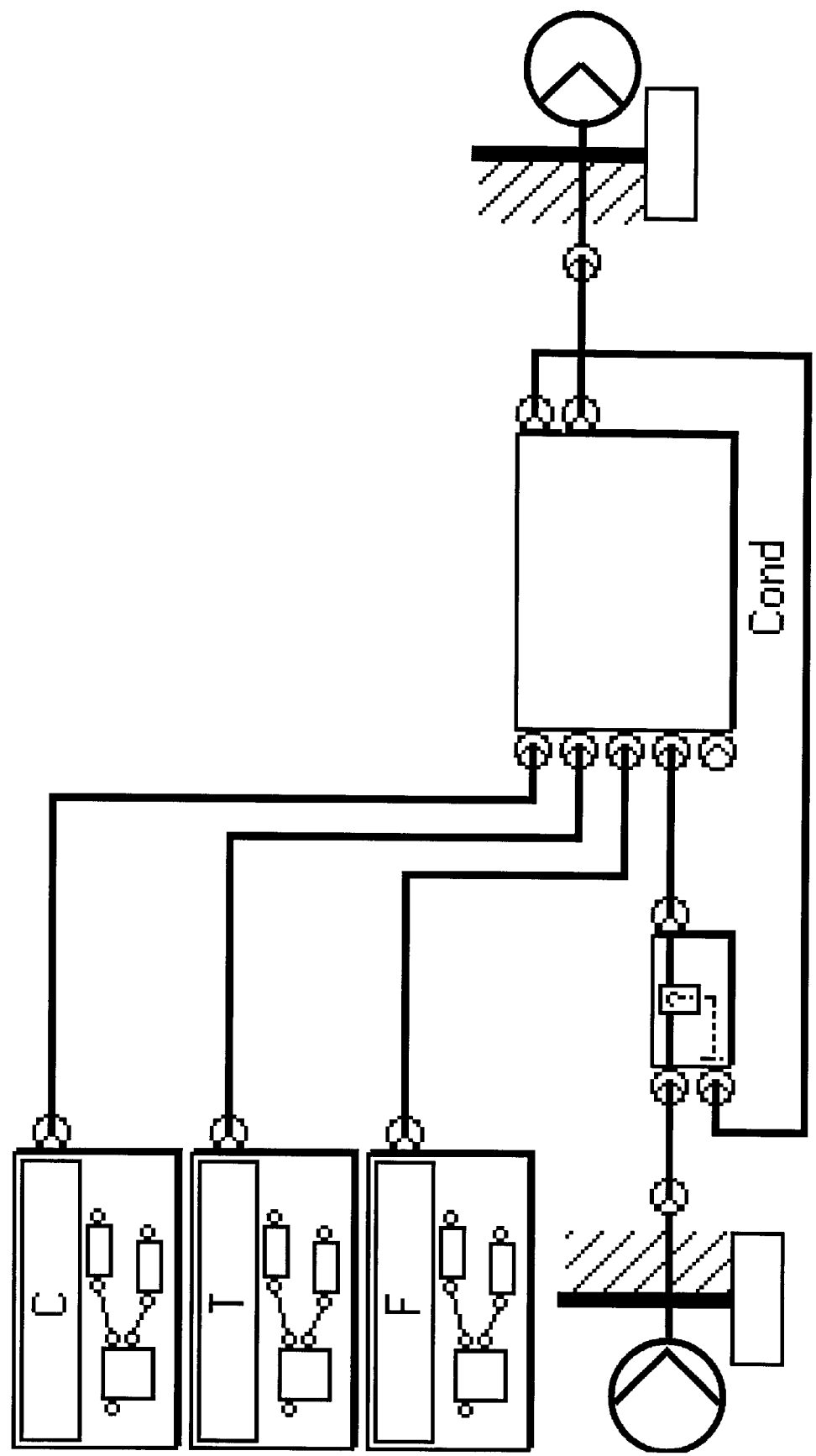

FIG. 110 shows the final definition of the factorial component.

Figure 111:
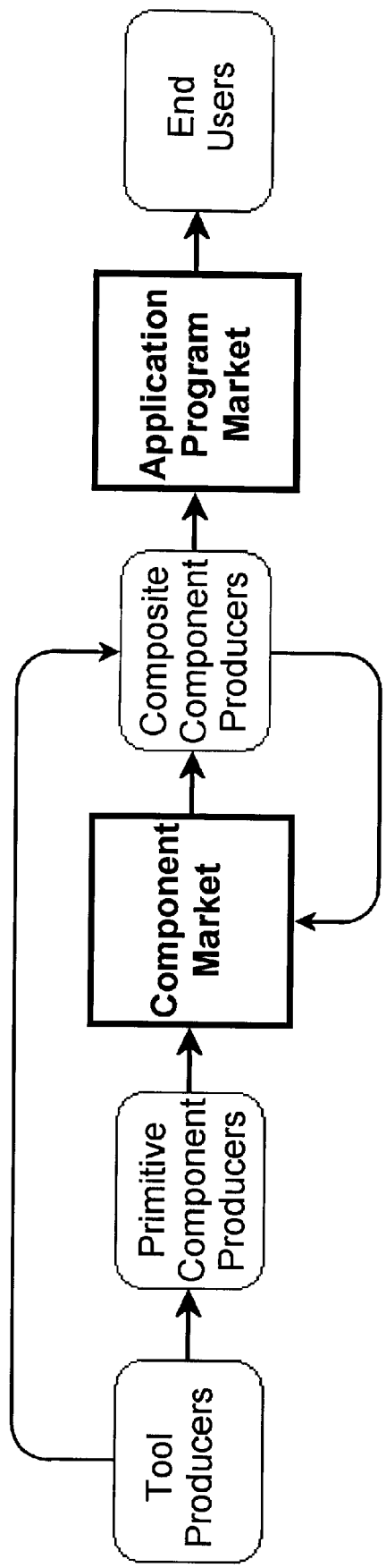

FIG. 111 shows a component market model.

Figure 112:
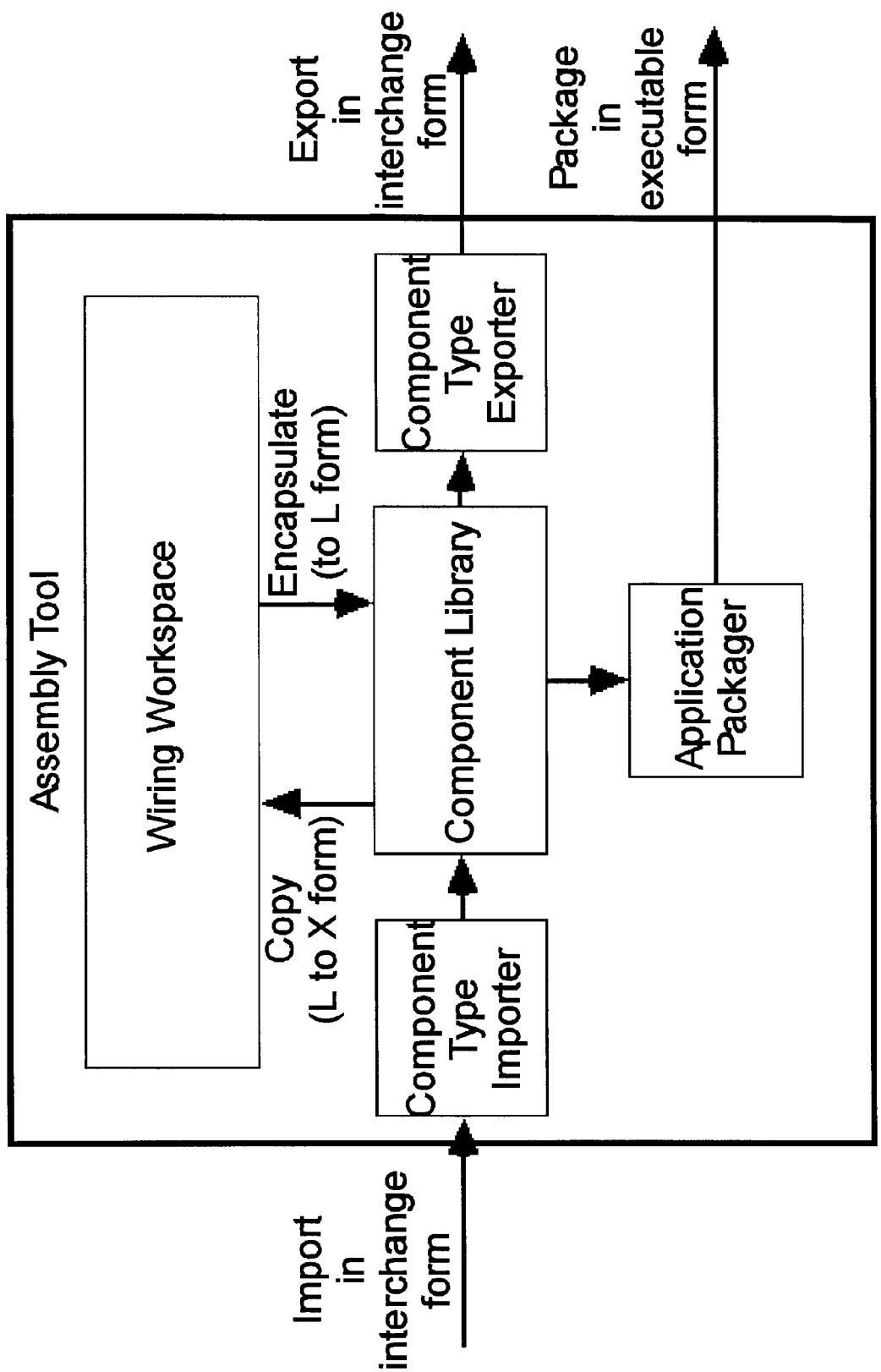

FIG. 112 shows a high-level block diagram of an assembly tool.

FIG. 113 shows, in tabular form, nine aspects of every component type.

Figure 114:
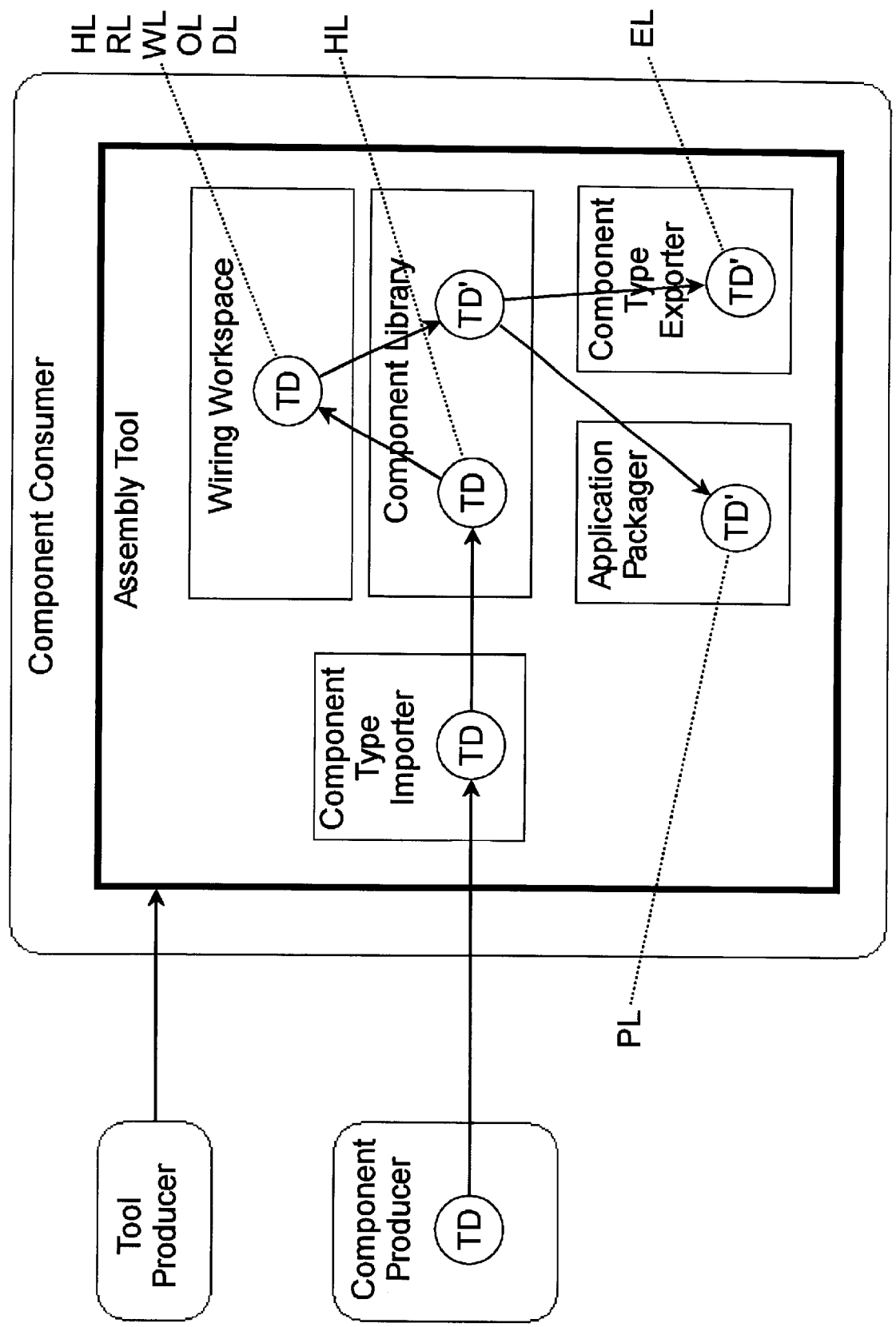

FIG. 114 shows the relationships among component producer, component consumer, assembly tool, and component type aspects.

Figure 115:
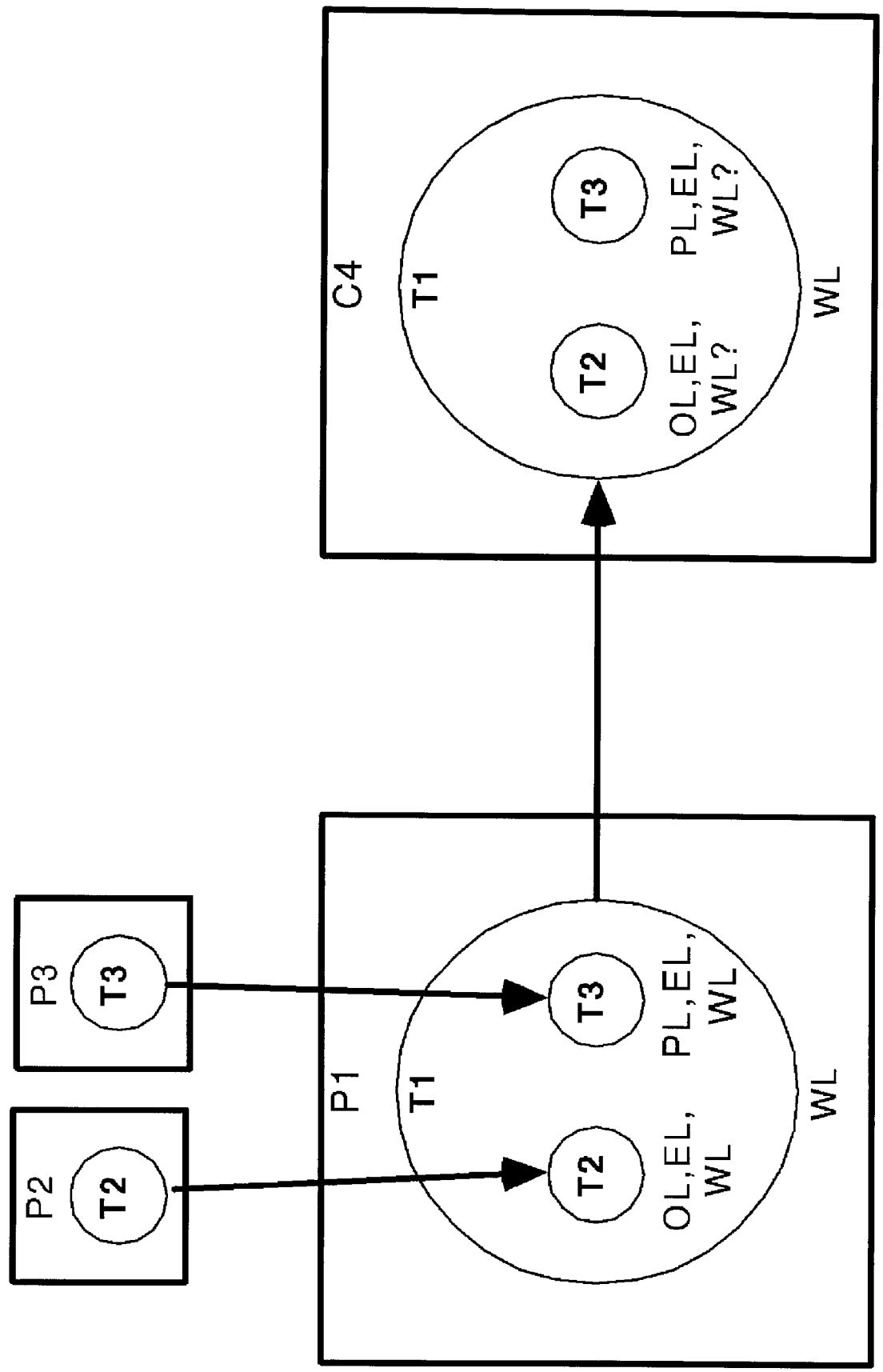

FIG. 115 shows, as an example, a transaction among three component producers and one component consumer involving three component types.

PART 1 STRUCTURE AND BEHAVIOR OF PROGRAMS

Section 1.1 Structure of a Program

A program (also called an application program or application) consists of component instances which are interconnected by wires.[1] (Where the context makes the language unambiguous, component instances will be called components.) Each component instance is an instance of some component type. [2] [3]

[1] The use of italics signifies the first significant occurrence of a term which has a particular meaning. Usually the term is defined, either explicitly or by implication, in connection with its first significant occurrence.
[2] The software model used in the descriptive language is object-oriented-programming. The term "type" is used as the terms "type" or "class" would be used in object-oriented programming. Similarly, "subtype" is used as "derived type" or "subclass" would be used in object-oriented programming.
[3] Object-oriented programming is the source of concepts used in the language of this description; that is not to say that the thing being described is object-oriented programming. However, there is one point of view in which what is described is an extension to object-oriented programming.

Figure 1:
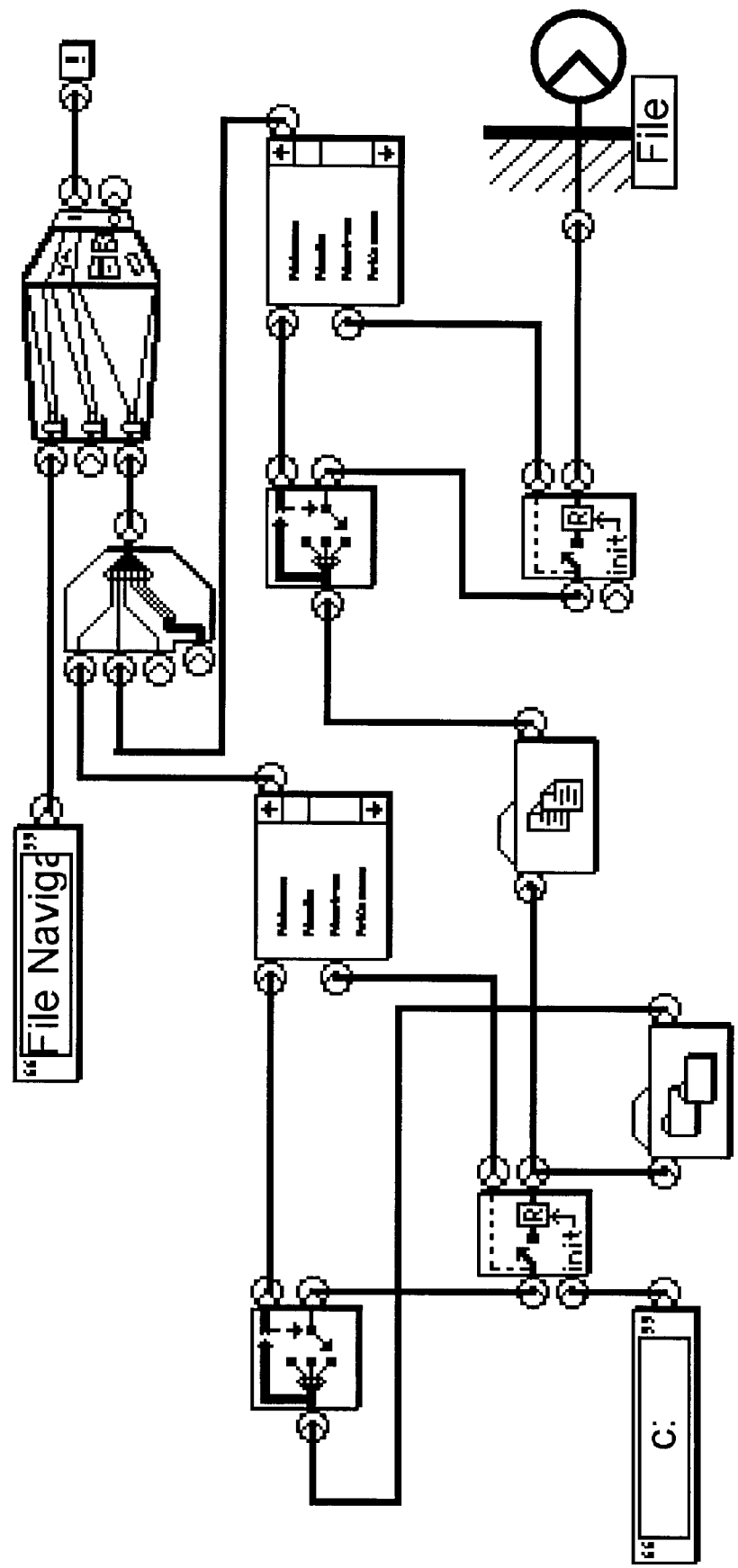
FIG. 1 is a diagram of an example program.

FIG. 1 shows a visual rendering of the structure of an example program. The program performs the principal function of a standard file dialog box, namely the coordination of a directory list box and a file list box in assisting the user to find and designate a file anywhere in a hierarchical file system. This example is analyzed in detail in Section 4.6.

Every component has an inside and an outside. The outsides of all components have a similar general plan, whereas the insides of different components might be constructed from different plans.

The construction plan (and, by implication, the functional design) for the inside of a component is determined by the component's type. Component types are divided into two broad categories, primitive and composite (see Section 3.1).

Figure 2:
FIGS. 2 and 3 are diagrams of a source connector and a sink connector.
Figure 3:

Here is the plan for the construction of the outside of every component. The outside of each component consists solely of zero or more connectors. Each connector is an instance of one of two types: the source connector type, whose instances are source connectors (sources), shown in FIG. 2, and the sink connector type, whose instances are sink connectors (sinks), shown in FIG. 3. The source connector type and the sink connector type are derived from a common connector type. The common connector type prescribes that every connector has a storage register (instance variable) called flow storage, which can hold a value which is either unambiguously invalid (such as a "nil" pointer), or is a reference to a flow object (to be described below). If a connector's flow storage has a valid reference to a flow object, the connector refers to the flow object.

Wire instances (wires) are instances of the wire type. Wires are the means by which components are interconnected. A wire has two ends. In any given program one end of each wire is uniquely identified with ("ends in" or "connects to") some source connector of some component.

The other end of the same wire is identified with some sink connector of some component (almost always a different component from the one at the other end of the wire). Each wire (considered as an object) must be able to supply the identity of the component and sink connector at its sink end.

Every wire must be connected to one sink and one source. Every source may be connected to any number of wires, including zero. Every sink may be connected to zero or one wire, but no other number of wires.

Section 1.2 Flow Objects

The type flow object is an abstract type whose subtype instances contain the objects processed by the program.

Every flow object (i.e., every instance of an instantiating subtype of flow object) has a protocol (i.e., a repertoire of oop messages[4] to which it responds), part of which is common to all flow objects (the common protocol), and part of which is specific to the particular type of which the flow object is an instance.

The common protocol contains, in addition to other messages to be discussed later, messages which return the following values. Unless the method by which a return value is determined is specifically implied by the text below, it may vary from flow object to flow object, and even from time to time for the same flow object. (Terms introduced in this list will be described below.)

1. Characterizing string. A short text string which characterizes the flow object as a member of a type, class, or category.
2. Distinguishing string. A short text string which distinguishes the flow object from other flow objects of the same type, class, or category. Each flow object has an instance variable, called the text distinguisher, which can store such a string; if the variable is empty the string is computed using a rule defined by the type of the flow object.
3. Characterizing icon. One or more small graphics ("icons") which characterize the flow object.
4. Distinguishing icon. One or more small graphics ("icons") which distinguish the flow object. Each flow object has an instance variable, called the icon distinguisher, which can store one or more such icons; if the variable is empty the appropriate

[4] An oop message is a message to an object in the sense of object-oriented programming. icon is computed using a rule defined by the type of the flow object.

5. Owner. Each flow object has an instance variable which can be invalid, or can contain an ordered pair (reference to component, reference to source connector on component); the component is called the owner of the flow object.
6. Dependent set. Each flow object has an instance variable which contains a (possibly empty) collection, containing no duplicates, of ordered pairs (reference to component, reference to sink connector on component). The components are called the dependents of the flow object. (A dependent of a flow object is a component which needs to be notified when some aspect of a flow object's value has changed. The owner of a flow object is the component with the responsibility to notify all the dependents when such a change occurs.)
7. Host set. Each flow object has an instance variable which contains a (possibly empty) collection, containing no duplicates, of references to components called the hosts of the flow object. (A host is a component which participates in some specific interaction with another component.)

The subobject of each flow object consisting of the instance variables named above which are common to all flow objects (namely the text distinguisher, the icon distinguisher, the owner, the dependent set, and the host set), together with the common protocol, is called the wrapper of the flow object.

There is a flow object type whose instances are called MO (meaningless object), and any connector can have a valid reference to an MO.

Figure 4:
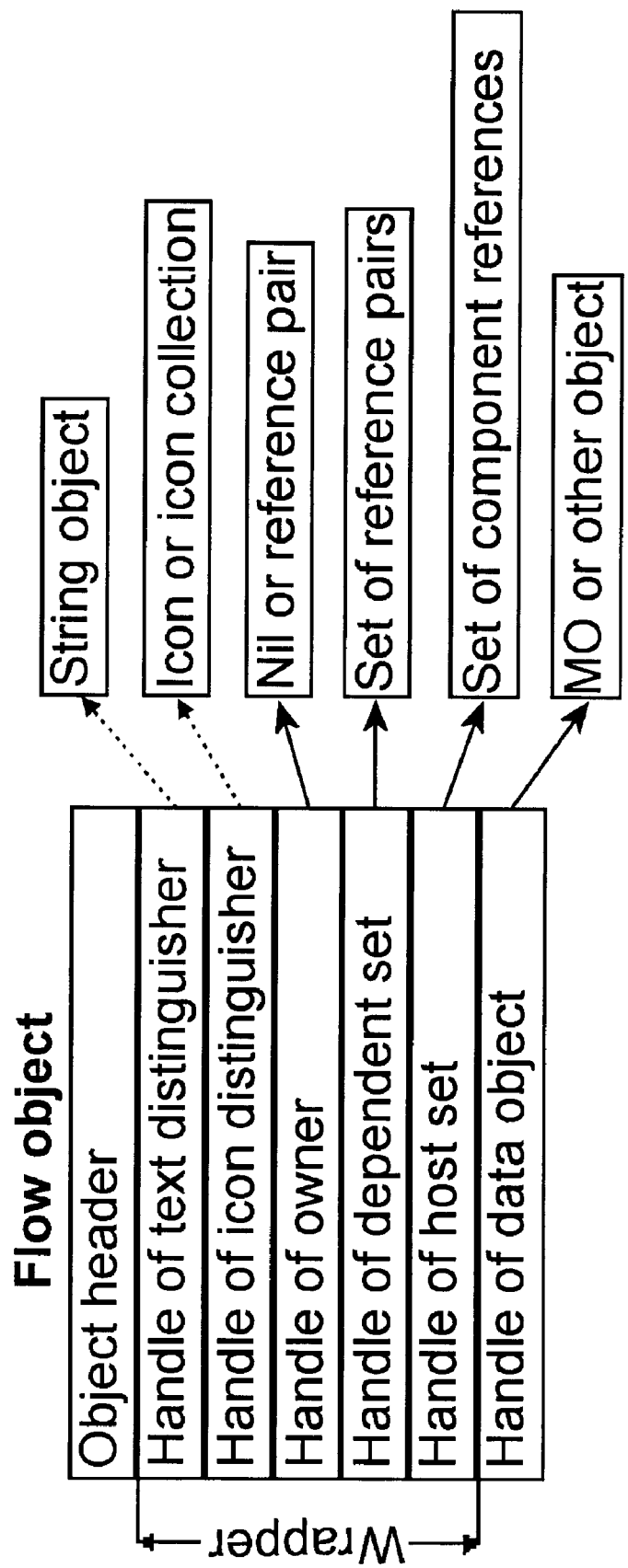
FIG. 4 is a diagram of a flow object.

FIG. 4 shows the data structure of a flow object as it might actually be implemented in a dynamic object-oriented programming system.

The following comments apply to FIG. 4.

1. Every object has an implementation-specific object header, which might be empty in some implementations. Other than the object header, the flow object consists of an array of pointers or handles. (A handle is an implementation-specific designator of a storage-occupying object which is location-invariant, thus permitting the object to be moved while the unchanged handle remains valid.)
2. The arrows point to the objects denoted by the handles. A dotted arrow indicates that a handle might be nil, i.e., it denotes no object (or, in some implementations, it denotes the nil object).
3. Each of the two reference sets might be empty. (The host set is typically empty.)
4. The structure of a component reference is unspecified here.
5. The structure of the thing stored in a connector as a flow object reference is also unspecified here. It might, for example, be a handle.
6. Note that the data object is not in the flow object. This permits multiple flow objects "containing" the same data object. In particular, it permits making copies of flow objects which "contain" the same data object.
7. Each MO is an instance of a unique data type. What distinguishes the type of MO is simply that, under a design rule discussed in Section 2.2, all components must accept MO as a value at all sinks.
8. The object labeled "MO or other object" might not be a data object but might be a reference to a data object. The form of the reference is unspecified. (This additional level of indirection might be required in a distributed-object system.)

Section 1.3 Communication Acts

The behavior of a program is described in terms of communication acts. [Note: in conventional terms, the behavior of a program is described by the changes which occur on its interface(s) to the world outside the program. We will from time to time be relating this external-interface behavior (which we can call external behavior) to the behavior being presently described (which we can call internal behavior).]

The internal behavior of a program is a sequence of communication acts. (There can be generalizations of this model in which some communication acts may be considered to occur concurrently.) Every communication act occurs between two components, one called the sender and one called the receiver.

Each communication act performs one or the other of two distinct communication-act functions: routing and message passing. Of the five distinct types of communication acts, the routing function is performed by the flow communication act, and the message-passing function is performed by the notify owner, notify dependents, notify hosts, and pick communication acts.[5]

[5] Message-passing communication acts are not oop messages. (They might, however, be implemented using oop messages.) The words "communication act" will be retained in places where they will help to eliminate possible ambiguity of interpretation.

Section 1.4 The Routing Communication-act Function

The total network of any particular program is the directed graph whose nodes are all the components of the program and whose branches are all the wires of the program. The direction of a branch is from source to sink. (The total network looks like the wiring diagram, except that all the connectors of each component are lumped together into a single node. It is possible for the total network of a program to contain cycles, as the example of FIG. 1 does.)

The route of a flow object is a subgraph of the total network such that 1. the nodes of the route are in one-to-one correspondence with that subset of all components, each component of which subset has some connector which refers to the flow object, and
2. the branches of the route are in one-to-one correspondence with that subset of all wires, each wire of which subset has a connector at the source end which refers to the flow object and a connector at the sink end which refers to the flow object.

Flow. Communication acts called flows determine the routes of flow objects, which in turn make the flow objects available at the sinks of certain components for processing. A flow copies a flow object reference from a source connector to a sink wired to that source and makes the receiving component aware of the arrival. The flow object itself is neither moved nor copied. The component containing the source connector may be said to be "sourcing" the flow or the flow object, and the other component may be said to be "sinking" the flow or the flow object.

One or more flows from a particular source connector is implemented as follows.

1. At some point in its processing or creation of a flow object and prior to initiating the flow(s), the sending component must place a flow object reference in the flow storage of this source connector. It does this by sending an assign flow object reference or an assign hosted flow object reference oop message to that source connector, with the flow object reference as a parameter (see below for details).
2. Subsequently, the sending component begins the flow(s) by sending a send flow oop message to the source connector (see below for details).

Assign flow object reference/Assign hosted flow object reference. When a source connector receives an assign flow object reference or assign hosted flow object reference message, it performs the following two steps.

1. It checks whether its flow storage validly references a flow object; if so,
    a. (in the case of the hosted variant) it removes any reference to its component from the referenced flow object's wrapper's host set, and
    b. for each sink connector wired to it, the source sends this sink an invalidate sink connector oop message (see below for details).
2. Then the source connector puts the flow object reference in the message parameter into its flow storage, making it valid. In the case of the hosted variant, it adds a (nonduplicate) reference to its component to the flow object's wrapper's host set.

Invalidate sink connector. When an invalidate sink connector oop message is received by a particular sink connector on the outside of a particular component, the connector checks whether its flow storage is valid. If not, the operation is complete. If the flow storage contains a valid reference to a flow object, a. the sink removes any reference to its component from the referenced flow object's host set,
b. the sink removes any reference to its component and itself from the referenced flow object's dependent set,
c. it sends a sink connector invalidated oop message to its component with the following two parameters: the flow object reference in its flow storage, and a reference to itself, and
d. it invalidates its flow storage.

(A component's response to the sink connector invalidated message is discussed in Section 2.2. This message is typically ignored.)

Send flow. The source connector iterates over the collection of wires connected to it, sending, for each wire, a receive flow oop message, with the flow object reference as a message parameter, to the sink connector at the other end of this wire.

Receive flow. The sink connector places the flow object reference into its flow storage. (The flow storage is already invalid.)

The sink connector then sends a flow received oop message, with an identifier of the sink connector as a message parameter, to its component. (A component's response to the flow received message is discussed in Section 2.2. It will be discussed in Section 3.4 that the sink connectors associated with composite components do not behave as described here.)

Section 1.5 The Message-passing Communication-act Function

A communication act message is passed from a sending component to a receiving component. Message passing is defined with respect to a given flow object, and the sender and receiver of the message are both on the route of the flow object.[6] Indeed, it is a function of the flow to put in place the component and flow-object references which are used during message passing.

The four message-passing communication acts are notify owner, notify dependents, notify hosts, and pick.

Notify owner. The notify owner communication act is implemented as follows. The sending component sends a notify owner oop message (with optional parameter(s)) to a flow object referenced by one of the component's connectors. That flow object sends an owner be notified oop message (with the owner's source as the first parameter and any other parameter(s) following) to the component referenced in the owner instance variable of its wrapper.

Notify dependents. The notify dependents communication act is implemented as follows. The sending component (typically the flow object's owner) sends a notify dependents oop message (with optional parameter(s)) to a flow object referenced by one of the component's connectors. For each (component, sink) element in its wrapper's dependent set, the flow object sends a dependent be notified oop message (with the named sink as the first parameter and any other parameter(s) following) to the referenced component.

[6] Note that the route of a flow object serves to define at run time the scope of candidate recipients of a message-passing communication act analogously to the way, in a dynamic object-oriented programming language, the ancestor-class chain of the receiving object of an oop message performs this function.

A dependent of a flow object is a component which needs to be notified when some aspect of a flow object's value has changed. (The additional parameters of the dependent be notified message might contain specific information about what aspect of the flow object has changed.)

Notify hosts. The notify hosts communication act is implemented as follows. The sending component sends a notify hosts oop message to a flow object referenced by one of the component's connectors. The first parameter of the notify hosts message is the name of the oop message to be sent to the receiving component(s); there may be additional parameter(s). For each element in its wrapper's host set, the flow object sends to the component named in this element the message whose name is the first parameter (with any additional parameter(s) attached to the message). If the host component does not recognize the message, this is not an error, simply a null operation. (During this iteration, each component should receive this message at most once; this is assured by the no-duplicate property of the host set.)

The designer of a component decides whether the component is to be a host of a flow object which arrives at a particular sink or which it is sourcing at a particular source. If so:

1. If the connector is a source, the component uses the assign hosted flow object reference variant when setting up a flow out of the source.
2. If the connector is a sink, the component sends an identify host oop message to the sink. This adds a (nonduplicate) reference to the component to the referenced flow object's wrapper's host set.

Pick. The pick communication act is associated only with flow objects of the type DoIt (pronounced "do it"); it is implemented as follows. The sending component sends a pick oop message (with optional parameter(s)) to a DoIt flow object referenced by one of the component's connectors. The DoIt flow object contains instance variables which reference the receiving component (called the DoIt server) and the name of the message to be sent to the DoIt server, with space for additional parameters. In addition, a DoIt has a Boolean instance variable which carries enabled/disabled state information. When the DoIt receives a pick oop message, if and only if the DoIt is enabled, the named message, with the optional parameters attached, is sent to the DoIt server.

Section 1.6 Interpretation of Flows; The Projection Paradigm

Figure 5:
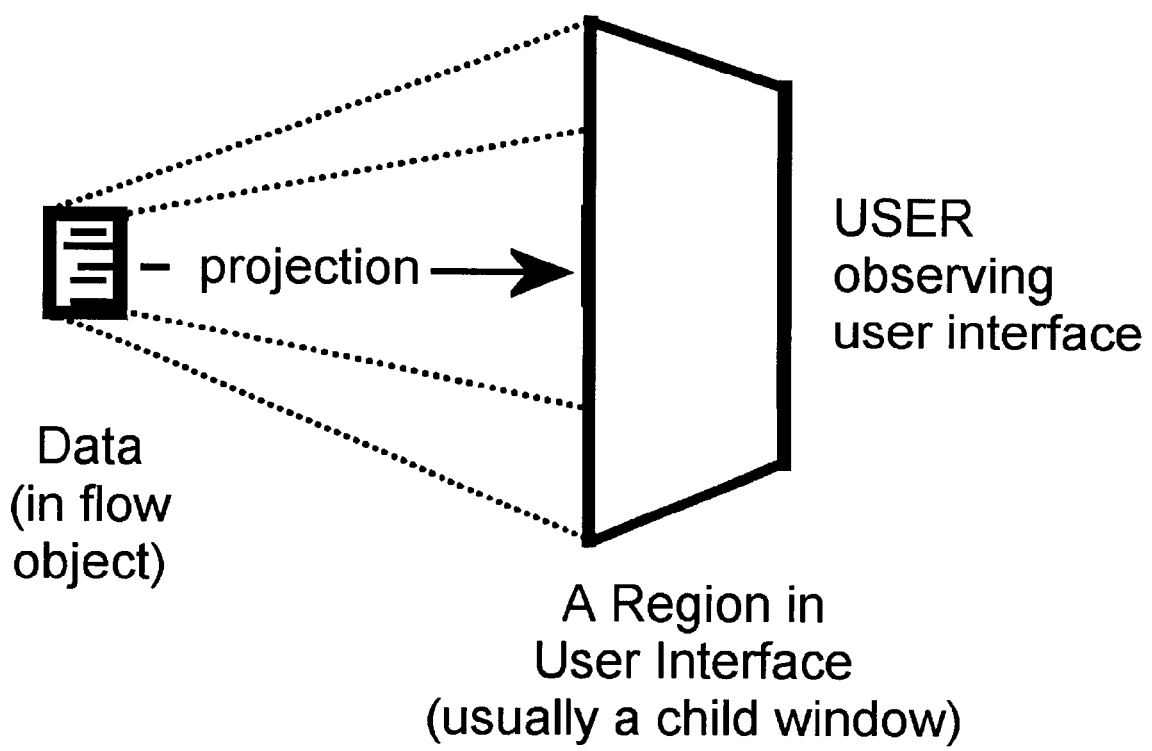
FIG. 5 illustrates the projection of data onto the user interface.

It is important to note that a flow goes in only one direction on each wire, from source to sink. Informally, if components are drawn with sinks on their left and sources on their right, this means that the general movement of flows is left-to-right across the wiring diagram of the program. The components in which flow objects end up are often user-interface components. This is a major aspect of the relationship between internal behavior and external behavior: flows push data (more correctly, flows push references to flow objects referencing data) out to the user interface, where the flow objects' data are presented to the user. (See FIG. 5.) For example, a flow object which carries a body of formatted text may end up in a component whose function is to display formatted text in a child window. (Keep in mind that flow objects do not move; only references move.)

This interpretation in which the purpose of flows is to push data out to the user interface will here be called the "projection paradigm," which suggests that the program is analogous to a photographic projector projecting data onto the user-interface "screen" at the right side of the wiring diagram. The following two points hold for the projection paradigm. (Much of the subsequent discussion in this description is directed to making the following two points concrete.)

1. The projection paradigm is a generally applicable model of applications with display-out/event-in user interfaces.
2. Applying the projection paradigm to programming tools leads to a model of program development which is distinct from the sequential file-processing model associated with text editors, compilers and linkers. The projection-based model does not contain the traditional distinction between the time at which program preparation occurs and the time at which the prepared program is run. Rather, these two operations can be thought of as occurring concurrently. Thus, the projection paradigm contains within it a theory of program development in which "source-level debugging" occurs naturally.

A major distinction of this invention is the way the bidirectional control and communication requirements of display-out/event-in applications are implemented within a formal system with the following elements.

1. Components and the way they are wired determine unidirectional flows.
2. The unidirectional flows determine which components make reference to which flow objects, and which flow objects make reference to which components.
3. Control and communication occurs across chains of these reference paths, from component to flow object and from flow object to component, in such a way that the process of component design is strongly decoupled from the process of component application.

Section 1.7 Interpretation of Picks

A DoIt is a relatively simple flow object for signaling to a DoIt server that a process specified by the DoIt is to be invoked.

In the terms of the projection metaphor, DoIts often end up in user interface components which implement such user-interface control elements as buttons and menu items. A DoIt can be viewed as a mechanism by which a server component which implements an event-triggered function projects itself onto the user interface. The enabled/disabled instance variable of the DoIt shows up in the user-interface element as "graying" or "disabling" of a button or menu item. When the user-interface item is enabled, pushing the button or picking the menu item initiates the server component's function. (Section 6.3 discusses an example in which variable routing of DoIts accomplishes what is called branching in conventional programming.)

Section 1.8 Events

An event is not a communication act, but is similar in that it has a sender and a receiver. The sender of an event, however, is outside the program structure described here (for example, the sender might be the operating system in whose environment the program operates). The receiver of an event is a component. For example, a user-interface component whose function is to show a button and which has a sink connector which receives a DoIt, picks that DoIt in response to receipt of a button-push event from the user-interface management system. It is important to note that the possibly quite complex sequence of communication acts generated by that pick has completed before control returns to the button component from the pick oop message.

Section 1.9 Interpretation of Notify Owner and Notify Dependent Communication Acts Owner and dependent notifies are used to propagate data changes in such a way as to maintain consistency throughout the wiring diagram and the user interface. For example, user-interface components which project data onto the user interface are dependents of the flow objects containing those data. When such a component receives a dependent be notified message, it looks at the flow object referred to in the flow storage of the connector specified in the message and refreshes the user interface.

User-interface components can also change data. For example, a dialog box can cause an element of a database to be changed. If the change at the dialog is confirmed (the OK button is pushed) the dialog sends a notify owner message to the flow object being projected onto the dialog. The owner receives from the flow object an owner be notified message, and it sends a notify dependents message back to the flow object. Note that the owner does not need to change the data; the dialog has already done that.

The "coupling protocol" with which owner and dependent notifies maintain consistency of data across a wiring diagram is discussed in more detail in Section 6.4.

To avoid race conditions or duplicate updating, each dependent sending a notify owner sets a local blocking flag at the beginning of the notify owner communication act and resets the flag after control returns from that communication act, the purpose of which blocking flag is to disable the response of the component to the dependent be notified message which the owner may cause to be issued. The duration of the notify owner message sent by the dialog component contains entirely within it the durations of all dependent be notified messages sent by the owner.

A component is never an owner and a dependent of the same flow object.

Figure 6:
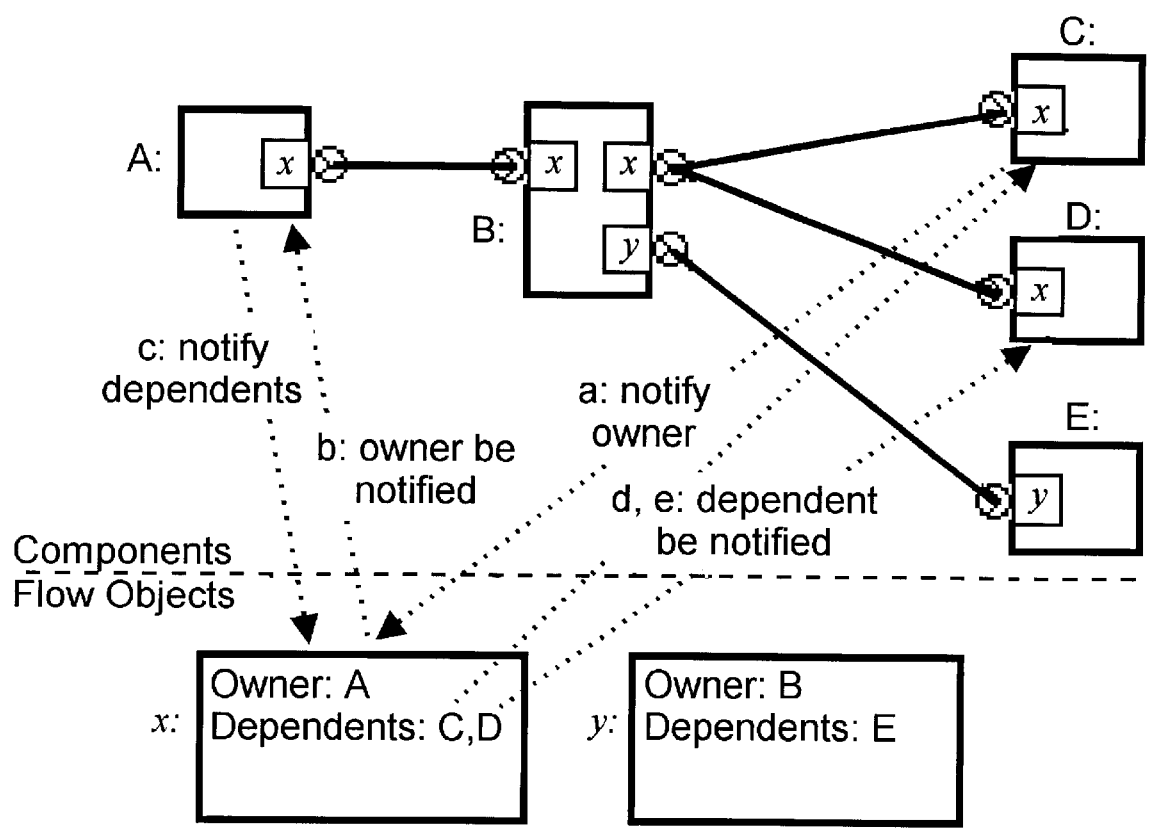
FIG. 6 illustrates the coupling protocol.

FIG. 6 shows a typical application of the coupling protocol. There are components A, B, C, D, and E, and flow objects x and y. A is owner of x and B is owner of y. The little squares next to the connectors reveal the contents of flow storage. The sequence of steps is as follows.

1. C changes x directly and has recomputed its outputs based on the new value of x. C is thus obliged to notify the world. It does this by sending message a: notify owner to x.
2. x knows that A is its owner, so sends message b: owner be notified to A.
3. Because the owner be notified message named the source connector referencing the flow object which had changed, A knows to send c: notify dependents to x.
4. x knows that its dependents are C and D, so sends out messages d and e: dependent be notified to C and D.
5. C does not act on the message because it has set its blocking flag before sending message a. (C will reset its blocking flag after control returns from message a.) D, however, has just learned about the change to x, so recomputes its outputs based on the new input.

Section 1.10 Interpretation of Notify Hosts Communication Acts

Host notification protocols are used to handle whatever action-at-a-distance communication between components is not accommodated by the preceding communication acts. In effect, host notification protocols cover those (relatively rare) forms of intercomponent coupling which are not naturally accommodated by the projection metaphor. An example will be discussed in Section 6.6.

Part 2 Program Sequence Control

Section 2.1 The Steady and Busy States of Applications

Each component spends most of its time in reset state, sitting around waiting for a communication act. When it gets such a stimulus, it responds immediately. This component-type-specific response can include sourcing flow objects, performing message-send communication acts, and (for user-interface or system-interface components) changing the appearance of the application or sending messages to the environment. Similarly, if a component is defined to be sensitive to certain kinds of events, it responds immediately to those events, with the same repertoire of potential responses. Thus, the application spends most of its time in a steady state, and then occasionally it is very busy pushing things around (the busy state), then it gets quiet again in steady state.

During the application's steady state, when all components are in reset state, the relationships between inputs and outputs of components are defined by the specifications of the components. During the busy state, component input-output relationships are in transition. Here is a fundamental property of the model: The only thing that causes the application to switch from the steady state to the busy state is receipt of an event. (Explanation: If it were anything other than an event, it would have come from a component inside the application, which is then, by definition, already in busy state.)

In a processing environment with a single processor, the behavior of an application is sequential. That is, if a component has a list of communication acts to perform in response to an input, it does them sequentially, waiting for the completion of the response to each act before beginning the next act. Moreover, each communication act that it performs does not complete until all the actions which that communication act provokes are complete, Thus, if component A sends a flow to component B (where B has only one sink and therefore responds immediately to the flow; see below), the lifetime of the response behavior of component B is considered to be nested inside the lifetime of the flow act performed by component A. Thus, during the busy state all responses are nested inside the response of a component which is responding to an event. Such nesting implies a stack of communication acts. Since in a single-processor system an event-receptive component will only receive an event when the application is in the steady state, event responses are always and only the outermost responses in the response stack.

Section 2.2 Sink State Change

There are two cases, in which a component is notified that the state of one of its sinks is changed, that we must consider.

1. Propagation of new invalidity of an existing input.

The component receives a sink connector invalidated oop message from one of its sinks. This is the case when an input becomes invalid, and the previously valid input has caused the computation of outputs which are now likely to be incorrect. By design, the sink connector invalidated is always followed by a flow received oop message (see Section 1.4).

Normally, the component ignores the former and responds to the latter.

2. Propagation of a new valid input. The component receives a flow received message from one of its sinks, or the component receives a dependent be notified message with that sink as the first parameter. These two conditions lead to what is called input change. This is the case when an input is made valid with a flow object for which the output response of the component must be computed. The following discussion covers this case.

Flow received. If by design the component is a dependent of the flow object arriving at the sink, the pair (component, sink) is added to the flow object's wrapper's dependent set. Then, continue at input change.

Dependent be notified. Continue at input change.

Input change. If a component has only one sink connector, the component computes its new output(s) immediately (including side effects such as user-interface changes). Then, for the new output value at each source, the component executes the new-output procedure.

New-output procedure. If (1) the reference to the flow object of the new output at the source connector is unchanged, and (2) the source was valid previous to this new output, then the component sends a notify dependents message to the flow object referenced by the source. Otherwise, the component initiates a flow from the source using the new output value.

What if the component has more than one sink? Because of sequentiality, it will receive input changes one at a time. When does it respond to all the input changes which it is going to get? Neither of the following assumptions about the arrival of input changes is necessarily a valid assumption.

1. The component knows which subset of its sinks is going to receive input changes during this particular busy state. (For example,[7] during a particular busy state a Direct Selector component might receive a new index at its index sink and might, or might not, receive a new collection at its collection sink. Furthermore, if it receives both, there will be a transient nonsense condition after the first, and before the second, receipt.)
2. The component knows in what order the input changes will arrive.

Therefore, the component does not know, by itself, when the "last" input change has arrived so it can begin its response.

Inputs to some sinks of multi-sink components can properly lead to immediate responses. For example, by design, input to either sink of a List Box component can properly be processed immediately, whereas input to a sink of a Collector with more than one sink wired should not necessarily be processed immediately. The following discussion concerns the latter case, when a component receives an input change, and the computation in response to that input change requires at least one well-defined input at another sink.

[7] The forward references to yet-to-be-defined component types can be ignored on the first reading.

Here is how the response to an input change of a multiple-sink component is initiated. There is a pending-action list associated with the program. Each multi-sink component which, because of its design, may need to wait for multiple inputs, contains a single procedure which responds to the set of sink inputs after all inputs which are going to change have changed; this procedure is called the component's complete-input-response procedure. When such a multi-sink component receives an input change with respect to a sink connector, the component adds a reference to itself to the end of the program's pending-action list. (The list does not contain duplicates; any attempt to add a duplicate to the list will do nothing.) That's all the component does. (The sink connector, of course, has stored a valid reference to the received flow object.) The component has now left reset state and is in pending state.

The program is an object which consists of a (typically composite) component (see Section 3.5), plus the pending-action list.

Unwind-pending procedure. The program has an unwind-pending procedure which does the following.

1. Examine the pending-action list. If it is empty, exit the procedure.
2. Otherwise, remove the first component reference from the pending-action list.
3. Execute the complete-input-response procedure of the referenced component.
4. Go back to step 1.

Note that step 3 can add to the pending-action list, so a definition of the unwind-pending procedure which simply iterates through a snapshot of the list would be incorrect.

Complete-input-response procedure. This is the general outline of every component's complete-input-response procedure.

1. The component examines whether a computation of outputs can be performed with the existing set of valid sinks. If so, the computation is performed (including side effects such as user-interface changes), the new-output procedure is performed for each source with a new output, the component returns to reset state, and the procedure exits.
2. Otherwise, the component adds a reference to itself to the end of the pending-action list, the component remains in pending state, and the procedure exits.

The program's unwind-pending procedure is called at the end of the event-response procedure in each component which is event-sensitive.

Event-response procedure. Here is what happens when an event arrives at an event-sensitive component.

a. The application is in steady state before the event-sensitive component receives the event. The transition to busy state occurs when the operating system gives control to the event-sensitive component.
b. The response of the component to the event is to execute a sequence of one or more communication acts, as well as possible component-specific processes (such as updating a user-interface display).
c. At the end of this sequence of acts the pending-action list may be nonempty. If so, that means that there are some multisink components which are in pending state. To negate this condition, the event-sensitive component always calls the program's unwind-pending procedure. If the program is correct, the net effect of calling the unwind-pending procedure is to empty the pending-action list and to leave all components in the reset state.
d. Finally, control is returned to the operating system, which return of control defines the end of busy state and the beginning of steady state.

The plan presented here guarantees that each component will be left in reset state when the application re-enters steady state. However, a nonterminating loop, in which a component keeps adding itself to the pending-action list because it does not have sufficient valid inputs, is possible. This means that the inputs to the component which keeps adding itself to the pending-action list are incorrectly wired.

This nonterminating loop condition can be avoided by adopting a component design rule which requires all components which can cause such a nonterminating loop 1. to accept and meaningfully respond to MO on all sinks, and
2. to terminate the response to every input change in reset state, sourcing MO as necessary where meaningful outputs cannot be computed.

Under this design rule the busy state will always terminate; the cost of the design rule is the possibility of some spurious recalculations. Also under this design rule, flashing can be minimized by requiring that user-interface components not change their displays when receiving MO for display.

This design rule is assumed in the following discussions of specific components. Under this design rule, the semantics of MO are as follows: a component reacts to an MO input at a sink the same as if that sink's flow storage were invalid.

Section 2.3 Clear-before-send Rule

Receipt of an oop message resulting from a pick, notify owner, or notify hosts is not a sink state change in the above sense. In general, a component responds immediately to receipt of such a message; however, flows may need to be complete before the response is begun. (The use of a DoIt for synchronization, for example, requires that all flows be complete before the DoIt begins its action.) For this reason we adopt the clear-before-send rule.

Clear-before-send rule. Every component which initiates a message-passing communication act must first call the program's unwind-pending procedure. (The exception occurs when it is known that no component can be in pending state, for example, the button component which picks a DoIt immediately after receiving an event.)

Thus, the program's unwind-pending procedure is called under two conditions:

1. as the result of application of the clear-before-send rule, and
2. at the end of the event-response procedure in each event-sensitive component.

Section 2.4 An Example of Change Propagation

Figure 7:
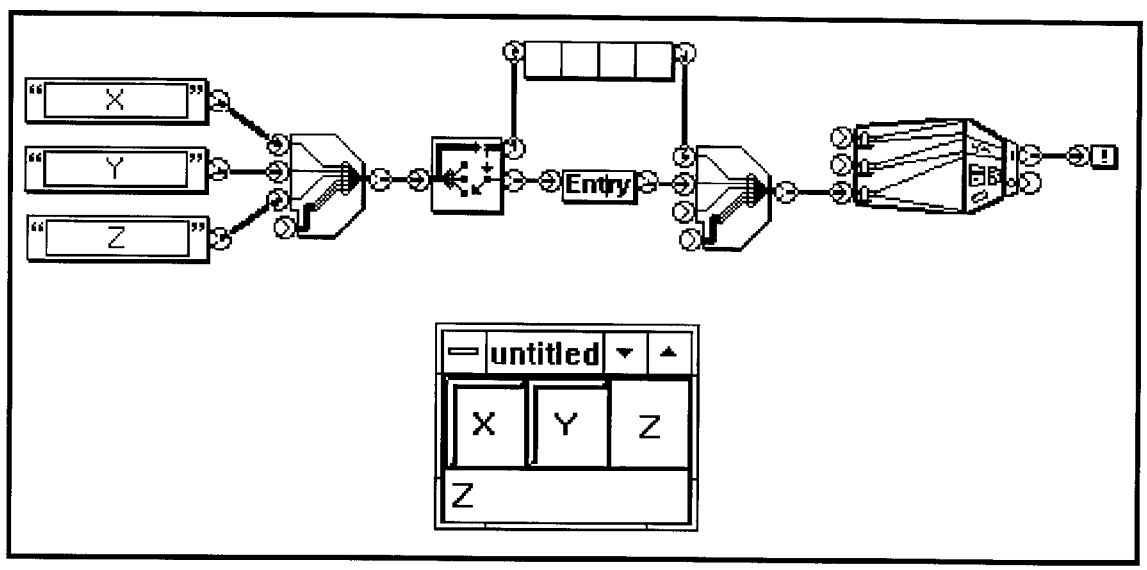
FIG. 7 shows an example program.

FIG. 7 shows a display captured from an assembly tool, with the wiring diagram above and the window created by the running program below. (A full understanding of this example will require a second reading after a reading of the component definitions in Part 4.)

The three strings, "X", "Y", and "Z", sourced by the three Text Source components at the left are grouped into a collection by the left-hand Collector component. Their three text distinguishers, X, Y, and Z, show up in the child window produced by the Horizontal Palette component (at the top). In the window displayed by the running program, the Z button is depressed, causing the third element of the collection to show up in the text entry child window, seen below the palette in the running-program window.

Figure 8:
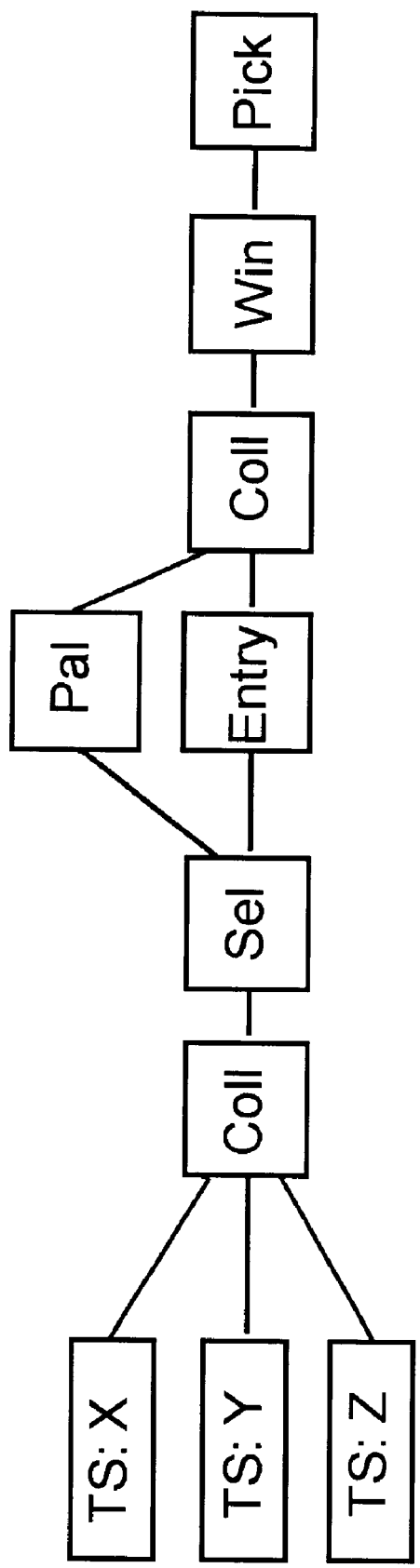
FIG. 8 shows the total network of the example program.

FIG. 8 shows the total network of the program. (The components are labeled informally.)

Figure 9:
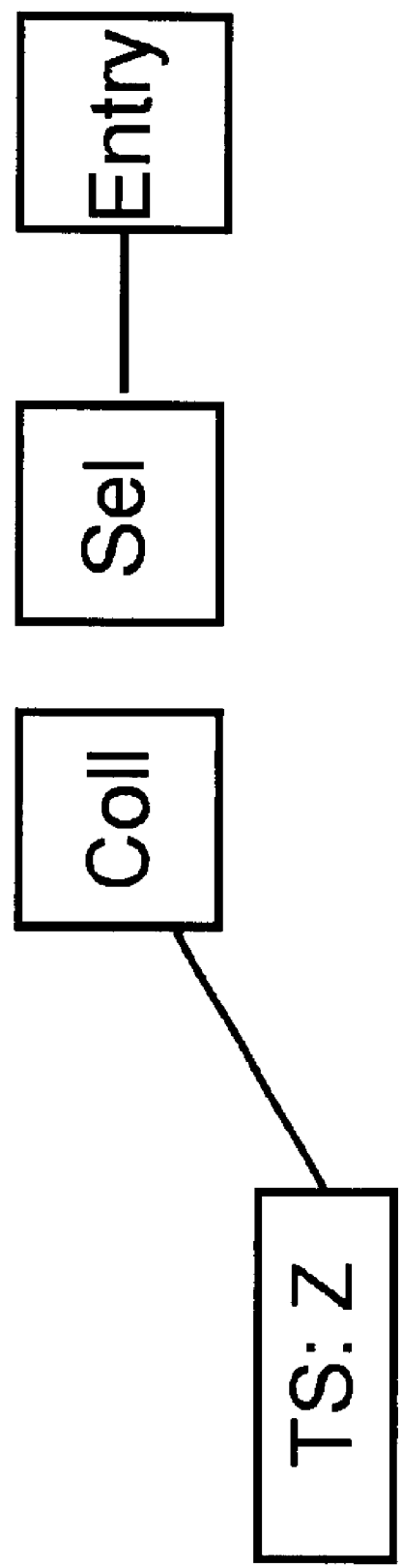
FIG. 9 shows the route of the text flow object Z in the example program.

FIG. 9 shows the route of the text flow object Z. Notice that there is no line between the collector and the selector, because what flows between them is a collection flow object, not any element of the collection.

The dependent set in the wrapper of the text flow object Z looks like FIG. 10 (the components and connectors are labeled informally).

The Text Entry component has made itself a dependent of the flow object which arrives at its sink because it must be notified if the text value changes, in order to update the display in its child window.

Now assume that the user clicks the Y button of the palette. The environment's user-interface management system (or the Palette component, or a combination of them) causes the middle button to appear depressed; the Selector, as the owner of the collection which the Palette component sinks and displays, receives from the Palette component (indirectly, via the (X,Y,Z) selected collection flow object) an owner be notified message, which causes it to conclude that it must change its selection from the third to the second element of its input list. Because the Selector is a one-sink component, it directly executes a new-output procedure with respect to its second source connector.

Here are the steps of the new-output procedure. Since a new flow object reference is to be put into the lower source, the Selector sends an assign hosted flow object reference oop message to this source. (An example showing why the Selector makes itself a host of its selected output is given in Section 6.6.) As part of the execution of this message, the source removes the reference to the Selector component in the host set of the wrapper of text flow object Z, and sends an invalidate sink connector oop message to the sink of the Text Entry component, which causes the following actions (see Section 1.4).

1. The sink connector removes the reference to the Text Entry component and itself in the dependent set of the wrapper of text flow object Z (see FIG. 10), emptying the set. Thus, the Text Entry component is no longer a dependent of text flow object Z.
2. The sink connector sends a sink connector invalidated oop message to the Text Entry component, which does nothing.
3. Then the sink connector invalidates its flow storage.

Then the assign hosted flow object reference oop message puts a reference to the newly selected flow object (text flow object Y) into the flow storage of the Indirect Selector component's second source connector. It also adds a reference to the Selector component to the host set of the wrapper of text flow object Y.

Then the Selector component sends a send flow oop message to its second source connector. This sends a receive flow message (with a reference to text flow object Y as a parameter) to the sink of the Text Entry component. The sink then sends a flow received oop message to the Text Entry component, with a parameter which identifies the sink.

The response to the flow received oop message, from Section 2.2, is as follows.

1. The Text Entry component makes itself a dependent of text flow object Y. It does this by adding (component, sink) to text flow object Y's wrapper's dependent set, so that the latter looks like FIG. 11.
2. The component then updates the display with the new data.

Part 3 Composite Components

Section 3.1 Primitive and Composite Components

The program definition structures described above can be called wiring diagrams. The description of Parts 1 and 2 has dealt entirely with the outsides of components and with communication-act behaviors.

The inside of each component determines how that component behaves in response to the communication acts that it receives. The way the inside of a component is built may be called the implementation of the component.

Component implementations (hence, component types) fall into two broad categories.

1. The implementation of a primitive component is defined outside this model. For example, a component might be implemented using a procedural language available to a programming environment.
2. A composite component is implemented with a wiring diagram.

The following discussion describes how a wiring diagram is considered to be encapsulated, resulting in the definition of a composite component type, from which instances are created whose responses to communication acts are defined entirely by the wiring diagram. The outside of a composite component produced by encapsulation follows entirely the description of Part 1. The inside of the composite component is the wiring diagram.[8]

Section 3.2 Connector Components

There are two primitive component types which participate in a special way in the definition of encapsulation; these are called connector component types. (Note that these are component types and are not the connector types described in Part 1.) There is a source connector component type and a sink connector component type. These primitive component types define the functional relationships between the wiring diagram inside a composite component and the wiring diagram outside the composite component.

Connector components play the role of formal parameters in procedural abstraction, formally constraining what about the inside can be known from the outside. There is a one-to-one correspondence between the set of connector components in the wiring diagram inside a composite component (which wiring diagram defines its implementation), and the set of connectors on the outside of that composite component.

Figure 12:
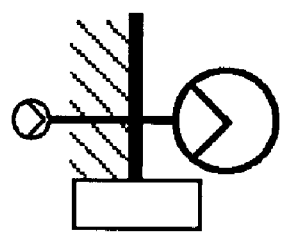
FIGS. 12 and 13 show a Source Connector component and a Sink Connector component.

1. Each source connector primitive component contains one sink connector (the small circle on the left of FIG. 12). The source connector primitive component corresponds to one source connector on the outside of the composite component. The name box at the

[8] Notice that, because of these properties, the rules of program structure define an extensible program-description language. bottom of the icon establishes the correspondence between this connector component and a label associated with the outside connector. The hatched vertical bar is intended to suggest the wall between the inside (on the left) and the outside (on the right) of the composite component. The large circle on the right is nonfunctional; it is meant to suggest the corresponding source on the outside of the wall.

Figure 13:
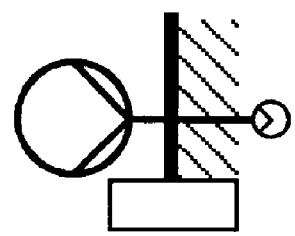

2. Each sink connector primitive component contains one source connector (the small circle on the right of FIG. 13). The sink connector primitive component corresponds to one sink connector on the outside of the composite component. The name box at the bottom of the icon establishes the correspondence between this connector component and a label associated with the outside connector. The hatched vertical bar is intended to suggest the wall between the inside (on the right) and the outside (on the left) of the composite component. The large circle on the left is nonfunctional; it is meant to suggest the corresponding sink on the outside of the wall.

The example of Section 1.1 shows a source connector component in a wiring diagram which defines (the inside of) a composite component.

Section 3.3 Flows Into and Out of a Composite Component

Each connector component on the inside directly communicates with its corresponding connector on the outside, as follows.

Informally, the wall separating the inside and the outside of a composite component can be considered to be removed, and the wire(s) connecting an outside connector and the wire(s) connecting the corresponding inside connector component can be considered to be the same wire(s). We consider the following two cases.

1. Flows sinked by a composite component. Every flow received by a sink connector of a composite component immediately initiates a flow sourced by the source connector of the corresponding inside sink connector component, with the same flow object.

Figure 14:
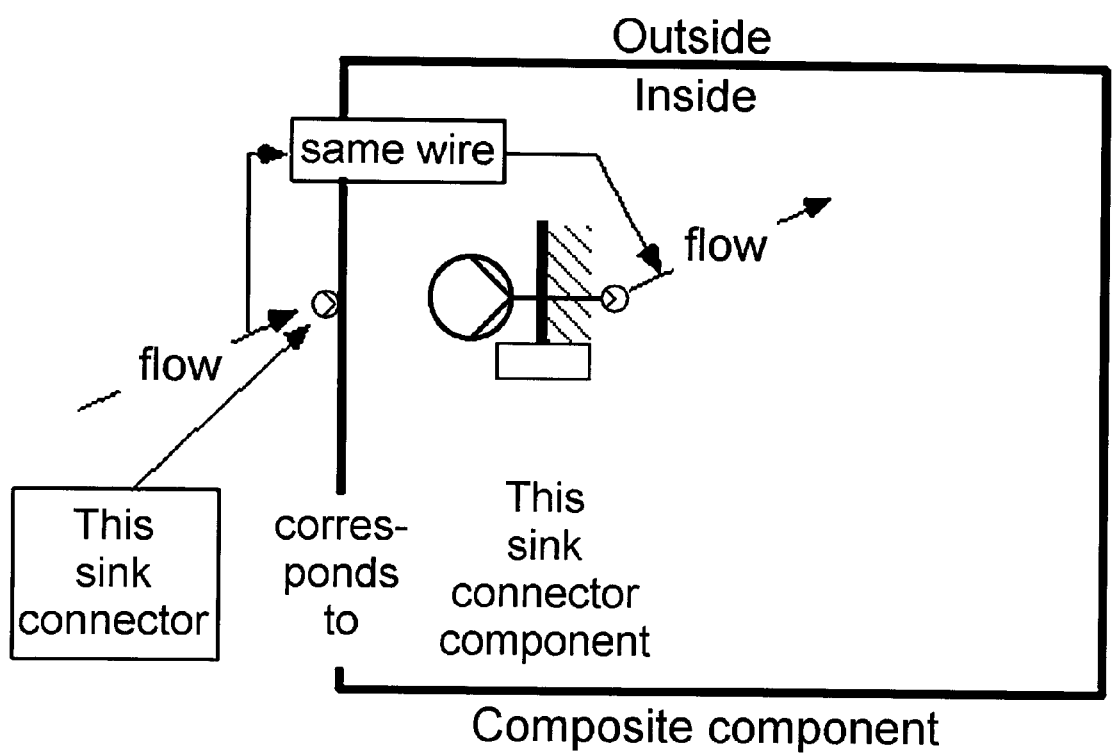
FIG. 14 shows the effect of a Sink Connector component on a flow.

The wrapper of the flow object is unchanged. See FIG. 14.

Figure 15:
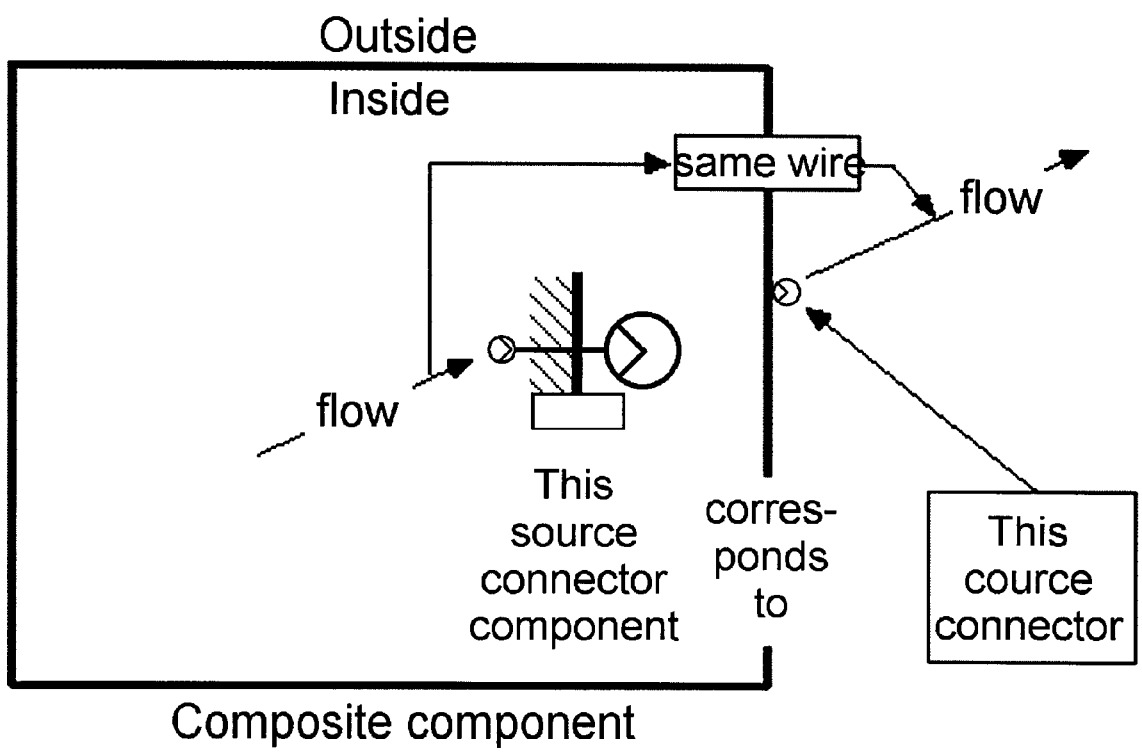
FIGS. 15 and 16 show the effect of a Source Connector component on a flow with a single wire and multiple wires connected to the corresponding source connector.

2. Flows sourced by a composite component. Every flow received by the sink connector of an inside source connector component immediately initiates a flow sourced by the corresponding outside source connector, with the same flow object. The wrapper of the flow object is unchanged. See FIG. 15.

Figure 16:
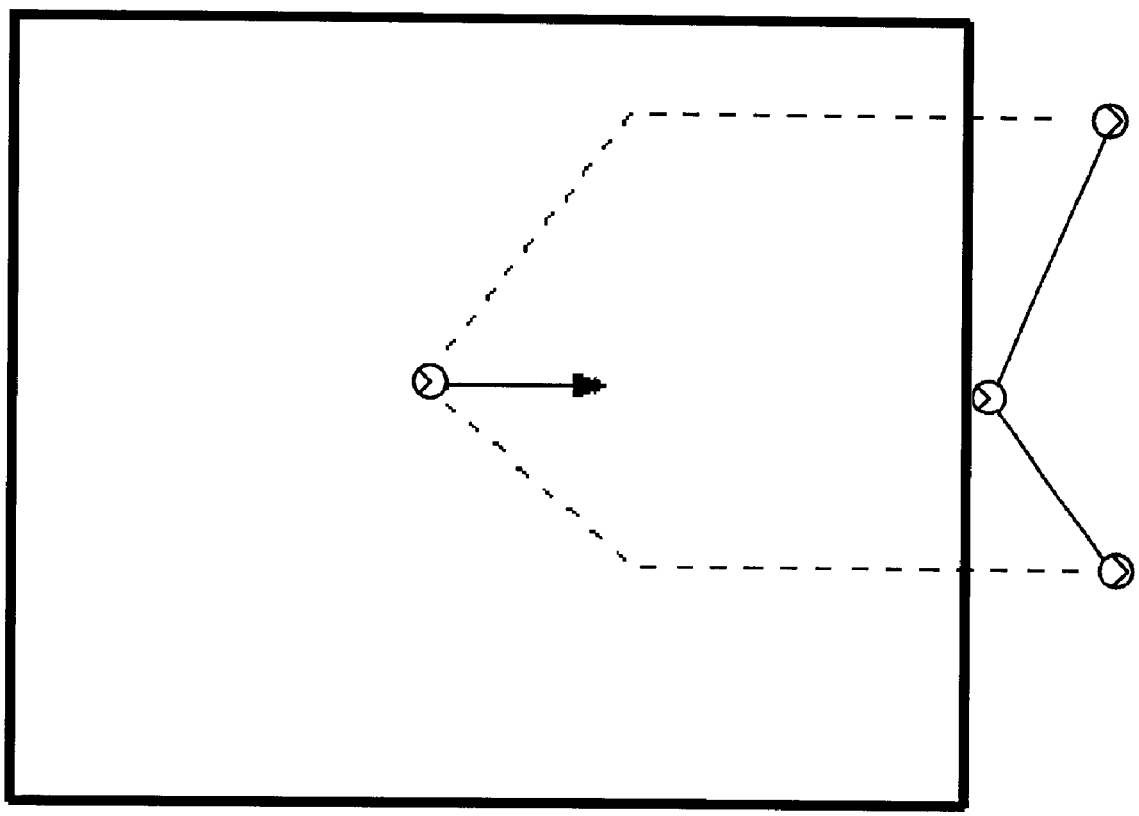

In the second case there is an additional possibility to consider. The outside source connector can connect to more than one sink via more than one wire, one wire to each outside sink. In this case, we consider that the inside source is directly wired to each of the outside sinks, via the dotted wires in FIG. 16.

The above paragraphs completely define encapsulation. Note that composite components are not even seen by message-passing communication acts. That is, message-passing communication acts pass from primitive component to primitive component, passing transparently through the walls of composite components as necessary. This observation has the following consequences.

1. A composite component is never the owner of a flow object.
2. A composite component is never a dependent or host of a flow object.
3. Every sender and every receiver of a message-passing communication act (and every receiver of an event) is a primitive component type.

These consequences mean that the original descriptions of message-passing communications acts require no modification to account for composite component types.

In other words, the composite component type is merely a hiding device; it is transparent to internal program behavior. However, composite component types can be invoked, both as programs and dynamically during the execution of a program (see Section 6.5) and must be thought of as first-class component types.

Section 3.4 Summary of Sink Behaviors

Figure 17:
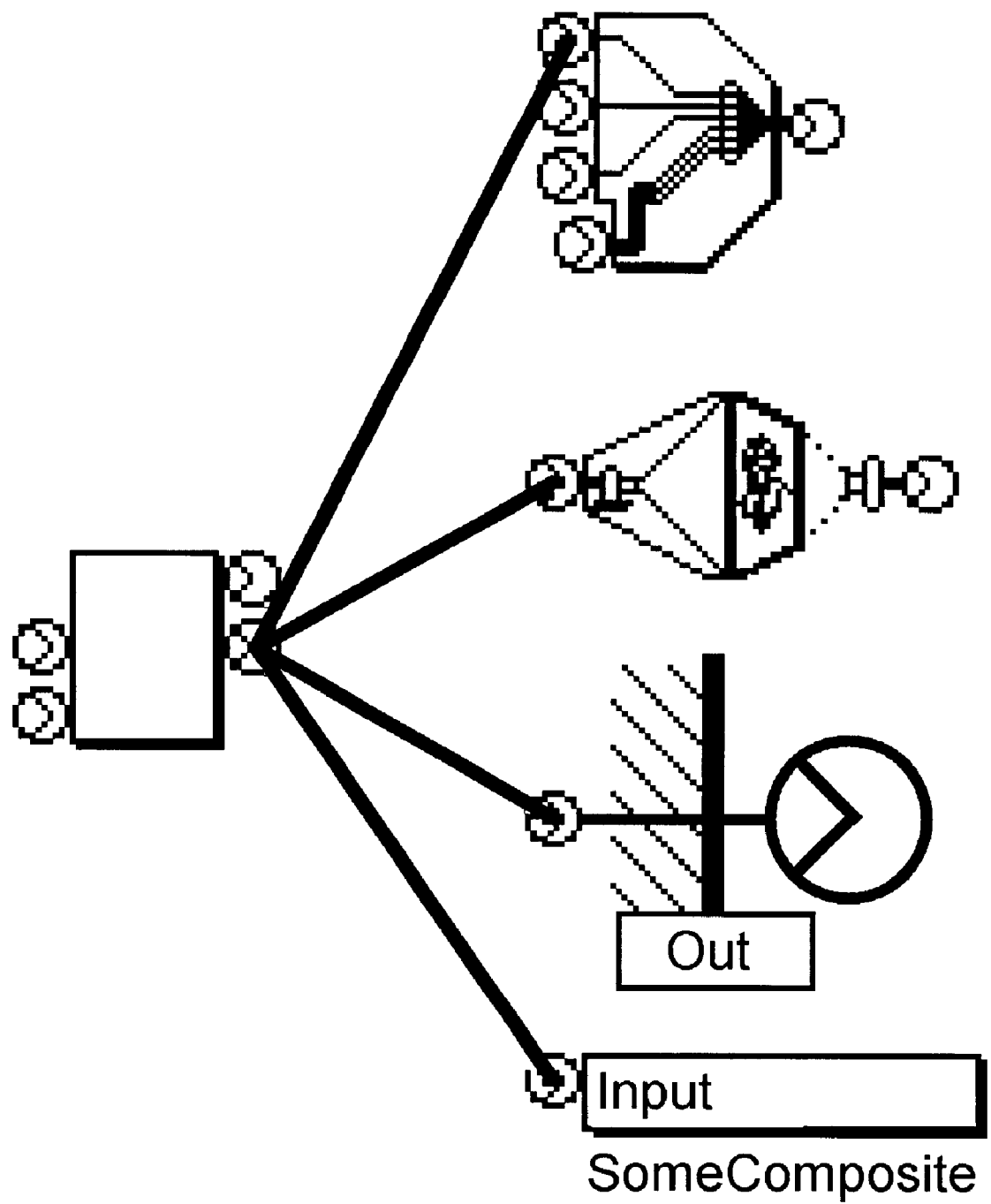
FIG. 17 shows a source wired to four sinks for purposes of analysis.

In Section 1.4, the behavior of a sink connector in response to the receive flow oop message was described with the caveat that the description did not apply to those sink connectors on the outside of composite components. We now have the information we need to complete this description. FIG. 17 shows a source wired to four sinks; these four sinks represent, from top to bottom, the four cases that we need to consider.

1. A sink of a primitive (not a source connector component) which is not a dependent of the arriving flow object.
2. A sink of a primitive (not a source connector component) which is a dependent of the arriving flow object.
3. The sink of a source connector component.
4. A sink of a composite component.

Specifically, we must describe the behavior of these sink connectors in response to receipt of a receive flow oop message with a single parameter which is a reference to the flow object. As described in Section 1.4, the receive flow is sent by the send flow method of the source connector as follows:

Send flow: The source connector iterates over the collection of wires connected to it, sending, for each wire, a receive flow oop message, with the flow object reference as a message parameter, to the sink connector at the other end of this wire.

Cases 1 and 2 are described in Section 1.4 under receive flow as follows.

1. The sink connector places the flow object reference into its flow storage. (The flow storage is already invalid.)
2. The sink connector then sends a flow received oop message, with an identifier of the sink connector as a message parameter, to its component. (A component's response to the flow received message is discussed in Section 2.2.)

Case 3 is the same as case 1. The difference is in the source connector component's response to the flow received message. Each source connector component appearing in the definition of the wiring diagram of a composite component stores a reference to the corresponding outside source connector, thus permitting it to send an assign flow object reference and a send flow to the outside source connector with the same flow object. (The example in Section 5.4 elaborates.)

Case 4 is treated in Section 5.3, where the distinction is made between the description of a sink connector object and an instance of a sink connector object. The instance carries the flow storage. The description carries identification of the corresponding inside sink connector component. This identification can be accessed when the sink connector instance is processing the flow received oop message.

As it turns out, the sink connector description holds such identification in all four cases discussed here, and this identification is used similarly in all four cases. (This is elaborated in the discussion of <sink description object>in Section 5.3.)

Section 3.5 Structure of an Application Program

In Section 1.1, a program was characterized as a wiring diagram. It is more useful to characterize a program as a single composite component, rather than as the wiring diagram from which the composite component was encapsulated. Characterizing an application as a composite component allows for that component to communicate with the operating system by means of flows through its connectors, for example, at invocation time.

Part 4 A Fundamental Set of Primitive Components

This part presents a collection of application-domain-independent components which, together with some application-domain-specific components[9], are capable of building a large set of application programs. These components are being described as "primitive" components; in fact, some of them can be implemented as composite components. It is not our purpose here to describe a minimum or complete set of primitives.

[9] Application-domain-specific components do such things as compute spreadsheets, perform database queries, and execute animation sequences. Note that it may not be necessary to create such function in a component; it may be preferable to harness existing application-specific software in the guise of a component.

Section 4.1 Settings

Some primitive component types must remember values which specialize them for application in a particular context. These persistent values remembered by primitive component types are called settings. There are several uses for settings. In one use, a primitive component might be built in a general way to be applicable in a variety of contexts. In this application, a setting specifies a specialization of the general component definition, in which only part of its total functionality will be used. Considering the more general issue of tools and environments for building software, this kind of a setting would be similar to a pragma, which can provide optimization information at "build" or "compile" time to a development tool, or which can alternatively be used at "run" time as state information in an "interpretive" environment.

Another use of a setting is to store application-specific information, such as a set of numbers which characterizes the size and position of a child window in a main window.

In the following discussion we will not distinguish between these two uses of settings. Such distinctions arise from the kinds of engineering considerations which occur in the construction of tools and programming environments. We will also not comment on the implementation of settings, which can also be tool- and environment-specific. We begin with the description of a component which makes available to the program a setting value.

Figure 18:
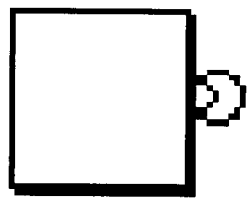
FIGS. 18 and 19 show a generic Setting Source component and a Text Source component.

Setting Source Component. A setting source component, shown in a generic form in FIG. 18, has a single source connector, from which it sources the value of its setting. It is the owner of a persistent value, which it makes available in a flow object.

The setting value which persists is the one stored in each component instance at the time a wiring diagram containing this instance (at the top wiring level) is encapsulated. Then, in every instance of the resultant composite component type, the corresponding instance of the Setting Source component will hold, and source, its persistent setting value. (Note that this value can be changed after instantiation by the action of a Transaction Register component, discussed in Section 6.1, or before encapsulation by a possible command of the Setting Source component; see Section 5.10.)

The setting value is initialized to a copy of the persistent value at the time that the component is instantiated from its component type. (Instantiation is discussed in Section 5.7.) Strictly speaking, we are not describing a single component type but an abstract supertype, each of whose instantiating subtypes initializes to its characteristic value when instantiated.

A variation of this component, which acts on receipt of an owner be notified oop message from its flow object, has a sink and possibly additional sources. Upon receipt of an owner be notified, the additional sources source the parameters of the message, then the sink picks an input DoIt.

Figure 19:
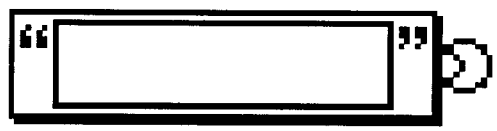

Text Source Component. The component shown in FIG. 19 is one subtype of the Setting Source component abstract supertype, the appearance of whose icon is specialized to display a short text string. The default value is the empty string.

Section 4.2 Collection Components

Just as conventional languages have operations to deal with collections (indexed often, but not necessarily, by integers), similarly this model has primitive components to deal with collections.

A collection flow object contains a collection of flow objects. The wire containing a collection may be thought of as a "cable" containing a collection of wires. Note that there is no distinction between a cable containing a collection of wires and a wire containing a collection flow object with an isomorphic collection. This property suggests that some aspects of data semantics can be expressed in program wiring.

Figure 20:
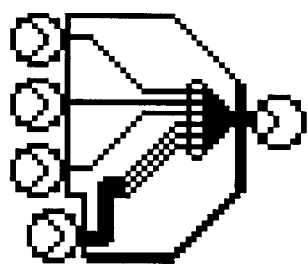
FIGS. 20 and 21 show an Indexed Collector component and an Indexed Splitter Component.

Indexed Collector Component. An Indexed Collector component, shown in FIG. 20, has n+1 sinks (n>1) and one source (n=3 in the figure). The first n sinks accept arbitrary flow objects, and the n+1st sink accepts a collection flow object (say with m elements). If k is the number of the first n sinks which are actually wired, the source sources a collection flow object with k+m elements, where the last m elements are the elements of the collection arriving at the n+1st sink. Thus, the n+1st sink is a means by which an arbitrary number of collector components can be daisy-chained to produce a collection with an arbitrary number of elements.

Named Collector Component. A Named Collector is similar to an indexed collector, except that the collection is indexed by names, and each of the first n sink connectors has an associated setting which holds the name with which the element arriving at the sink is associated in the resulting collection. (If the setting is absent, the text distinguisher serves as the index.)

Concatenate Component. A Concatenate component has n sinks (n>1) and one source. The sinks accept collections, and the source sources the concatenation of the collections. That is, if the collection at sink number i has elements $[e_{i,1} \ldots e_{i,mi}]$, then the elements of the output are $[e_{1,1} \ldots e_{1,m1}, e_{2,1} \ldots e_{2,m2} \ldots e_{n,1} \ldots e_{n,mn}]$.

Figure 21:
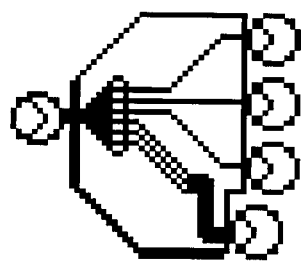

Indexed Splitter Component. An Indexed Splitter component, shown in FIG. 21, has one sink and n+1 sources, and performs an inverse function to an indexed collector component.

Figure 22:
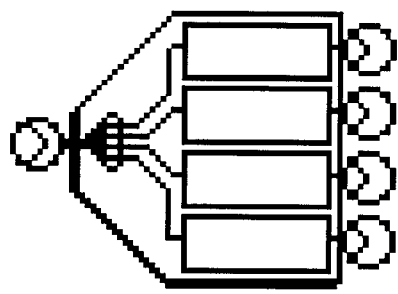
FIG. 22 shows a Named Splitter component.

Named Splitter Component. A Named Splitter with n sources performs an inverse function to a Named Collector with n+1 sinks (given that the names associated with the n sources of the splitter are the same as the names associated with the first n sinks of the collector). It is shown in FIG. 22. In an assembly tool, each white rectangle in the icon displays the name setting associated with its source. As well as acting as the inverse of a collector, a Named Splitter also can isolate the named instance variables of a flow object, or the named fields of a data record. Such distinction among the named components of (1) a collection created by a Named Collector, (2) an object with named instance variables, or (3) a record with named fields arise either from the history of the data-procedure paradigm or from the classic build-time/run-time distinction. We are deliberately avoiding such distinctions. (Section 5.9 contains more discussion of such distinctions.)

Some components (the Indexed Splitter being a trivial example) require collections as inputs. Often, where a collection of one element is acceptable, the component will interpret a noncollection arriving at a sink expecting a collection as a collection of one element. This convention is to be understood in the following discussions.

Figure 23:
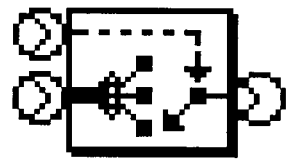
FIGS. 23 and 24 show a Direct Selector component and an Indirect Selector component.

Direct Selector Component. A Direct Selector, shown in FIG. 23, has two sinks and one source. The lower sink accepts a collection and the upper sink accepts an object which can be interpreted as an index into the collection (for example, either an integer or a name). The Direct Selector is a dependent of both input flow objects, because the selector will need to recompute its output if either input changes. The source outputs the element of the selection chosen by the index.

A variant of this component has an additional source which makes the component synchronous, rather than asynchronous. The source sources a DoIt; the selection is not computed and sourced until this DoIt is picked.

Figure 24:
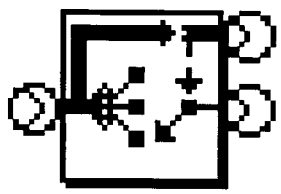

Indirect Selector Component. An Indirect Selector, shown in FIG. 24, works in tandem with another component (of which there are several examples which will be discussed), which perform a "choose-1-of-n" function, usually (but not necessarily) at the user interface. Examples of choose-one user-interface components are list-box, combo-box, palette, and radio-button-group components. Menus are also user-interface elements with a choose-one function.

An Indirect Selector has one sink (accepting a collection) and two sources. The upper source connects to a choose-one component (not necessarily directly) and the lower source sources the selected element of the input collection. The Indirect Selector becomes a host of the selected element when it is sourced. (An application of the Indirect Selector as a host is illustrated in Section 6.6.)

Figure 25:
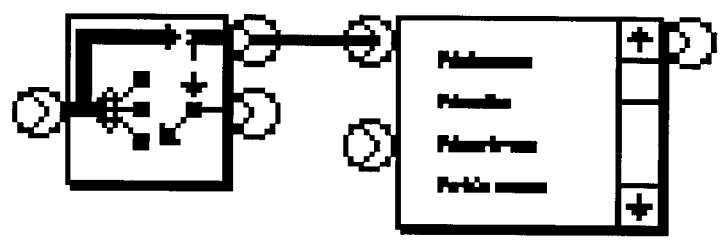
FIG. 25 shows a characteristic idiom combining an Indirect Selector component and a choose-one component.

FIG. 25 is a characteristic idiom involving an Indirect Selector and a choose-one (the choose-one shown in the figure is a List Box). We shall refer to this idiom, and the programming strategy which employs it, as event-induced selection. When an Indirect Selector sinks a collection, it forwards a new flow object containing the same collection (this is possible because, as with some other object systems, the flow object really contains a reference to the collection) out the upper source, making itself the new flow object's owner.

The collection flow object sourced by the Indirect Selector source is an instance of a subtype of the collection type. It contains an additional instance variable which permits describing a selection on the collection. This flow object type is called a selected collection. The choose-one component, then, projects the selected collection flow object, including its selection, onto the user interface.

If the Indirect Selector has a setting which specifies an initial selection, it makes this selection (forwarding the resulting collection element out the element source), it expresses this selection in the selected collection flow object, and it sends a notify dependents message (acted on by the choose-one component) to the selected collection. If no initial selection is specified, MO is sourced from the element source. The selector owns this MO, whereas it does not own output elements which are selected from input collections.

When the choose-one component makes a selection (for example, when a List Box component receives an event saying that the user has clicked on an element of the list), it expresses this selection in the selected collection flow object and sends a notify owner message to this flow object.

If the choose-one component is a user-interface component, it needs to know how to display the elements of the collection on the user interface. This is one function of the distinguishing ability of the wrapper of each element of the collection. The choose-one component constructs a collection of the answers obtained by asking each element of the collection for a distinguishing name or icon (depending on the choose-one component or on a setting of the choose-one component) and it uses this collection of answers for its display. It must remember the mapping from the distinguishers back to the collection elements, so that it can apply this mapping when a particular distinguisher is chosen in order to find the element and express the selection in the selected collection. (It may also have to remember a permutation mapping, if the distinguishers must be sorted for presentation.)

A variant of the Indirect Selector component has an additional source which makes the component synchronous, rather than asynchronous. The source sources a DoIt; the selection is not computed and sourced until this DoIt is picked.

Event-induced selection is a major strategy for expressing change in program appearance or behavior in response to choices the user makes at the user interface. The selector is the wiring equivalent of the case statement in procedural languages. In Section 6.3 we shall extend the uses of selection with a discussion of state-controlled selection.

Direct Multiselector Component. This can be a separate component or a variant of a Direct Selector component which is chosen by a setting. It differs from the Direct Selector in that its selection output sources a subcollection, not an element, of the input. Accordingly, the indexer input sinks not a single indexer but a collection of indexers. This component also has a synchronous variant.

Indirect Multiselector Component. This can be a separate component or a variant of an Indirect Selector component which is chosen by a setting. It differs from the Indirect Selector in that its selection output sources a subcollection, not an element, of the input. (The selected collection type accommodates multiple selection.) Accordingly, the collection output sources the selected collection to "choose-one-or-several" components, such as List Box components which can handle multiple selections. This component also has a synchronous variant.

Figure 26:
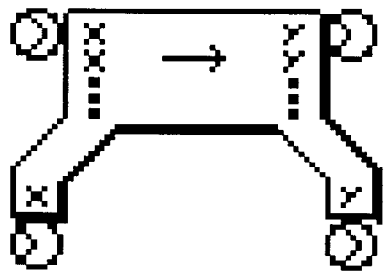
FIG. 26 shows a Map Collection component.

Map Collection Component. A Map Collection component, shown in FIG. 26, applies a function to each element of a collection and outputs the resulting collection of function results. It has two sinks and two sources. The top sink-source pair accepts the input collection and sources the resulting collection. The bottom source-sink pair successively sources each element of the collection and accepts the result of applying the function to that element.

When a collection arrives at the collection sink, or when the component receives a dependent be notified message, the component iterates over the collection, successively sourcing each element from the element source connector. (A one-sink, one-source "filter" component, or equivalent wiring diagram, is presumed to be connected to the element source and sink connectors.) The output of the filter component/wiring diagram appears at the element sink, from which the map collection component incorporates it into the output collection. It does this by constructing each new element in the output collection with a copy of the wrapper of the corresponding element of the input collection. Also, the wrapper of the output collection is a copy of the wrapper of the input collection. (Thus, message-send communication acts directed to the whole collection or to elements of the collection can span across the Map Collection component.)

The Map Collection component functions as a choose-one component when the filter component sources DoIts. See the discussion of the To DoIt component in Section 4.4.

Section 4.3 Window Components

Main Window Component. A Main Window component communicates with the user-interface management system of the operating system to manage directly one window and indirectly the child windows of this window. These components manage modal and nonmodal dialogs, and overlapping and full-screen windows, either by the device of having a separate component for each or by having a generalized component with settings. We shall discuss a main window component which manages an overlapping window.

Figure 27:
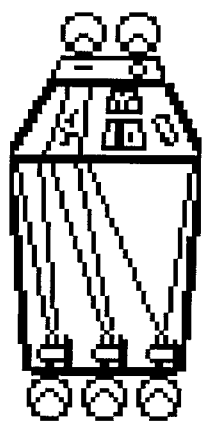
FIG. 27 shows a Main Window component.

The Main Window component, shown in FIG. 27, has three sinks and two sources. The two sources source DoIts; the top source sources a DoIt which causes the window to be opened when it is picked, the bottom source sources a DoIt which causes the window to be closed when it is picked. These two DoIts are alternately enabled/disabled and disabled/enabled, respectively, depending on whether the window is closed/open.

The three sinks (from top to bottom) accept (1) a text flow object for the title bar of the window, (2) a collection of menus for the menu bar of the window, and (3) a collection of ports for the child windows. The icon in the picture is designed to suggest the projection metaphor. A variant of this component has an additional one or two sinks which pick DoIts when the window closes (even if closed directly by the user) and, perhaps, when it opens.

(In an operating system like the Macintosh, the menu collection appears in the global menu bar when the window is active, whereas in Windows it appears in the local window menu bar. It is conceivable that a main window component for the Macintosh could have two menu-bar sinks, the second for a local window menu bar.)

Each menu flow object of the menu collection is a collection of DoIts; the collection wrapper provides a distinguisher for the text heading of the menu. (More generally, in order to allow for hierarchical menus: a menu flow object is a collection whose elements are DoIt flow objects or menu flow objects.) Each DoIt and collection wrapper in the menu collection provides a distinguisher for its menu item.

Ports. We shall now discuss ports. Ports are flow objects which are sourced and owned by the primitive components which manage the child windows of a main window. The main window communicates directly with the child components using notify owner messages along the port routes. (There isn't that much to communicate about, it turns out, once each child window is instantiated in the user-interface management system; that instantiation is the principal function of the protocol between the Main Window component and each child window component.)

A port defines the size and position of the child window in the main window managed by the Main Window component. In general, a port is a function which maps a rectangle (the main window rectangle, say) into another rectangle (the child window rectangle), usually with the second contained in the first.

Here is one realization of a port. The data of a port is a set of four integer-triplets, together with a (typically empty) list of ports. The four triplets define the coordinates of the left, top, right, and bottom of the child window. Each triplet (a,b,c) expresses the computation (a/b)+c, where a/b expresses the position of the respective child window side relative to the width or height of the main window, then the displacement c (which can be negative), in appropriate units, is added. Thus, a child window occupying the full size of the main window would have the following triplets: Left=(0,1,0), Top=(0,1,0), Right=(1,1,0), Bottom=(1,1,0). A child window centered in the main window inset by 10 units on each side from a half-size rectangle has the following triplets. Left=(1,4,10), Top=(1,4,10), Right=(3,4,−10), Bottom=(3,4,−10). A port computes the coordinates of the child window, given the coordinates of the main window (by convention in most user-interface management systems, the left and top coordinates of the main window are usually 0 and 0, and the right and bottom coordinates are the width and height of the main window).

Since a port is applied to a rectangle and yields a rectangle, ports are capable of being applied successively. Thus, in actual fact, what a port computation does is first apply the ports in the list part of the port, then apply the four triplets. That is, a port can "remember" the result of the prior application of several ports. This leads us to a brief digression, the Map Port component.

Figure 28:
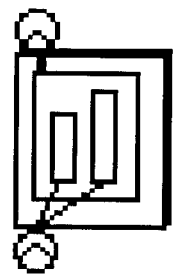
FIG. 28 shows a Map Port component.

Map Port Component. A Map Port component, shown in FIG. 28, is a filter (one sink, one source) which accepts a port, applies a port transformation (stored as a port object in a setting of the component) to that input and outputs the resulting port, which embodies the successive application of the setting port followed by the input port.

The Map Port component can also accept a collection of ports, apply the setting port to each, and output a corresponding collection of ports (again, with copies of the input wrappers so that message-passes will span the Map Port component). Thus, a Map Port component can be used to take a group of child window ports, constructed without regard for the context of other child windows with which it will appear, and map this group into a particular subrectangle of a main window appropriate to a particular application.

Now back to the Main Window component. Because the collection of child windows of a main window can arise by using collector components to build collections of collections, the input to the port sink connector might be a multilevel collection. The Main Window component flattens this to a single collection. It iterates across this collection to obtain its collection of child window ports. Each port provides a route to the child window component (the port's owner), and (a means to obtain) the size of the child window.

Variable-format windows can be implemented by running collections of port groups (each group representing one alternative format) through selection logic into the port input (possibly in combination with other, fixed ports) of a Main Window component. When the Main Window component receives a flow or a dependents be notified oop message with respect to its port sink, it refreshes its window using the new collection of ports.

Figure 29:
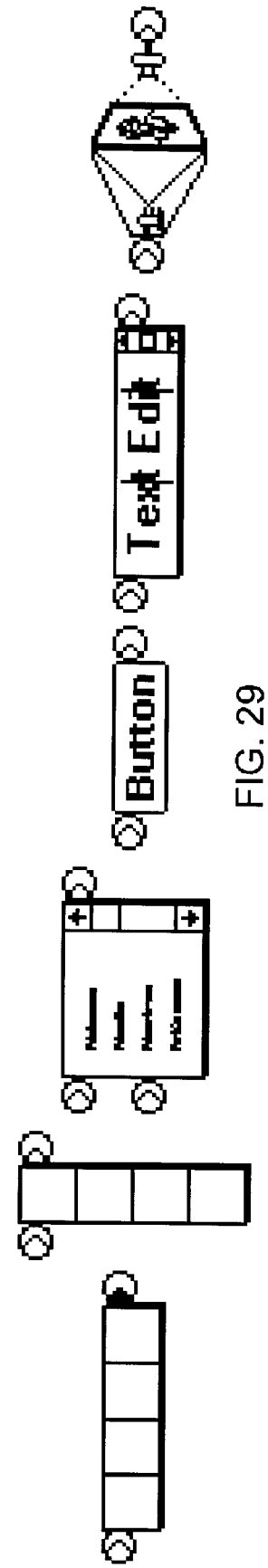
FIG. 29 shows six Child Window components: Horizontal Palette, Vertical Palette, List Box, Button, Text Edit Box, and Generic.

Child Window Components. FIG. 29 shows an assortment of child window components. There is a child window component type for each child window type available in the operating system's user-interface management system, plus some which provide capabilities synthesized from more primitive capabilities of the user-interface management system. Examples of the former might be list boxes, combo boxes/popup menus, buttons, bitmap displays, and text edit boxes. Examples of the latter might be child windows for managing display lists and animation, palettes (horizontal and vertical), and radio-button groups.

The components shown in FIG. 29 are, from the left, Horizontal Palette, Vertical Palette, List Box, Button, Text Edit Box, and Generic. The Generic Child Window component, discussed in more detail in Section 6.7, projects an appropriate display whose format is dependent on the type of the input flow object.

At minimum, a child window component has a single sink and a single source. The sink accepts a flow object whose data is appropriate to the child window, and the source sources a port flow object. The component has at least one setting, for the port flow object which defines the rectangle of the child window.

A principal connection between inside behavior and outside behavior is this specification for child window components: a child window component is a dependent of its input flow object; when a flow object arrives at the sink or when the component receives a dependent be notified message, the appearance of the user interface is updated to reflect correctly the new arrival. (In order to minimize flashing, receipt of an invalidate message from the sink or receipt of MO does not change the display.)

There might also be other, component-specific connectors. For example, a List Box component has a sink accepting a DoIt which is picked when the selection is double-clicked, and an Editable Text component can have several DoIt sources for editing commands such as cut, copy, and paste.

Figure 30:
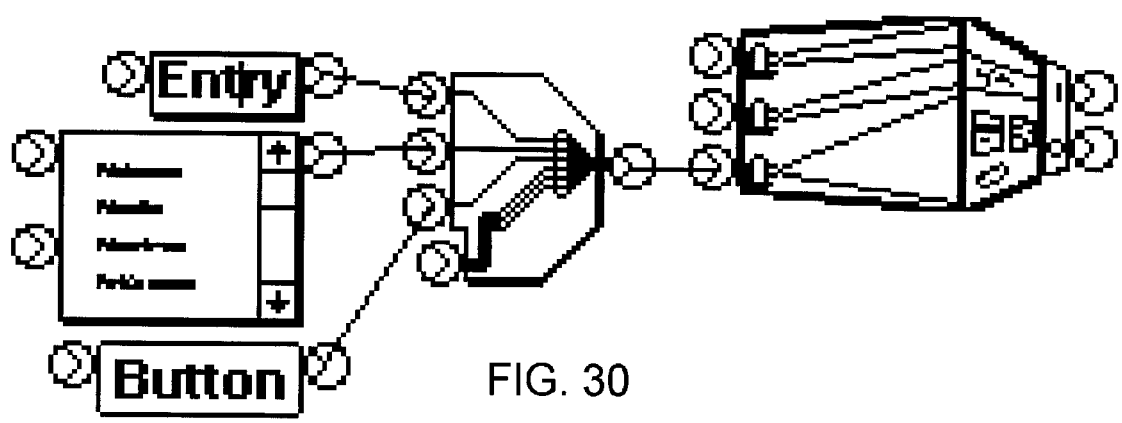
FIG. 30 shows the port wiring for a main window with three child windows.

FIG. 30 shows the port wiring for a window with three child windows, a List Box, an Entry Field control, and a Button. (The order of connection to the Collector component is immaterial.) The Entry Field component can sink a text flow object. The Button sinks a DoIt. The top sink of the List Box component sinks a selected collection from an Indirect Selector. The bottom sink can sink a DoIt which is picked when a selection is double-clicked (the pick occurs on the second click, after the first click, which defines the selection, has been processed).

Figure 31:
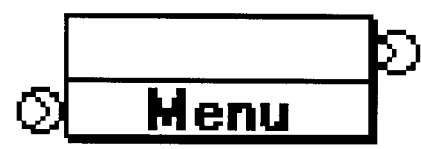
FIG. 31 shows a Menu component.

Menu Component. This component in FIG. 31 can sink a DoIt or a (possibly hierarchical) collection of DoIts and sources a Menu flow object whose text distinguisher (i.e., menu heading) is the text setting displayed in the white rectangle. The text distinguishers of the input DoIts and collections are the command labels in the menu.

Section 4.4 Filter Components

A filter component has one sink and one source; it performs a particular transformation on the flow object received at the sink and sources the result. Almost always the result is a new flow object, of which the filter component is the owner.

File Contents Filter Component. A File Contents filter sinks a file flow object and sources a new flow object containing the file contents object. (A file flow object contains a reference to a file, not the contents of the file. Typically, it is an encapsulation of a pathname, or some other operating-system-specific designator. Also, the output flow object contains a reference to the contents of the file; whether the whole file contents must be brought into memory is an implementation and optimization issue and can depend on the nature, and the dependents, of the output flow object.)

Figure 32:
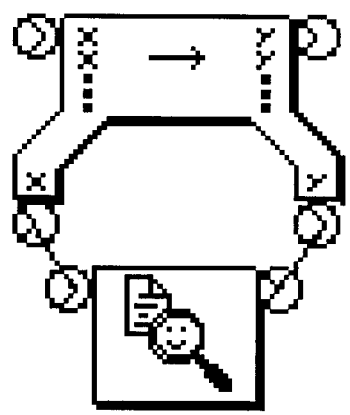
FIG. 32 shows a File Contents Filter component connected to a Map Collection Component.

In FIG. 32 a File Contents filter is connected to a Map Collection component. A collection of files is the input to the Map Collection component, and the corresponding collection of the contents of these files is its output.

Figure 33:
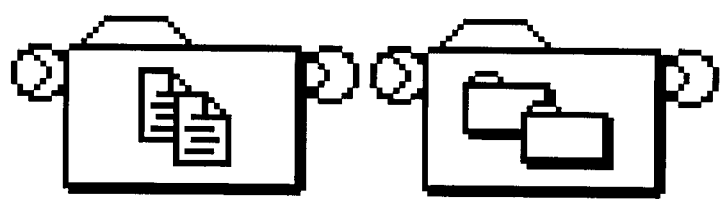
FIG. 33 shows a Subfiles Filter component and a Subdirectories Filter component.

Subfiles and Subdirectories Filter Components. Each of the components in FIG. 33 sources a collection, given a file flow object at the input which denotes a directory/folder. The first sources the collection of files in the directory, and the second sources the collection of directories in the directory. (A setting of the Subdirectories component selects the option to include as the first member of the output list the supernode of the input directory, except when it is the root node.)

Figure 34:
FIG. 34 shows a Text Distinguisher Filter component.

Distinguisher-only Filter Component. The component of FIG. 34 sources a text string flow object whose value is the text distinguisher of the input flow object. There is a corresponding variant for the icon distinguisher(s).

Figure 35:
FIG. 35 shows a Change Distinguisher Filter component.

Change Distinguisher Filter Component. The component of FIG. 35 has a setting which stores a string; this string becomes the distinguisher of the output flow object. The component passes a copy of its input directly to its output, with the text distinguisher instance variable of the output flow object containing the value of the setting. It is by this means that menus and menu items can be given arbitrary names. (Note that it would be incorrect not to make a copy of the input flow object but just to change the value of its distinguisher, because that would change the value in the owner's copy. Also note that making a copy of the input flow object copies only the wrapper but not the data contained by the flow object; it makes copies of references to these data. See FIG. 4 and the discussion in Section 1.2.)

Figure 36:
FIG. 36 shows a To DoIt Filter component.

To DoIt Filter Component. The component of FIG. 36 is a simple filter which sources a new DoIt with a copy of the wrapper of the input flow object, modified to assure that the distinguishers of the input wrapper will be unchanged. (This point is made because, if the input data object is a text string, its text distinguisher will not typically be a constant; the value of the text string is the distinguisher. This text value will be made into a constant in the wrapper of the DoIt, because the underlying string will no longer be present.)

Figure 37:
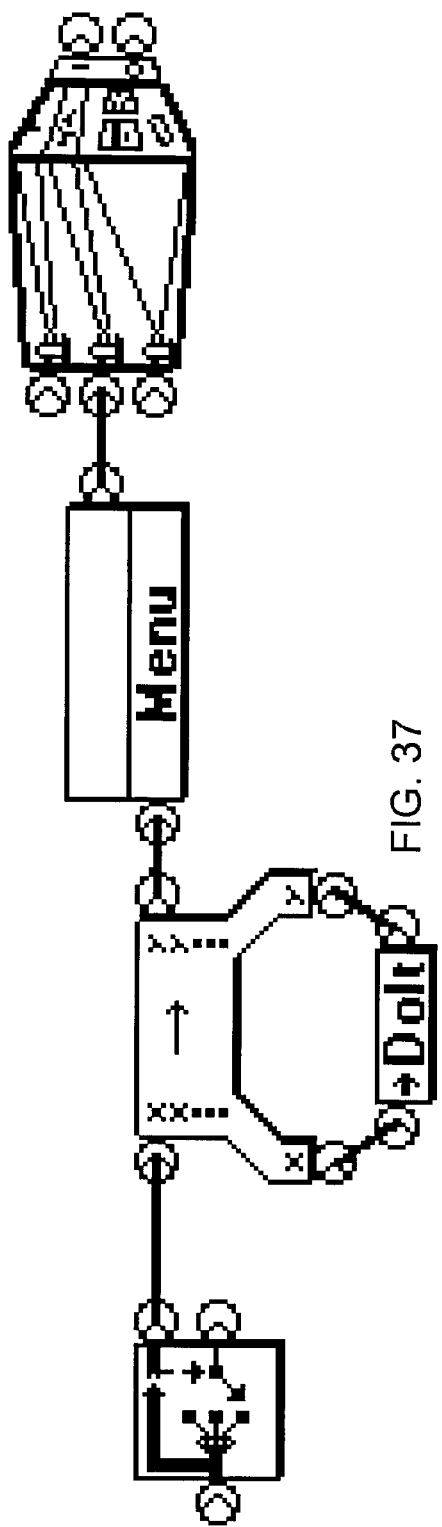
FIG. 37 shows the combination of a To DoIt Filter component and a Map Collection component acting as a choose-one component.

When a To DoIt component is the filter component used in connection with a Map Collection component, the two together can become the equivalent of a choose-one component used with an Indirect Selector; this is shown in FIG. 37. By turning an arbitrary collection into a parallel collection of DoIts, the Map Collection/To DoIt pair permits a menu in a menu bar to be used as a choose-one popup user-interface element. (The Map Collection component does this by changing the server of each new DoIt to the Map Collection component and by adding a message parameter to each DoIt which carries the index value associated with that particular DoIt. Thus, when a DoIt is picked, the Map Collection component will get a message which will permit it to express the selection in its input selected collection and send a notify owner message to this collection.)

Section 4.5 Glue Components

Figure 38:
FIG. 38 shows a Data Change Detector component.

Data Change Detector Component. The component of FIG. 38 has two sinks and one source. A sink-source pair passes a flow object straight through immediately without modification of its data. The second sink picks an input DoIt whenever a flow object arrives at the first sink. (The pick must occur after control returns from sourcing the flow object.) This component makes itself a dependent of the flow object at its top sink, and it also picks the input DoIt when it receives a dependent be notified oop message from the top sink.

Figure 39:
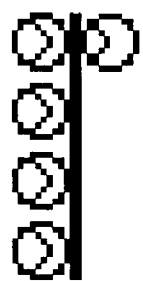
FIG. 39 shows a Pass-through component.

Pass-through Component. The component of FIG. 39 has any number of sinks and one source. Whenever a flow object is received at any sink, it is immediately sourced unmodified. This rarely used component is a workaround to the rule that any sink can connect to at most one wire; it permits a sink to receive inputs from any of several sources.

Figure 40:
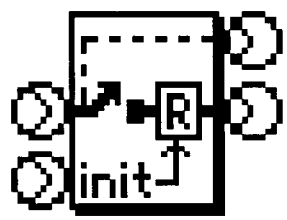
FIG. 40 shows a Register component.

Register Component. The component of FIG. 40 has two sinks and two sources. The two sinks are called clocked input and initialization input. The top source sources a "strobe" DoIt, and the bottom source sources one of the inputs. In a variation of this component, another DoIt source, when picked, initializes the register.

The register is initialized when it receives a stop message (this is discussed in Section 5.9), or when the initialize DoIt (not shown in the figure) is picked. When the register is in the initialized state, the initialization input is passed through directly to the output. The register leaves the initialized state when the strobe DoIt is picked, and does not return to the initialized state until and unless the initialize DoIt is picked or the stop message is received. Whenever the strobe DoIt is picked, the flow object at the clocked input is sourced out the output. Note that the component is not a dependent of the flow object at either input.

Synchronous variants of components such as the Direct Selector are, essentially, the asynchronous variants with Register(s) at their output(s).

Figure 41:
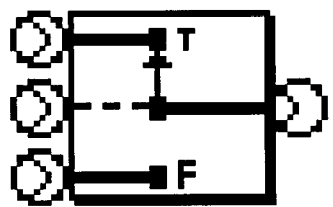
FIG. 41 shows a Boolean Selector component.

Boolean Selector Component. The component of FIG. 41 accepts a Boolean flow object at the middle sink and passes either the top input or the bottom input to the source depending on whether the Boolean is true or false, respectively. The output is MO if the middle input is not a Boolean with the value true or false.

Figure 42:
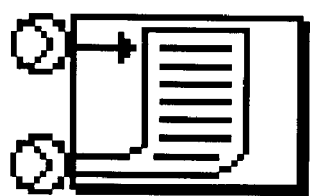
FIG. 42 shows a Match component.

Match Component. The component of FIG. 42 is a choose-one component (used in connection with an Indirect Selector) which has no user interface; it performs "table lookup" functions. The component has two sinks. The (lower) collection sink connects to an Indirect Selector and participates in the protocol common on this connection to all choose-one components. The (upper) argument sink accepts any flow object, typically a short text string. The function of the component is to make a selection from the collection (and communicate that to the Indirect Selector) according to a "best" match between the elements or distinguishers of the collection and the argument. The definition of the match criterion can be influenced by a setting; alternatively, this discussion can be seen as describing a class of Match component types, each with different match semantics.

Figure 43:
FIG. 43 shows a Pick-at-Run component.

Pick-at-Run Component. The component of FIG. 43 has one sink, which accepts a DoIt. It picks the DoIt when it receives a run message (see Section 5.9). Its function is typically to open windows which open at the start of a program.

Exit Component. This component has one source, which sources a DoIt. When the DoIt is picked, execution of the program containing the component stops and the program is destroyed.

Figure 44:
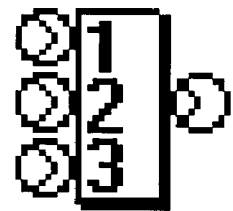
FIG. 44 shows a DoIt Sequencer component.

DoIt Sequencer Component. The component of FIG. 44 has any number of sinks and one source. All the sinks accept DoIts, and the source sources a new DoIt, of which the component is the owner and DoIt server. When the output DoIt is picked, the input DoIts are successively picked in a fixed sequence.

The remaining components discussed in this section are useful for building composite components which simulate the message-passing behavior of primitive components.

Send Notify Owner and Send Notify Dependents Filter Components. These components sink any flow object and source a DoIt. When the DoIt is picked, a notify owner or notify dependents message is sent to the input flow object. These components have variations with additional sinks, which accept parameters for the message.

Receive Notify Dependents Components. This is a family of components, each with a different number of source connectors. Each component in the family has a sink which accepts any flow object, of which it makes itself a dependent. Also, each component has a second sink for a DoIt, which is picked when the dependent be notified message is received from the first sink. The variants of the components have source connectors for sourcing the parameters of the received message before the DoIt is picked.

Send Notify Hosts Filter Components. This accepts any flow object and sources a DoIt. When the DoIt is picked, a notify hosts message is sent to the input flow object, with the message name given by a setting of the component. This component has variations with additional sinks, which accept parameters for the message.

Receive Notify Hosts Components. This is a family of components, each with a different number of source connectors. Each component in the family has a sink which accepts any flow object; the component makes itself a host of the flow object. Each component also has a sink for a DoIt, which is picked when the host message, defined by a setting of the component, is received. The variants of the components have source connectors for sourcing the parameters of the received message before the DoIt is picked.

Section 4.6 An Analysis of a Wiring Diagram

Figure 46:
FIG. 46 shows the outside of the composite component defined by the wiring diagram of FIG. 45.

FIG. 45, the same as FIG. 1, is the wiring diagram of the inside of a composite component, whose outside is shown in FIG. 46. The component opens a window which navigates a file hierarchy. There are two child windows, represented by the two List Box components. The left List Box controls selection of directories; the right List Box controls selection of files. There is a notion of a current node in the file hierarchy; this is initialized to c:, the root. The left List Box shows the directories below the current node; the right List Box shows the files below the current node. Double-clicking the left List Box redefines the current node to be the selected directory, causing the contents of both List Boxes to change. (The first element of the directory list designates the supernode of the current node, except when the current node is the root.) Double-clicking the right List Box sources the selected file out the source connector of the composite component created by encapsulation of this wiring diagram.

The window (whose component is at the upper right of the figure) will open immediately when the program starts; this is due to the function of the Pick At Run component. The text "File Navigator" will appear in the window's title bar.

The idiom consisting of an Indirect Selector component connected to a choose-one (in this case, a List Box) component, has already been discussed. There are two occurrences of this, the one on the left for the collection of directories below the current node, and the one on the right for the collection of files below the current node.

The current node is the flow object sourced by the lower source of the left-hand Register component. It is initialized to "c:". The collection of directories below the current node is provided by the Subdirectories filter component.

When the left List Box component is double-clicked, the DoIt sourced by the upper source of this Register is picked, and the selected directory, which appears at the upper sink of the Register, then appears at its output, becoming the new current node.

The Subfiles filter component provides the collection of files below the current node to the right-hand List Box component. When this List Box is double-clicked, the selected file is output to the Source Connector component. (Both the Subdirectories and the Subfiles components recognize pathname strings as well as file flow objects at their inputs; this is how they initially work with the text input "c:".)

Figure 47:
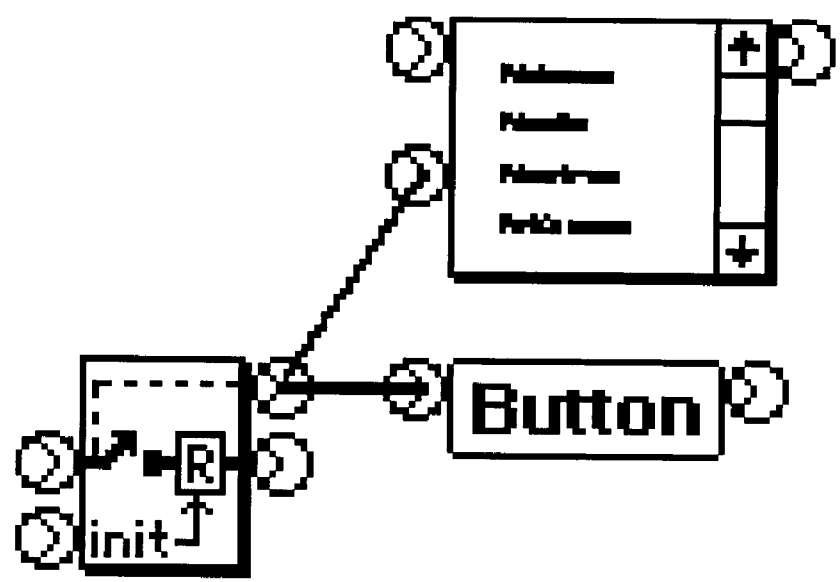
FIG. 47 shows the use of a button to duplicate the function of double-clicking a list box.

The designer might wish to add a button to the window which, when pushed, has the same function as double-clicking in the file List Box. The function of the button is added by wiring the selected file Register DoIt source connector to the Button component, as in FIG. 47. This works because the DoIt sourced by the Register flows to all sinks wired to the DoIt source connector, and any can pick the DoIt.

Figure 48:
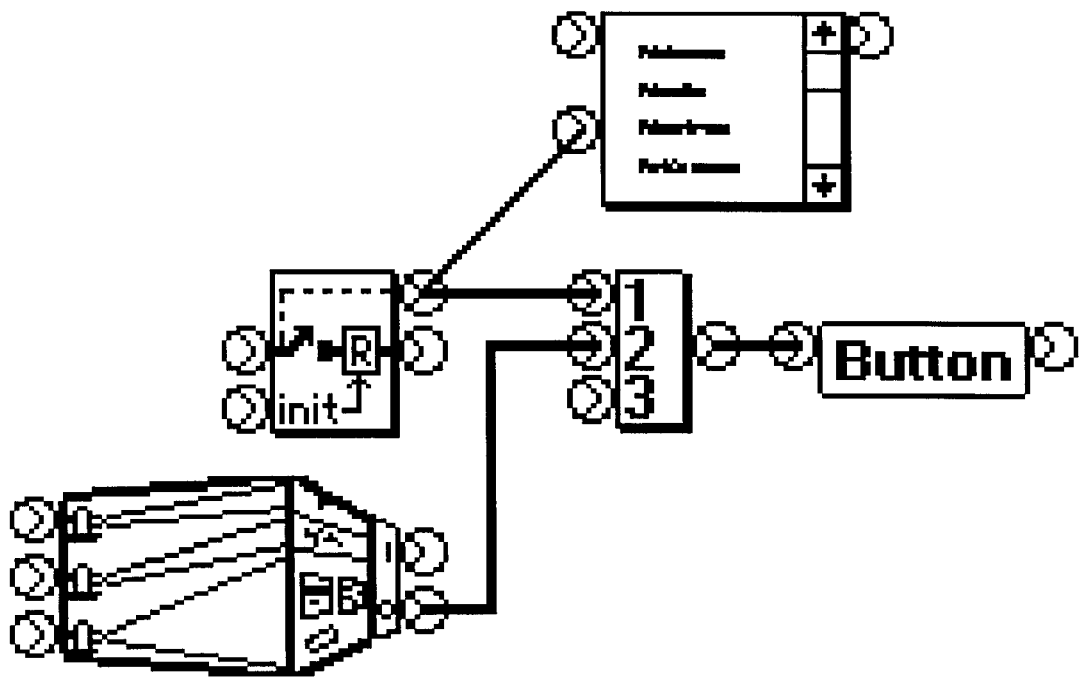
FIGS. 48 and 49 show alternative ways to wire a double-click of a list box and a button to close a window.

This same button might also be used to close the window after sourcing the selected file. (This approaches the function of the "OK" button in a file dialog.) In FIG. 48, the DoIt Sequencer, when the DoIt that it has sourced is picked by the Button, picks in sequence the DoIts at sink 1, then sink 2. In this example, the Register is first strobed, then the window is closed.

Figure 49:
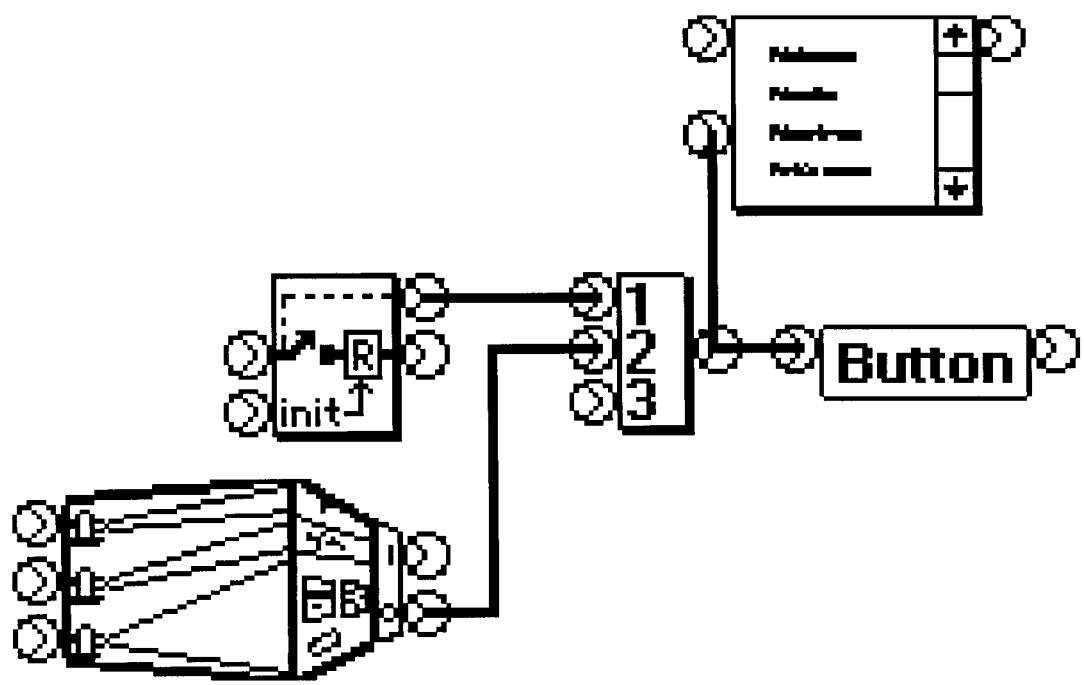

On the other hand, the designer might wish either the double-click or the button-push to strobe the register and then close the window. The wiring shown in FIG. 49 does this.

Part 5 Component Forms

The execution of a wiring diagram using an assembly tool involves the creation of component instances, given their type descriptions. Therefore, an assembly tool must be able to store component type descriptions and use them to instantiate components (i.e., create component instances from component types). We conclude that, viewed as software objects, component type descriptions and component instances are different. We shall be more specific here about these differences.

Section 5.1 Data Structure Definitions

We shall define data structures as linear data streams using syntax definition methods. A syntax definition has the form definiendum =definiens.

The definiendum is the thing being defined, and the definiens is the syntax rule which describes how the definiendum is constructed. Each definiendum appears on the left side of exactly one definition, and is identified by a name, consisting of a sequence of upper-case letters enclosed in corner brackets: <>. The letters are taken, in column order, from the menu shown in FIG. 50, with not all columns of the menu needing to be represented. Thus, <XCTF>is the name executable component type reference.

Each definiens is a formula consisting of terms and construction symbols. The terms are names appearing somewhere as definienda, or else they are primitives of this definition process, whose names appear also in corner brackets but are spelled entirely with lower-case letters.

There are four construction rules in the definiens:

1. Concatenation is indicated simply by succession of terms. That is, a b denotes the sequence: a followed by b. (There is no construction symbol.)

2. Alternation is indicated by the vertical bar | between terms. As an operator, | is interpreted as having a maximum scope. That is, a c | b d denotes either ac or bd.

3. Iteration is indicated by an asterisk prefix. That is, *a denotes an array (or a sequence) of zero or more a. (The representation of this array is such that it is possible to find each element and the end of the sequence.)

4. A lower-case x preceding a term defined as an array denotes an index into the array. Thus, the entire expression x<XGA>denotes an index into the array called the executable program array (which is presumed unique); it does not contain that array. (By index, we mean only that one element of the array is uniquely denoted; there is no suggestion how the reference is implemented.)

If text in parentheses appears on the same line as a definition, it is a remark which does not participate in the definition.

Section 5.2 The Component Forms

Descriptions of components can exist in several forms. The form letter distinguishes the descriptions of these forms.

L Three of these forms are component type descriptions. What they have in common is that they carry the information (procedure and/or data) which defines the execution function of a component type.

A type description can exist in its simplest "L" (library) form in the component library of an assembly tool. In a library component type description, references to types exist only as names.

A component type description exists in the L form when in the library but is transformed into X form when brought into the wiring workspace of an assembly tool.

A library component type description of a composite component records the single top-level wiring diagram inside this component. The description of a composite component does not encompass the internal wiring diagrams of any composite components which occur in this top-level wiring diagram. The components in this top-level wiring diagram inside the composite component are called the subcomponents of the composite component. In the L form of a component type description, the types of subcomponents are named and are presumably defined in an accessible component library.

X L-form and X-form component descriptions are almost identical. In an X-form executable component type description, named references to subcomponent type descriptions occurring in the L-form are supplemented by storage references suitable for efficient execution.

A component type description, when in X form in a computer's working memory, can be anonymous or named (it can have no type name or one unique type name), but any component type description in the L form which exists in a component library must be named.

The X-form component type descriptions of all subcomponent types of a program are collected together as an array. Such an array of X-form component type descriptions is called an executable program description.

An executable program description (also called an executable program array <XGA>) is not a component type description but is an array of X-form component type descriptions. Within an executable program description, any single X-form component type description also satisfies the definition of an L-form description.

When an L-form type description is brought into the wiring workspace of an assembly tool, the X-form description that it becomes always is an element of an executable program description array. That is, X-form component type descriptions exist only as elements of executable program descriptions.

I A component instance is a data structure occurring during execution which carries the values (more correctly, references to the values) being processed by a running program. Component instances are created as part of a program instance from an executable program description prior to execution.

E An editable component type description is additional wiring-diagram information added to an L- or X-form description to make the L- or X-form type description suitable for visual examination or modification by a component assembly tool. Such additional information includes all assembly-tool appearance information, such as pictures, component positions, wire routing, and help facilities.

The remainder of this chapter describes a set of possible structures for these forms. Each definition section is followed by an example.

Section 5.3 Definitions of Library Forms

Figure 51:
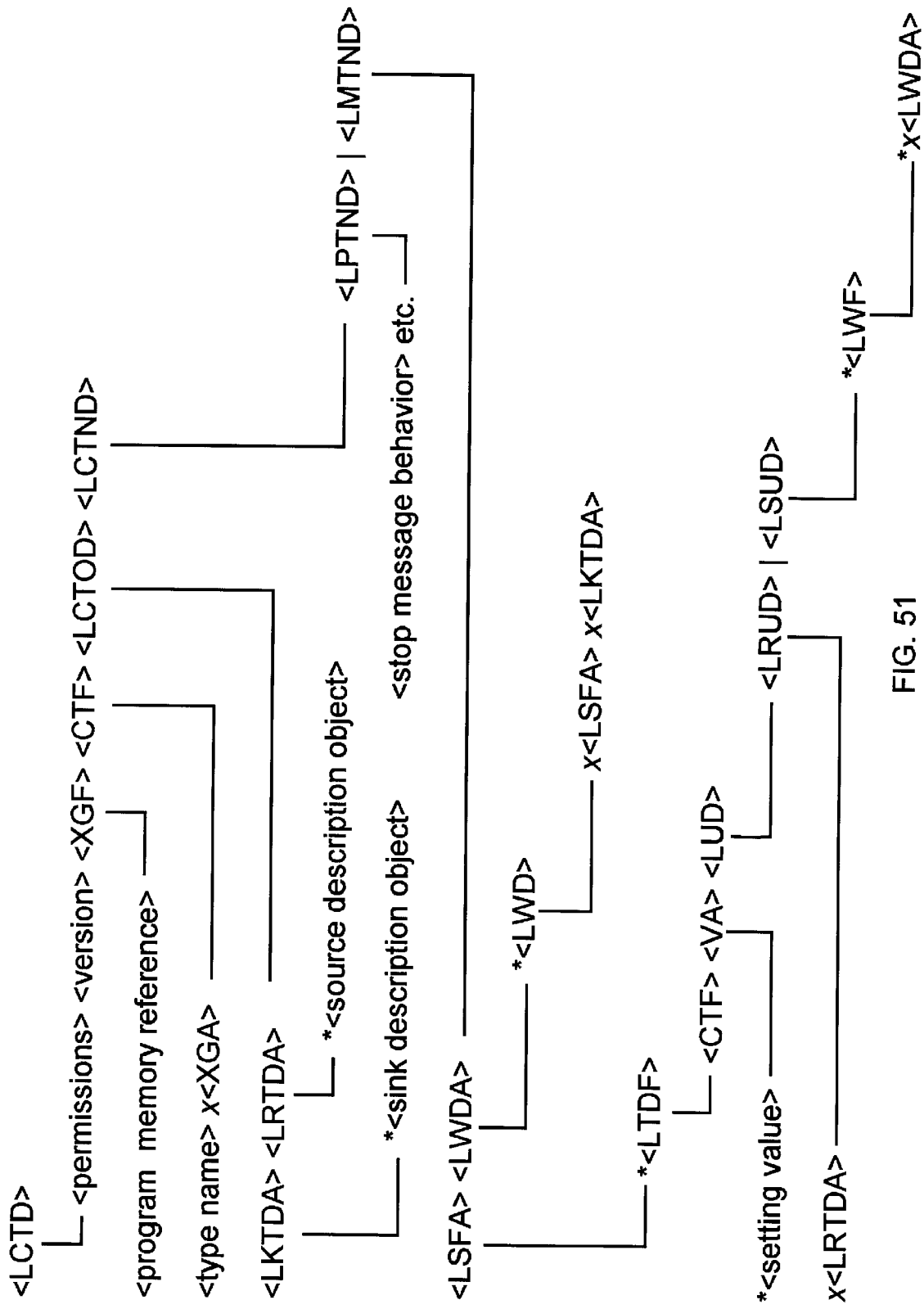
FIG. 51 shows a syntax diagram for library forms.

FIG. 51 sums up the L-form descriptions which will be discussed in this section. A line leading down from a definiendum name leads to the definiens for that definiendem.

<LCTD> = <permissions><version><XGF><CTF><LCTOD><LCTND>.

A library component type description begins with <permissions>, which is discussed in Part 9. This is followed by <version>, containing possible version and time-stamp information, a memory reference <XGF> to the program array <XGA>, a type identification <CTF>, an outside description <LCTOD>, and an inside description <LCTND>.

<XGF>=<program memory reference>.

An executable program reference has meaning only in the X-form (i.e., <XCTD>) variant of <LCTD>; see Section 5.5. It is a memory reference to the executable program array <XGA> itself.

<CTF><type name>x<XGA>.

A component type reference identifies a component type. It can take different forms in different contexts. <type name> is empty if the type is anonymous. x<XGA> has meaning only in the context of an X-form description of a subcomponent, and is discussed in Section 5.5.

Also, what distinguishes X-form from L-form type descriptions is that
1. the <XGF> is meaningful only in the X-form, and
2. in X-forms of composite component types, each <CTF> appearing in the <LMTND> is elaborated with some memory-reference information useful for execution.

X-forms and L-forms of primitive component types are identical, except that the <XGF> of the X-form is meaningful.

<LCTOD>=<LKTDA><LRTDA>.

A library component type outside description is a library sink type description array followed by a library source type description array. (As noted in Section 1.1, the description of the outside of any component is simply an enumeration of its sink and source connectors.)

<LCTND>=<LPTND>|<LMTND>.

A library component type inside description is either a primitive inside description or a composite inside description. Note that the preceding outside description is the same for both.

<LKTDA>=*<sink description object>.

A library sink type description array is an array of <sink description object>s. Each <sink description object> stores within it a value which enables any sink object created from this description to respond to the receive flow oop message (see Section 3.4). For primitive components, this value is an inherited pointer or other reference to the procedure for handling this message. For composite components, this value is an inherited pointer to the method for handling the receive flow message, plus an index into the <LSFA>(see below) of the inside primitive sink connector subcomponent corresponding to this outside sink.

<LRTDA>=*<source description object>.

A library source type description array is an array of <source description object>s. Each <source description object> might not occupy space, but needs to exist as a placeholder; its E-form occupies space.

<LMTND> = <LSFA>     (for all inside components)
         <LWDA>.    (for all inside wires)

There are two arrays in a library composite type inside description: the subcomponent reference array <LSFA> and the wire description array <LWDA>.

<LSFA> = *<LTDF>.
<LTDF> = <CTF><VA><LUD>.
<VA> = *<setting value>.
<LUD> = <LRUD> | <LSUD>.
<LRUD> = x<LRTDA>.    (source connector subcomponents)
<LSUD> = *<LWF>.      (all other subcomponents)

The library subcomponent reference array is made up of library type description references (<LTDF>s), one for each subcomponent instance in the top-level wiring diagram which defines the composite component. Each <LTDF> has three parts; the <CTF> contains a <type name>, the <VA> is a possibly empty array containing (or uniquely referring to) any setting value(s) associated with this subcomponent occurrence, and the <LUD> specifies where the subcomponent's output goes in the wiring diagram. This output specification can take two forms: one form for source connector subcomponents (<LRUD>), the other form for all other inside subcomponents (<LSUD>).

In the case of source connector subcomponents, the <LRUD> says which outside source connector this inside source connector subcomponent corresponds to. In the case of all other subcomponents, the <LSUD> is an array (with as many elements as the number of the component's source connectors) which will lead to the wires connected to each source.

<LWF>=*x<LWDA>.

(for wires originating at one source) For each subcomponent (which is not a source connector subcomponent) there is an array of wire references (<LWF>s). There is one <LWF> in this array for each source connector of this subcomponent. In turn, each <LWF> contains an array, with one element of the latter array for each wire leading from the respective source connector. Each element of this latter array is an index into the wire description array <LWDA>.

<LWDA>=*<LWD>.

The wire description array is an array of wire descriptions, one for each wire in the (top-level) wiring diagram which defines the inside of the composite component.

```
<LWD>= x<LSFA>   (wire's terminal subcomponent)
       x<LKTDA>. (sink on terminal subcomponent)
```

Each wire description has two elements, which denote the subcomponent which sinks it and the index of the sink connector (on that subcomponent) at which it terminates.

```
<LPTND>= <stop message behavior>
         <idle message behavior>
         <run message behavior>
         <sink connector invalidated behavior>
         <flow received behavior>
         <dependent be notified behavior>
         <owner be notified behavior>
         <complete input response behavior>
         *<event-receipt behavior>    (each event type)
         *<notify hosts behavior>     (each message)
         *<pick behavior>             (each DoIt)
         *<command behavior>
         <instantiation behavior>.
```

This definition enumerates what an executable primitive type inside description must contain; some of these behaviors might be empty, combined, and/or inherited. (Note: a method implements a behavior in response to receipt of the oop message associated with that method.)

1. Implementation of the stop method.
2. Implementation of the idle method.
3. Implementation of the run method.
4. Implementation of the sink connector invalidated method.
5. Implementation of the flow received method.
6. Implementation of the dependent be notified method.
7. Implementation of the owner be notified method.
8. Implementation of the complete-input-response procedure.
9. For each event type which can be received by the component, implementation of the event-received method.
10. For each notify-hosts message which this component recognizes, the name of the message and the method for that message. (There is inherited behavior which receives the notify hosts messages and finds the appropriate method, if any.)
11. For each pick message of DoIts of which this component is a server, the method of that message.
12. Commands (wiring-time behaviors) are discussed in Section 5.10.
13. A method for allocating and initializing instance storage (see Section 5.7) required by each instance of this primitive component type.

Section 5.4 Example of a Library Form

We continue to use the example we have been using in FIG. 1 and FIG. 45, which show the wiring diagram which defines a composite component named FileDialog.

Our purpose is to describe the structure of the <LCTD>for the FileDialog composite component; this is shown in gross form in FIG. 52. (In these drawings, the data stream reads from top to bottom. Light outlines provide structural information; in addition, heavy rectangles and bold fonts describe objects which occupy storage. In some methods of implementation, structural information can also occupy storage.)

The rectangles labeled LKTDA and LRTDA make up the pair of arrays which constitute the outside connector descriptions; there are no sinks and one source.

The inside description, <LMTND>, is a characterization of the defining wiring diagram (seen in FIG. 1, FIG. 45, and FIG. 54) sufficient for specification of the component's execution behavior. From the definition

```
<LMTND>= <LSFA>   (for all inside components)
         <LWDA>.  (for all inside wires)
``` we see that it consists of two arrays. The first array <LSFA>contains type-description-reference elements <LTDF>of the 14 subcomponents in the internal wiring diagram. The second array <LWDA> contains one element <LWD> for each of the 17 wires in the internal wiring diagram.

The <LSFA> array characterizes the subcomponents of the defining wiring diagram. It contains 14 elements, corresponding to the 14 subcomponents in the defining wiring diagram. FIG. 53 contains a table showing the 14 subcomponents in the order in which they will appear in <LSFA>. (In any real environment, the order of appearance might be an accidental consequence of the order in which the wiring diagram was drawn. In particular, there is no significance that the connector component is last.)

The wiring diagram which defines FileDialog is repeated in FIG. 54 with the component instances numbered in bold as in FIG. 53, and the wires numbered (also arbitrarily) in light italic.

Each of the subcomponents is represented in the <LSFA> array by an <LTDF> of the form:

<LTDF>=<CTF> <VA> <LUD>.

<CTF> contains a <type name> used to name the type. <VA> is empty except for the two TextSources (this is a simplification; the ResizableWindow also has settings). The output description <LUD> describes where the output of the component goes.

<LUD>=x<LRTDA>|*<LWF>. (an abbreviation)

For element 14, the output description is the index (x<LRTDA>, with the value 1) of the outside source connector corresponding to this source connector component. For all but element 14, the output description is an array of wire references <LWF>.

For each subcomponent, the array of <LWF> has as many elements as there are source connectors of the subcomponent. Each <LWF> is, in turn, an array which enumerates the (possibly empty) collection of wires which originate at the respective source connector. FIG. 55 contains a repetition of the table of FIG. 53 with additional information (number of sources) needed to build the <LWF> arrays in the <LUD> column of FIG. 56.

Note that the <LUD> entry for element 14 of FIG. 56 is not a list of indexes into the wire-description array <LWDA>, as all the others are, but denotes the outside source connector to which this inside source connector subcomponent corresponds. (In this case it is an index into an array with one element.)

The wire description array <LWDA> shows, for each of the 17 inside wires, the number of the terminal subcomponent and the number of the sink on this subcomponent.

<LWD> = x<LSFA> (wire's terminal subcomponent)
x<LKTDA>. (sink on terminal subcomponent)

FIG. 57 contains the information in the array <LWDA>. (It is also an accidental coincidence that connectors are numbered from top to bottom within a component.)

FIG. 58 consolidates this derivation of the structure of the FileDialog <LCTD>.

Section 5.5 Definitions of Executable Forms

There are two executable forms of interest.
1. The executable component type description <XCTD> is a minor variant of <LCTD>, which has been defined above.
2. The executable program array <XGA> is an array of <XCTD>.

An L-form component type description is turned into an X-form by
1. putting a memory reference to the <XGA> in which the <XCTD> is sitting into the <XGF>, and
2. (for a composite component type only) augmenting the type name in the <CTF> of each referenced subcomponent type by a memory reference to the X-form description of that type in the <XGA>.

In an executable program array the X-forms of all the types referenced (at all wiring levels) in the program are collected into an array <XGA>, with each type appearing anywhere in the program occurring in this array exactly once.

We shall define an X-form component type description algorithmically, by describing the process of converting an L-form description into an X-form description. This will occur as a byproduct of the algorithm which converts the L-form of a (usually composite) component type representing a program into an executable program array.

We define two new concepts.
1. The array <XGA> is the result of applying the conversion algorithm.
2. A "working description" is a type description which is being converted from an L-form to an X-form description. The conversion algorithm is recursive and, when being executed, can temporarily produce multiple working descriptions at one time.

We call the conversion algorithm P(w), where w is a working description or a type name. To convert the L-form component type description D to X-form, we perform the following steps.
1. Create the array <XGA>, initialized empty. Let r be a memory reference to this <XGA>.
2. Perform P(D).
3. The result is the completed <XGA>. More specifically, <XGA> is the executable form of the description of the program whose top-level component is D. If <XGA> ends up with n elements, <XGA>[1] contains the X-form of D. If D is composite, <XGA>[2] to <XGA>[n] contain the X-forms of all component types which are referenced, both directly and indirectly, in the wiring diagram defining the inside of D. Thus, an executable program array is an array of executable component type descriptions.

P( ) is a function which accepts as an argument either a type name or a working description, and returns an index into <XGA>. (The variables N, i, and m are local to P( ).)

The description of P(w) is as follows.
1. (Definition: "Add w to <XGA> at j" means this. Assume <XGA> has elements 1 . . . n. Create element n+1, put w in this element, put n+1 into the x<XGA> slot of the outside <CTF> of w, and put r into the <XGF> of w. Assign the value n+1 to j; then all subsequent references to w become references to this new element of the array.)

Insure that <XGA> uniquely contains a working description of the type denoted by w, as follows.
   a. If w is an anonymous description, add w to <XGA> at i. (This can only happen for the first element of <XGA>, i=1.)
   b. If w is a type name N: Examine <XGA> for a type description with name N in the <CTF> preceding its outside definition. If N is present in <XGA> at index i, exit P( ) returning the value i. If N is absent, obtain from the library the L-form of the type description with name N, and add the L-form to <XGA> at i.
   c. If w is a type description with name N: Examine <XGA> for a working description with name N in the <CTF> preceding its outside definition. If N is present in <XGA> at index i, exit P( ) returning the value i. If N is absent, add w to <XGA> at i.
2. If w is primitive or is the name of a primitive type, exit P( ) returning the value i.
3. If w is composite or is the name of a composite type, and the type description has k elements in array <LSFA> in its inside description, iterate over the array <LSFA> from 1 to k. Each element of <LSFA> contains a <CTF> with a <type name>; for each such element:
   a. Perform m=P(<type name>).
   b. Put the value m into the x<XGA> slot of the <CTF>.
4. Exit P( ) returning the value i.

The result of this algorithm is that the X-form of D will be in <XGA>[1], and (if D is composite) all types directly or indirectly referenced by the wiring diagram which defines D will be uniquely present in <XGA>. <XGA> itself is the executable program description whose top-level wiring diagram is the definition in <XGA>[1].

We have distinguished between the executable form of a program, which is an <XGA> array, and an X-form of a component description in the program, which is some element of this array. Furthermore, the component from which the program definition <XGA> was built has its X-form in element 1 of the array. We call <XGA>[1] the root of the program definition.

Section 5.6 Example of an Executable Form

In order to illustrate fully the conversion algorithm P( ), we must have as an example a program which is defined on at least two levels. FIG. 59 shows the wiring diagram of a hypothetical file content browser, with the components and wires numbered arbitrarily. The composite component labeled FileDialog is the example which has been described in detail in Sections 4.6 and 5.4. The behavior of the example program is as follows. When the program starts, two windows open, one with the title "File Navigator" (opened by the FileDialog composite component), and the one shown in FIG. 59 with "Contents" in the title bar. The output of the FileDialog component (component 4 of FIG. 59) is a file flow object, which is passed into a FileContents filter (component 5 of FIG. 59; see Section 4.4), which sources whatever kind of object is stored in the file as a flow object. This in turn goes into the generic child window component (component 6 of FIG. 59; see Section 4.3), which displays the contents of the file in the window.

Note that in an assembly tool, there is always a topmost composite component. This is the implied composite component whose internal wiring diagram is the top-level wiring diagram in the tool's wiring workspace; if execution of the top-level wiring diagram is attempted, this is the composite component which is the program. (If the tool has just been opened and its workspace is empty, the topmost composite component still exists but has an empty defining wiring diagram.)

The type of the topmost component in the assembly tool can be named or anonymous, whereas all other component type descriptions in the tool and its library are named. (In general programming languages, an anonymous type is one referred to in a programming tool by its construction and not by its name. In the Pascal type definition OneToThree=1..3 for example, the type 1..3 is anonymous, whereas the type OneToThree is named.)

An anonymous type at the top level in an assembly tool's workspace has a lifetime no longer than the current use session of the workspace, unless this type is given a unique name and put into the tool's component library so that it is (1) preserved, and (2) made accessible (by means of its name) for incorporation by the tool into wiring diagrams; this is the essence of encapsulation.

We can assume that the wiring diagram of FIG. 59 was drawn after opening up a workspace in an assembly tool, and defines, therefore, a top-level anonymous type. The L-form of this type description is summed up by the tables of FIG. 60 and FIG. 61. FIG. 60 shows subcomponents and FIG. 61 shows wires.

FIG. 62 shows the L-form description of the component defined by the top-level wiring diagram. Our task is to generate the executable program array <XGA> from this L-form description of the program's wiring diagram. We do this by computing P( ) with an argument consisting of this anonymous L-form description. The table of FIG. 63 shows the progress of this computation. Each line of the table shows the result of a distinct invocation of the function P( ). The column labeled <XGA> shows the <XGA> array after this invocation and prior to the next invocation (with type names abbreviated for the sake of space, and elements preceded by their indexes and separated by commas). The lines labeled (unchanged) are the result of exiting P( ) early because the name in the argument is already present in <XGA>; the applicable text in the algorithm is "if N is present in <XGA> at index i, exit P( )". Indentation in the argument column indicates an invocation of P( ) within an already existing invocation of P( ).

The resulting <XGA> array is shown in FIG. 64. Each element of the array is an X-form description of the type shown.

Note that all of the 14 distinct types named directly or indirectly in the top-level wiring diagram are present exactly once. In the <LSFA> array in the inside descriptions of each of the X-form type descriptions of composite types (i.e., in elements 1 and 5), each type name is supplemented by an index into <XGA> pointing to the entry carrying the description for that type name. We show this in FIG. 65 for the anonymous type description and in FIG. 66 for the FileDialog type descriptions. (Note that these X-form structures are called <XCTD> rather than <LCTD>. For descriptions of primitive types, the <XCTD> is the same as the <LCTD>.

Finally, we show in FIG. 67 the gross structure of the <XGA> with the subcomponent type references shown by arrows.

Section 5.7 Definitions of Instance Forms

The executable program array <XGA> carries the information sufficient for storing, in an assembly tool or in an execution environment, the functional description of a program. It is our equivalent of a loaded executable file structure in the conventional procedure-data paradigm. In this conventional paradigm we can distinguish between a loaded executable file structure and the structure of a program being executed from this executable file as follows. (We ignore dynamic overlay for simplicity.)

The structure of an executing program consists of the loaded executable file structure plus data structures not in the loaded executable file which hold user data and state information during execution.

In the conventional procedure-data paradigm we call this structure consisting of the executable file plus data a program instance. Since the executable file is a read-only data structure, it is possible to visualize multiple program instances executing concurrently, all based on the same executable file.

In the present paradigm we similarly distinguish between a program description, as <XGA> is above, and an instance of that description, called a program instance, or program.

Program instances allocate storage for the following data.

1. The program's pending-action list (see Section 2.2).
2. Storage required by each component instance in the program, to wit:
   a. Information sufficient to determine the type of the component instance and the identity, if it exists, of the supercomponent (the composite component containing this component as a subcomponent in its defining wiring diagram).
   b. The flow storage associated with each connector object of the component instance (see Section 1.1).
   c. For primitive component instances which are the owners of flow objects, storage required by these flow objects (including the wrapper storage common to all flow objects; see Section 1.2). (Flow object storage can be thought to be associated with the component which is the owner of the flow object, but it is not necessarily implemented as part of the owner's instance storage.)
   d. For primitive component instances in general, data storage required for execution of these primitive components. In the case of user-interface components, for example, this would include storage required to maintain communication with the operating system's user-interface management system.
   e. For composite component instances, a list of references to the subcomponent instances.

We have encountered two new concepts: program instance and component instance, which we now describe. FIG. 68 summarizes their syntax definitions.

<IG>=<pending-action list> <IGA>.

<IGA>=*<IC>.

An executable program instance is created from an executable program description (an <XGA>) by instantiating that description, that is, by creating an <IG> structure.

The <IG> contains a <pending-action list> plus an array <IGA> of all the component instances <IC> in the program. Each component instance is instantiated from the <XCTD> element of <XGA> which defines the respective component's type, and the instance contains a reference to that <XCTD> element in the <XGA>. Thus, execution of an <IG> requires the presence of both the <IG> and the <XGA> from which it was created.

<IC>=<ICO> <ICN>.
<ICO>=x<XGA> x<IGA> <IKA> <IRA>.
<IKA>=*<sink object flow storage>.
<IRA>=*<source object flow storage>.

In parallel with its description structure, a component instance consists of an outside part followed by an inside part.

The outside part <ICO> consists of an index x<XGA> into the program type description array (this identifies the type of the component), followed by an index x<IGA> into the component array (this backward reference identifies the supercomponent, and is not meaningful for <IGA>[1]), followed by an array of flow storages for the sink objects of the component, followed by an array of flow storages for the source objects of the component.

<ICN>=<IPN>|<IMN>.
<IPN>=<primitive inside instance storage>.

The inside part of a component instance is either a primitive inside part or a composite inside part. The primitive inside part is created by the instantiation behavior of the primitive type inside definition <LPTND> (or <XPTND>, which is identical), and includes any initial setting value(s). These setting values have default values specified by the primitive type description, but if the instance occurs as an instantiation of a subcomponent of a composite component type, these default values can be overridden by the value array <VA> associated with this subcomponent occurrence.

<IMN>=*x<IGA>.

The composite inside part is an array of indexes into the component array <IGA>. The array of indexes denotes the array of subcomponent instances of the component, and is isomorphic as to number and order of elements with the subcomponent type description array <LSFA> in the component's type description. Just as the x<IGA> in the outside <ICO> (above) is a backward reference to the supercomponent instance, so each x<IGA> in the inside <IMN> is a forward reference to its respective subcomponent instance.

The component instances are created at the time the program instance array is created according to the following procedure.

We define the recursive function I(t,s) where t (type) is an index into <XGA> and s (supercomponent) is an index into <IGA>. I(t,s) instantiates the type <XGA>[t] as a subcomponent of <IGA>[s], adds the instance to <IGA>, and returns the index in <IGA> occupied by the new instance. (If <XGA>[t] is composite, it has also added the component's subcomponents to <IGA> before it returns.)

To instantiate the program represented by the array <XGA> we perform the following steps.

1. Create an <IG> and allocate an empty <pending-action list> and an empty array <IGA> in it.
2. Perform I(1,nil). ("nil" denotes a meaningless index.)
3. The result is an <IG> whose <IGA> is fully populated with the components of the program.

The description of I(t,s) follows. (The variables C,D,i,j,k,m,p,r,y,z are local to I(t,s).)

1. Let D be the X-form type description <XGA>[t]. Assume D has r sources and k sinks. Let C be the new component instance under construction. If <IGA> has components up to index n, let j=n+1. Allocate <IGA>[j] and assign C to it. (That is, subsequent references to C will refer to <IGA>[j].)
2. The outside part of C, <ICO>, is built as follows (refer to the syntax definition of <ICO>).

x<XGA>=t.
x<IGA>=s.
<IKA> is a k-array of <sink object flow storage> with all elements initialized invalid.
<IRA> is an r-array of <source object flow storage> with all elements initialized invalid.

3. If D is primitive, the inside part of C is allocated and initialized by executing the <instantiation behavior> which is part of the inside definition <LPTND> of D.
4. If D is composite, its inside definition <LMTND> contains the subcomponent reference array <LSFA>. Assume <LSFA> has m elements. (That is, the component type D has m subcomponents.) Each of these m elements is an <LTDF> which contains a <CTF> which contains an x<XGA>, whose value we call y. That is, for each subcomponent, y is an index into the type description array which denotes the X-form description of the type of the respective subcomponent.

Allocate an m-array <IMN> which becomes the inside part of C. (The values of the elements of <IMN> are not yet defined.)

Iterate over the <LSFA> array, with index p varying from 1 to m. For the pth element whose <CTF> contains x<XGA> with the value y, perform z=I(y,j). Assign z to <IMN>[p].

This iteration instantiates the m subcomponents (which may further instantiate others if any subcomponent is composite). The y argument of I(y,j) denotes the type of the subcomponent, and the j argument is the index of the supercomponent C in <IGA> of the subcomponent instance to be created.

Note the following consequences of this instantiation procedure.

1. In the inside instance storage array <IMN> for a composite component in array position k, all the elements of <IMN> have values greater than k. (That is, subcomponent references in the <IGA> array are forward references.)
2. The supercomponent reference x<IGA> in the outside part of an instance in array position k has a value less than k. (That is, supercomponent references in the <IGA> array are backward references.)
3. The <IGA> is ordered as a depth-first traversal of the instance tree.
4. <IGA>[1] is the (sole) instance of <XGA>[1]. We call <IGA>[1] the root component of the program.
5. Under this set of definitions, a composite type description must not refer to itself as a subcomponent (at any level) or else I( ) will not terminate. This restriction is the reason recursively defined component types are treated separately in Part 7. There are alternative type and instance form definitions and associated functions, not discussed here, which employ "lazy" instantiation of certain subcomponents and thus permit the direct definition of recursive types by self-reference.

Note also that because executable type descriptions are read-only, it is possible to have a single executable program description <XGA> with several instances <IGA> instantiated from it.

Section 5.8 Example of an Instance Form

We shall discuss the process and result of instantiating the anonymous file-browser program described in Section 5.6. The gross structure of the array <XGA> is repeated in FIG. 69.

The table in FIG. 70 shows the parameters of each invocation of I(t,s) and the state of the array <IGA> after this invocation adds its element to the array. In the <IGA> column the appearance of a type name denotes an instance of that type. Indentation in the I(t,s) column denotes sub-component instantiation.

The resulting array of 21 component instances has its key features shown in the table of FIG. 71. The columns are: the index in the array of the component instance, the index in the array of the component's supercomponent, the type of the component instance, and the indices of the subcomponents if composite or "p" if primitive.

The two composite instances are at positions 1 (instantiated by I(1,nil)) and 5 (instantiated by I(5,1)) in the instance array. The anonymous component instance at position 1 appears in FIG. 72, and the FileDialog component instance appears in FIG. 73. Observe the parallels to the <XCTD> structures shown above in Section 5.6, particularly in the inside parts.

Finally, we show in FIG. 74 the gross structure of the instance array in the context of the type definition array to which it refers. The left column of FIG. 74 is the type definition array <XGA>. (This array is shown in FIG. 67.) The right column is the instance array <IGA>. Each arrow going to the left from an instance to a type description indicates the type of the instance. The downward arrows on the right of the instance array point to the subcomponent instances of the two composite component instances.

Section 5.9 On the Distinction Between "Wiring Time" and "Run Time"

FIG. 75 employs the projection paradigm to illustrate the relationships among the component type, component instance, program type, and program instance forms and the user interfaces which can occur on these forms in various contexts. It shows that, using the projection paradigm, the total process of wiring, debugging, and running a program in the context of an assembly tool can be seen as a single application with four different kinds of projections possibly occurring concurrently.

Having accepted the projection-paradigm view of (specific components within) applications as projecting objects onto the user interface, we can see where a dynamic debugging "source-language animator" fits in this scheme. As shown in FIG. 75, a source-language animator is a projector of an object which contains both the execution (specifically, flow-object and communication-act) state of a program and wiring-diagram information from the E-form descriptions, as well as component instance state.

An animator also has "single-step" capabilities which can pause execution after each communication act in order to permit inspection of components in the process of event response. A component inspector projects a component instance, showing its run-time state, including settings and flow-object values.

This model of a component editing/execution/animation environment is developed further in Sections 5.13, 6.8, and 8.2. In Section 5.13 we describe what a wiring workspace does. In Section 6.8 we develop a uniform approach to projecting flow objects. In Section 8.2 we focus on the structure of the assembly tool as an application.

For the above reasoning to hold, components must function at wiring time. For it to be possible for components to function at wiring time, flows must be occurring at wiring time. This discussion now answers the question: If flows are occurring at wiring time, what is the difference between wiring time and run time?

A program instance can receive the following three messages from the assembly tool: stop (which can be given at any time), idle (which must be directly preceded by stop), and run (which must be directly preceded by idle).

The stop message to a program empties the pending-action list and sends a stop message to all components, which put invalid values in the flow storage of all their connectors; in addition the primitive components put themselves in reset state, including settings (waiting for a communication act).

The idle message to a program causes an idle message to be sent to all primitive components, which causes them to source whatever flow objects of which they are original sources. (These are most DoIts and the flow objects sourced by Setting Source components.) Components receiving communication acts and events act on them normally.

The run message to a program causes a run message to be sent to all primitive components, which is responded to by those few which, by definition, do something specific when the program starts, for example Pick At Run and Probe components (see below).

In sum, the difference between the state following the idle message and the state following the run message is the picking of a few DoIts, typically those that open application windows. Wiring operations occur after a stop-idle sequence (see Section 5.13).

The function IR(p), where p is an <XGA>, is defined as follows.

1. Perform I(1,nil) in the context of p. Let P be the resulting program instance.
2. Send, in sequence, the messages stop, idle to P.
3. Source any input flows to the sinks of P.
4. Send run to P.

The application of IR( ) ("instantiate-run") to p is called invoking p.

The Component Invocation component (see Section 6.5) employs a generalization IR(p,q), where p is an <XGA> and q is the index of any <XCTD> in the <XGA>.

1. Create a new <IG> and allocate an empty <pending-action list> and an empty array <IGA> in it.
2. Perform I(q,nil) in the context of p, with the results in the new <IG>. Let P be the resultant <IG>.
3. Send, in sequence, the messages stop, idle to P.
4. Source any input flows to the sinks of P.
5. Send run to P.

Calls to the unwind-pending procedure from components in the new <IG> refer to the <pending-action list> attached to this <IG>.

Section 5.10 Components Which Participate in the Development Process

We continue toward clarifying the distinction between wiring time and running time by discussing two components which contribute specifically to the development process. To discuss these components, we must make some assumptions about how wiring diagrams are built. We assume the existence of an assembly tool, which can select individual components in a wiring diagram. When a component is selected, the list of wiring-time commands appropriate to that component shows in the tool, perhaps in a list box or a popup menu. Picking one of the command names invokes a specific wiring-time behavior of the selected component, whose purpose is usually to give the user an opportunity to alter a setting of the selected component, typically through the opening of a dialog box.

Command Component. The Command component, shown in FIG. 76, is the only component in this group whose function is seen only at wiring time.

The Command component offers an assembly tool the opportunity to display commands for a composite component. This component defines a command name for the composite component which contains it. When a wiring diagram containing a Command component at the top wiring level is encapsulated, this component's command name will appear in the tool as part of the resulting composite component's command list when the composite component is selected. The Command component has one sink, which accepts a DoIt. This DoIt is picked when (1) the (outside of the) composite component is selected and (2) the user picks the Command component's command name in the tool. The command name which shows up in the composite component's command list is the value of a setting of the Command component; it shows in the icon.

Probe Component. This is a debugging instrument useful at both wiring and run times. The probe component, shown in FIG. 77, has one sink. Its function is to project its input flow object onto a separate flow-object inspector window specifically associated with this probe instance. The probe has a wiring-tool command which opens the window immediately, and the window also opens when the probe receives a run message.

Section 5.11 Definitions of Editable Forms

An E-form description is additional type-description information for making wiring diagrams visible in an assembly tool. This information is added as a tail of some part of an L-form or X-form description, so that an executable X-form description containing this E-form type description can simply be truncated to produce an execute-only form. Following are the parts of L- and X-form descriptions which can be enhanced by E-form descriptions.

Component types. Each component type requires a graphic, such as a bitmap, for drawing a picture of the component. This might or might not include the graphics for the connectors, depending on the design approach. The region occupied by the graphic must be described. An important purpose of this region is to define when the user has pointed inside the component. In addition, a variety of help facilities can be associated with the component type. We modify the definition <LCTD> by adding <ETD> to its tail as follows.

<LCTD>=<permissions> <version> <XGF> <CTF> <LCTOD> <LCTND> <ETD>.

Connectors. Each connector on each component must be accompanied by a region occupied by the connector and by a point at which wires will begin or end. Each connector's region is used to determine when the user has pointed inside the connector. This can affect drag semantics in the wiring tool, possibly as follows.

1. Dragging from a point inside a connector defines a new wire.
2. Dragging from a point inside a component but not inside a connector moves the whole component, including the wires connected to its connectors.

In addition, each connector should have a name, unique within the component type, and its own help facility. We modify the definitions of <sink description object> and <source description object> by adding <EKD> and <ERD>, respectively, as follows.

<LKTDA>=*<LKTD>.
    <LKTD>=<sink description object > <EKD>.
    <LRTDA>=*<LRTD>.
    <LRTD>=<source description object> <ERD>.

Subcomponents. The positions of subcomponents in a composite component's wiring diagram are attached to the respective elements of the subcomponent reference array <LSFA>. This element definition, <LTDF>, is augmented by adding <ESD> as follows.

<LTDF>=<CTF> <VA> <LUD> <ESD>.

Wires. The endpoint coordinates of wires are not carried with the wires but can be inferred from the identity of the two connectors identified with each wire in the type description. This information should not be duplicated in the wires. However, each wire must carry routing heuristics which help to draw the wire regardless of the repositioning of its endpoints. We modify the definition of <LWD> by adding <EWD> as follows.

<LWD>=x<LSFA> x<LKTDA> <EWD>.

We now discuss briefly each of these E-form extensions.

<ETD>=<type graphic> <graphic region> <type help>.

The <type graphic> is a picture of the outside of the component type. The <graphic region> defines what points are inside the picture and what points are not. Both are positioned with respect to an arbitrary point called the origin of the component.

<EKD> = <connector point> <connector region>
             <connector name> <connector help>.
    <ERD> = <connector point> <connector region>
             <connector name> <connector help>.

In the scheme described here, the graphic associated with each sink and source is part of the type graphic, but the coordinates and regions of the sinks and sources are associated, respectively, with the connectors. The <connector point> and <connector region> are with respect to the origin of the component. Alternatively, sink and source graphics can be inherited by <EKD> and <ERD>, respectively, and not explicitly included in a component's <type graphic>.

<ESD>=<subcomponent origin position>.

The origin position of each subcomponent is with respect to a fixed origin point for the whole wiring diagram.

<EWD>=*<vertex>.

A wire description is an array of vertices. If the array is empty the wire is drawn as a straight line. Otherwise, the wire appears to be a connected series of straight runs, from source to first vertex, from vertex to vertex, and from last vertex to sink. A <vertex> contains a point value (with fractional x and y values possible) and an identifier which specifies how the point is to be interpreted in the positioning of the vertex. Three values of the identifier are (1) fixed displacement from source, (2) fixed displacement from sink, (3) proportional ratio in rectangle whose corners are defined by source and sink.

Note that the graphics for the outside of any component type are defined by <ETD>, <EKD>, and <ERD>, whereas the graphics for the inside of a composite component type are found as follows.

1. The position of the origin of each subcomponent's graphic in the wiring diagram is found in that subcomponent's <ESD>.
2. The subcomponent's icon and region are found in the <ETD> for the type of the subcomponent.
3. Wire end-point positioning information is accessed by starting at the subcomponent containing the source connector(s) sourcing the wire(s) in question.

a. To find the coordinate of the (source) starting point of the wire, go to the sourcing subcomponent's type description and add the <connector point> for the source connector in question to the sourcing subcomponent's origin.
b. To find the coordinate of the (sink) ending point of the wire, find the identity of the sinking component and of that component's sink connector from the wire's <LWD>. Then add the <connector point> for the sink connector in question to the sinking subcomponent's origin.

4. The information for routing a wire between its end points is in the wire's <EWD>.

Section 5.12 Example of an Editable Form

FIG. 78 shows the inside of the root component of the file content browser program, with the component icons labeled with their origin positions in a pixel-based coordinate system.

The wires are all straight-line runs, so each wire's <EWD> array is empty. FIG. 79 shows how the anonymous <XCTD> shown in FIG. 65 is modified with the addition of E-form data.

Section 5.13 What the Wiring Workspace Does

The wiring workspace of an assembly tool is a "document-oriented" application (that is, it maintains an object and offers projection(s) of this object); the document is an <XGA>. If the <XGA> contains n X-form type description elements (<XCTD>s), then the application has the potential to open n wiring-diagram windows, one on each <XCTD>.

The two-letter codes xL in the following paragraphs refer to the licenses discussed in Section 9.1.

Creating a workspace. There are two ways to create a workspace, corresponding to the New and Open . . . File menu items of almost all document-oriented applications.

1. Open a new, empty workspace.
2. Open a workspace on a named <LCTD> which exists in the library of the assembly tool. (Requires OL.)

Opening a new, empty wiring workspace creates an <XGA> with n=1; <XGA>[1] is anonymous and contains no wires and no subcomponents. <XGA> is instantiated, producing an empty program. A window opens to project <XGA>[1]; it has no components and no wiring in it.

Opening a workspace on an existing type description follows the process described in Section 5.5.

1. Obtain the designated <LCTD>; call it D.
2. Create an empty <XGA>.
3. Perform P(D) with respect to this <XGA>.
4. Instantiate <XGA> and send stop-idle to the program.
5. Open a window to project <XGA>[1]. (<XGA>[1] is named and is the X-form of D.)

Editing wiring diagrams. Editing a wiring diagram is done by performing user-interface operations in one of the windows projecting one of the <XCTD> in the <XGA>. (A detailed description of a workable set of user-interface actions for editing wiring diagrams is given in Section 6.8.)

As a matter of good practice, only anonymous type descriptions should be modifiable. That is, only a window projecting <XGA>[1] can be edited, and then only when this <XGA>[1] is anonymous. This policy exists because many type descriptions in the library might refer to a particular named type description, so the modification of this named description should be a carefully considered act. Here is how a named description can be modified.

1. Open a workspace on the named (composite) component type (requires OL). This opens a window on the wiring diagram defining the component.
2. Perform a "Make anonymous" operation on the workspace (requires DL). This removes the name from the <CTF> on the outside of <XGA>[1].
3. Modify only the wiring diagram which is a projection of <XGA>[1].
4. Encapsulate the workspace. As part of the encapsulate operation, the user is asked what name to give the new type description. (There might be a default suggestion which is the original name.) When this name conflicts with an existing library name, the user is asked whether the new type description is to replace the existing one. (Some input-output consistency checking between the existing description and the new description should be performed to help the user answer the question.) Only if the user answers "yes" should the replacement be made.

Encapsulation. Encapsulation is an operation performed on a wiring workspace. All it does is 1. put a type name in the <CTF> on the outside of <XGA>[1] (which must have been anonymous) and
2. put this <XCTD> into the component library.

(Strictly speaking, the <XCTD> in <XGA>[1] is suitable as an <LCTD> without modification, but compression of sparse arrays and nulling out of memory references is desirable for reasons of efficiency, aesthetics and/or security.)

Modifying a wiring diagram. (All these operations require WL.) Given the restriction stated above on which projection windows will accept modifications of wiring diagrams, here is how these modifications are effected. (See Section 5.3 for structure definitions.)

Wire deletion. There exists an index w such that the wire being deleted is a projection of <LWDA>[w] inside <XGA>[1]. (Let D denote <XGA>[1.])

1. Scan the <LSFA> inside D, looking for wire references to w in each <LWF>. Null out each such reference; do not compress the <LSUD> array. (Null is a meaningless element which replaces the meaningful one. It is recognizable as not processable and occupies one element of an array.)
2. Put null in <LWDA>[w]; do not compress <LWDA>.
3. To the sink connector formerly connected to the removed wire, send the receive flow message with a reference to MO as a message parameter. When control returns, call the program's unwind pending procedure.

Component deletion. A component can be deleted only after all the wires connected to it have been deleted. (Deletion of all connecting wires can be done as part of the component deletion, if the user confirms that he wishes this done.) There exists an index s such that the component being deleted is a projection of <LSFA>[s] inside <XGA>[1] (called D).

1. Put null in <LSFA>[s]; do not compress <LSFA>.
2. If the component being deleted is a connector component, the respective element of <LKTDA> or <LRTDA> must be nulled out; do not compress the array.
3. Do not remove any element of <XGA>, even if the removal of this component results in there being an <XCTD> in <XGA> with no references to it.

Wire addition.

1. Expand the <LWDA> by one element to size w, and put the new <LWD> into this new slot w.
2. For subcomponent s and source r within this subcomponent which connects to this new wire, add w at the end of the wire reference array <LSFA>[s] [r].

3. Let f be a copy of the flow object reference in flow storage of the source connector connected to the new wire. If, and only if, f is valid, send the receive flow message, with f as a message parameter, to the sink connector connected to the new wire. When control returns, call the program's unwind pending procedure.

Component addition.

1. Expand the <LSFA> by one element to size s, and put the new <LTDF> into this new slot s.
2. Let t be the type name in the new <LTDF>. Perform x=P(t). (See Section 5.5.)
3. If the component being added is a connector component, <LKTDA> or <LRTDA> must be expanded by one element. This new last element, if it is a <sink description object>, must refer to subcomponent s.
4. For each <IGA> referring to this <XGA> add an instance of the component type as follows. In <IGA>[1] expand the <IMN> by one element to size s, and put the result of I(x,1) into this slot.

Opening a projection on a subcomponent. Select the subcomponent and perform a "Zoom in" command (requires OL). The assembly tool finds the <XCTD> to which this subcomponent refers and opens a window projecting this <XCTD> (or brings to the top an already open window projecting this <XCTD>). (See Section 6.8 for a design sketch of such a projection.)

Running a program. Perform the "Run" command for the workspace (requires RL for all types in <XGA>). The assembly tool sends stop, idle, run in succession to the instance (i.e., to all components in the instance.).

Part 6 Using Flow Objects for Control

The subject of this part is a design to minimize the distinction between data and control. The way we put this design into practice is to 1. express control functions in the software as objects,
2. put wrappers on these objects (and call them control flow objects),
3. define components which explicitly employ these control flow objects, and
4. employ wiring, in particular selection, to manage the flow of these control flow objects.

The DoIt (Section 1.5) is a simple and important control flow object (see Section 6.3 below for an example). Also, the port may be thought of as a control flow object; in Section 4.3 we briefly alluded to this design in the programming of variable-format windows. In this part we shall illustrate this design in several new ways.

Section 6.1 Transactions

A transaction is the life cycle of a transaction object in the oop sense. A transaction object is instantiated on an underlying object. Implementation details aside, a transaction object contains only two instance variables, a reference to the underlying object and an object, called the transaction's current object. (If the underlying object is a flow object, the current object is the underlying object's data object, excluding the underlying object's wrapper.) When the transaction object is instantiated, the current object is instantiated as an object of the same type as the underlying object (or the underlying object's data object) whose instance variables are copies of the instance variables of the underlying object.

There are two ways the life of a transaction object can end: the transaction is either confirmed (the result of sending the transaction object a confirm oop message) or aborted (the result of sending the transaction object an abort oop message). See FIG. 80. The response to the abort message is to destroy the current object and the transaction object, without changing the underlying object. The response to the confirm message is to replace the corresponding instance variables of the underlying object by the instance variables of the current object (without altering the identity of the underlying object), and then to destroy the current object and the transaction object. (As a possible optimization, only the instance variables whose values have changed need be replaced.)

Transaction Register Component. The component shown in FIG. 81 instantiates and manages a transaction object, of whose current object it is the owner. The component has five sinks and five sources. The top two sinks and sources behave like a register which stores a transaction object. The top two sinks are called Replace and Initialize. The top two sources are called Strobe and Output. The bottom three sink-source pairs sink and source DoIts. These three sink-source pairs are called Open, Confirm, and Abort.

When the DoIt sourced by the Open source is picked, a transaction object is instantiated on the flow object appearing at the Initialize (the second) sink. The current object of this transaction object is then wrapped and sourced from the Output (the second) source, a DoIt is sourced from the Strobe (the first) source, and the DoIt at the Open sink is picked. (This pick can be used to open a dialog window.) Subsequently, picks of the Strobe DoIt cause the input on the Replace (the first) sink to replace the current object in the transaction object, and the current object is sent a notify dependents oop message.

Note that there are two ways the current object can be modified. In both of these cases, each dependent of the current object receives a dependent be notified oop message after the modification.

1. Certain components which sink the current object, such as projectors (described below), directly modify the Output flow object, after which they send the Output flow object a notify owner oop message. In response to this, the Transaction Register component sends a notify dependents oop message to the Output flow object.
2. As described above, the (data object of the) input at the Replace sink replaces the current object, after which the component sends the Output flow object a notify dependents oop message. (This approach is unsafe if there is a wiring error; it is not normally used.)

The transaction's current object output remains in existence until the DoIt sourced by either the Confirm or the Abort source is picked, at which time the transaction is confirmed or aborted. If the Confirm DoIt is picked, the transaction is confirmed, the underlying object (at the Initialize sink) is sent a notify owner oop message, and the DoIt at the Confirm sink is picked. If the Abort DoIt is picked, the transaction is aborted and the DoIt at the Abort sink is picked. (The Confirm and Abort sinks can both be wired to the Close DoIt source of a dialog window component so either one will close the window.)

FIG. 82 illustrates the use of a Transaction Register component in the construction of a composite component which opens a dialog which navigates a directory hierarchy to modify an input directory node object. The dialog opens when the DoIt sourced by the Open source is picked. Note the suggestion that the DoIts sourced by the Open, Confirm, and Abort sources have default text distinguishers (such as "Open", "Confirm", and "Abort"). Thus, the commands under the "End" menu in the window will have suggestive default labels.

File Transaction Register Component. The component shown in FIG. 83 is analogous to a Transaction Register component, except that the input (at the second sink) must be a file flow object (not the contents of a file), and the output is the current object of a transaction object on the contents of the file flow object. The component is the owner of the current object. The top sink accepts a translation control flow object (not discussed here) which manages the bidirectional mapping between the file contents and the current object of the internal transaction object, seen at the second source. The top source (called "Consistent") sources a Boolean flow object. This Boolean is set to false when the component receives an owner be notified or a dependent be notified oop message (with respect to the second source or sink). It is set to true when either the Open, Save, Close, or Revert output is picked and the file operation completes successfully.

Section 6.2 Dialog Projectors

A projector is an object (in the oop sense) which mediates between a flow object to be displayed and the user interface, and which controls (1) the flow object's projection onto the user interface and (2) the modification of the flow object arising from user behavior at the user interface.

Open Dialog Component. The component shown in FIG. 84 has three sinks and one source. The top sink accepts any flow object which is openable. An openable flow object is one which understands an opening message (such as "openDialog"), which causes a dialog to open on the object. The source sources a DoIt, which, when picked, opens the input flow object. The second and third sinks sink DoIts. If the user accepts the dialog (e.g., the "OK" button is pushed), the DoIt at the second sink (called "Confirm") is picked after the dialog closes. If the user cancels the dialog, (e.g., the "Cancel" button is pushed), the DoIt at the third sink (called "Abort") is picked after the dialog closes.

The meaning of a dialog opening on an object is this. A dialog is viewed as a projection screen on which the instance variables of the input object (excluding the wrapper) are projected, in keeping with the projection paradigm. Any editing change the user makes in the dialog (1) causes the respective instance variable of the input flow object to be changed immediately and (2) causes the input flow object to be sent a notify owner oop message.

FIG. 85 shows a characteristic idiom by means of which the opening of a dialog is turned into a transaction on the "Input Flow Object."

Picking the "Open DoIt" creates a transaction object and then opens a dialog on its current object. Editing changes made by the user are reflected back into the current object immediately and then to the dependents, if any, of the current object. (The Open Dialog component is a dependent of the current object, but it does not react to the dependent be notified it receives because it is the sender of the notify owner; see Section 1.9.) After the dialog is closed by either confirming or aborting, the transaction is similarly confirmed or aborted, and the Input Flow Object is, respectively, changed or unchanged.

Finding the Default Dialog Projector. What remains to be described is how the form of the dialog is determined, given the input flow object to the Open Dialog component. The following presents one approach. There is an abstract class, call it DialogProjector, which has a variety of instantiating subclasses such as DialogResourceProjector, DialogItemProjector, and DialogStringProjector. Each of these subclasses mechanizes a different way to define a dialog. For example, DialogResourceProjector has (1) instance variables which name a resource (typically in a resource file) which defines the dialog resource format, and (2) instance variables which describe the bidirectional correspondence between the items of the dialog resource and the instance variables of the underlying object. DialogItem-Projector defines the form of a dialog using a collection of instances of the instantiating subclasses of the abstract class DialogItem, such as DialogEditItem, DialogIntegerItem, and DialogListBoxItem. DialogStringProjector opens a generic text editing dialog on the underlying string. Thus, different mechanisms for how dialogs are defined are associated with each DialogProjector subclass, but specific dialog definitions using a particular mechanism are associated with specific instances of these DialogProjector subclasses.

For each openable flow object class (i.e., a flow object class whose instances can respond to the openDialog message) there is somewhere an instance of a subclass of DialogProjector which this openable flow object class can find. This DialogProjector subclass instance, called the default dialog projector, uniquely defines a dialog for each instance of the openable flow object class. The Dialog-Projector subclass instance might be found in a class variable of the openable flow object class, or it might be found in a global dictionary which maps openable flow object classes into DialogProjector subclass instances. However this dialogProjectorInstance is found, the outcome is that the message (as expressed in Smalltalk)

openableFlowObject openDialog is executed as dialogProjectorInstance openOn: openableFlowObject where the message openOn: is understood by all Dialog-Projector subclass instances. The openOn: message opens the dialogProjectorInstance-determined dialog on openable-FlowObject.

Open Dialog Projector Component. The generalization of the Open Dialog component shown in FIG. 86 permits using the DialogProjector mechanism described above to define multiple dialog formats on the same openable object. The open Dialog Projector component behaves identically to the Open Dialog component if the former's first sink has no input. (That is, if the first sink has no input or this input is MO, the default dialog projector is used as dialogProjector-Instance in the above message.) If there is an input at the first sink, this input is used as dialogProjectorInstance in the above message. That is, if input1 and input2 are the data of the flow objects at the top and second sinks, respectively, then picking the output DoIt sends the message input1 openOn: input2.

Note that the components described so far in this chapter provide a controlled exception to the normal left-to-right flow rule. They do this in a way which can maintain consistency of data across a wiring diagram. The following principle is basic to this mechanism of right-to-left change propagation.

When a right-to-left change originating from user behavior is to be made (as could happen with the Open Dialog component), this change is not made as a right-to-left flow, but goes directly to the flow object being projected, permitting orderly left-to-right updating of dependencies using the notify dependents mechanisms.

This asymmetry between the mechanization of left-to-right and right-to-left change propagation is basic to the invention. It uses owner and dependent relationships to implement tight, consistent, bidirectional coupling between users and data without the necessity for introducing the concept of the right-to-left flow, which concept brings with it many difficult design problems. (Section 6.4 formalizes this observation.)

Section 6.3 An Example of Branching

We now consider how to wire the Open command seen on the File menu of a single-window document-oriented application (i.e., one which does not open a new window each time a new document is opened).

FIG. 87 shows a first approximation to the required wiring diagram. Note the use of the Transaction-Dialog idiom. Picking the Open command in the File menu opens a Standard File Open dialog which, if confirmed, changes the file object owned by the Document Path component to the new file object chosen by the user. (The File Transaction Register component is a dependent of its input; its response is to set Consistent to false.) If the dialog is confirmed, the DoIt at its confirm sink is then picked, which ultimately causes the File Transaction Register component to close the old file (if it exists) and open a new file; this sets Consistent to true.

What needs to be added to this diagram is a facility which, if the old file needs to be saved before it is closed, gives the user this option. This is the purpose of the Consistent Boolean output at the top source of the File Transaction Register component. In FIG. 88 we add this facility by interposing a composite component, to be described, between the Transaction Register's Open DoIt source and the File menu. This component does the following when its output DoIt is picked.

1. If the file is consistent (it does not need to be saved), the DoIt at the open sink is picked directly. This is what FIG. 87 does.
2. If the file is inconsistent and therefore may need to be saved, the component opens a question dialog with the three buttons Yes, No, and Cancel and the question: "Do you want to save the old file before opening a new file?"
   a. If the user picks Yes, the question dialog closes, the DoIt at the save sink is picked, then the DoIt at the open sink is picked.
   b. If the user picks No, the question dialog closes and the DoIt at the open sink is picked.
   c. If the user picks Cancel, the question dialog closes and no input DoIt is picked.

We now describe the wiring diagram inside this new component.

We assume the existence of a Question Box component, as shown in FIG. 89, which opens and closes a dialog using the DoIts at the two sources, and which accepts on the two sinks text for a question and a collection of DoIts which map into a parallel collection of buttons.

The definition of the new component is shown in FIG. 90. The wiring is complete except that the text input to the question box is not shown.

If the Consistent Boolean (eq input) is true, the selector is in the top position, and it is the DoIt which comes into the open input which goes out the Open output and is therefore picked in the File menu. As a result, when File/Open is picked, the open file dialog opens directly.

If the Consistent Boolean is false, the selector is in the bottom position, and when the Open command of the File menu is picked, the question box opens. There are now three cases.

1. If the Cancel button is pushed, the question box closes. Nothing else happens.
2. If the No button is pushed, first the question box closes, then the DoIt at the open input is picked.
3. If the Yes button is pushed, first the question box closes, then the DoIt at the save input is picked (saving the file), then the DoIt at the open input is picked.

(Note the use of top-down design practice in the example, in which the application of a component is visualized before the component is created.)

Section 6.4 Coupling Protocol

Note that the basic mechanism in the preceding example for changing behavior in response to status information is selection of DoIts. This is an important difference from procedural programs containing branches. In the wiring conceptual model, behavior change has two parts.

1. In the left-to-right routing part, the DoIt whose server embodies the desired behavior is first routed to the sender of the pick.
2. In the right-to-left message-passing part, sending a pick then initiates the chosen server behavior.

Note also that the cancel behaviors work as they should.

The above two-part protocol (left-to-right routing, right-to-left message passing) is related to the characteristic four-part coupling protocol which couples changes in internal data to appearance changes at the user interface or to recomputations in dependent components.

1. In a left-to-right routing part, (a reference to) a flow object flows from the owner of the flow object to the sink of a component which can change the data of the flow object.
2. If this component is to change the data, it does this by direct modification (by means of oop messages, of course). It is able to do that because it has a reference to the flow object in its sink flow storage.
3. In a right-to-left message-passing part, the component causing the change sends (via the flow object) an owner be notified oop message to the flow object's owner.
4. In a left-to-right message-passing part, the owner sends (via the flow object) a dependent be notified oop message to each dependent, which then takes a look at the new data. (Note that, even if the component which changed the data is a dependent, its response to the message is blocked; see Section 1.9.)

Section 6.5 Component Invocation Components

In the program definition structure which has been described so far, there is a strict correspondence between window components in the program and windows which can appear on the user interface at run time. This limitation raises the question: How does one create programs (like ordinary text editors) which can open a (theoretically) unlimited number of windows? An answer lies in the definition of another kind of control flow object.

Component Description Component. The component shown in FIG. 91 has as a setting a component type name, which shows in the white rectangle. When this component is added to a wiring diagram or when the setting is changed, the P( ) function (see Section 5.5) makes sure that the <XCTD> for the named type (and also for the types of its subcomponents) is also in the <XGA>. This <XCTD> (i.e., a reference to this <XCTD>), wrapped as a flow object, is sourced by the component.

Note that when the Component Description component is instantiated, no instance is made of the type named by its setting.

(We can also imagine a filter component without the setting; it takes as input a text string which is a component type name, applies P( ) to the type definition, directly sourcing the resulting <XCTD> flow object. Such a component could function within the environment of an assembly tool but not in the absence of a library. Supplying such a component and a component library with an end-user application would be analogous to supplying the Smalltalk compiler and class library with a Smalltalk end-user application, not considered to be an economical practice.)

Component Invocation Component. The component shown in FIG. 92 sinks an <XCTD> flow object at its top sink and sources a DoIt from its top source. When the DoIt is picked, the component description is invoked (see Section 5.9). (The resulting program instance is distinct from the program containing the Component Invocation component.)

The invocation of the <XCTD> is particularized as follows: after control returns from sending the idle message and before the run message is sent to the program, the integer-indexed collection (if any) at the second sink of the component is split and its elements are sourced to the respective sinks of the program. (The use of collections for inputs and outputs is for the sake of presentation only, and we assume compatibility of collections, except as follows: if the input is not an integer-indexed collection, it is sent directly to the first sink, if it exists, of the program.) After control returns from sending the run message, the outputs of the program (if any) are collected into an indexed collection and sourced to any sink wired to the second source of the component. (Note that any ownership of output flow objects remains in the program and is not transferred to the Component Invocation component.) Then, the DoIt at the third sink is picked. After control from this pick returns, control from the original pick is returned.

(There are options regarding the timing of the destruction of the program. In the most general case, the component creates new programs without destroying old ones, and each subprogram is either destroyed when the main program is destroyed or else is responsible for its own destruction by means of an Exit component. Another possibility is that the Component Invocation component destroys a previous program immediately before creating a new one. In this latter case, any outputs must be invalidated before destruction by initiating an MO flow.)

If the component description at the first sink contains a window opened by a Pick At Run component, each pick of the DoIt sourced by the top source will create a new program instance which will open a new window.

Note that applying event-induced selection to program description flow objects is the basis of operating-system-level application-launch functions found in such facilities as the Macintosh Finder and the Windows Program Manager. This operating-system situation with multiple applications running is analogous to the assembly tool situation, discussed in Section 5.9, with multiple types of projections going on concurrently. In both cases, one sees no essential distinction between concurrent multiple applications (each managing its own projection) and a single program spawning multiple subprograms, each with its own style of projection.

Section 6.6 Tools

This section describes a group of components which work with flow objects, called tools, whose interaction with the user interface is procedural.

Display List Child Window Component. This component, shown in FIG. 93, is being presented for expository reasons; it will be superseded in Section 6.7. The component's source connector sources a port flow object. Its sink connector sinks a control flow object which is one of a variety of drawing tools.

The function of the Display List component is to maintain in its child window of the user interface a set of figures drawn by objects in a display list maintained by the component. In addition to the flow storage of its connectors, the component has storage for the display list (an indexed collection of display objects) and for a permutation list (an indexed collection of integers which expresses the stacking order of the display objects).

The component refreshes its child window by sequencing through the permutation list, thereby obtaining in bottom-to-top stacking order a sequence of indices of the display objects in the display list. In this sequence, the component sends the same message to each display object telling it to display itself in the child window. Each display object is an instance of a subclass of an abstract class DisplayObject. Each instantiating subclass of DisplayObject draws one type of figure (rectangle, line, etc.), and each of its instances stores information about the location, size, and shape of the figure in the child window.

There is also an abstract class DrawingTool with a separate instantiating subclass corresponding to each separate instantiating subclass of DisplayObject. In effect, each DrawingTool subclass instance can instantiate a display object from the corresponding Display Object subclass. There is one additional instantiating subclass of DrawingTool, called SelectTool. The DrawingTool subclasses may be thought of as the things which one sees in the palette of an object-oriented drawing program: there is an arrow (selection tool) and a group of tools for drawing specific figures: lines, rectangles, ellipses, etc.

Drawing Tool Components. For each instantiating subclass of DrawingTool, there is a separate drawing tool component. A representative set of drawing tool components is shown in FIG. 94. Each drawing tool component has one source connector, and its function is to source an instance of its respective DrawingTool subclass.

An object-oriented drawing application could be realized by building a main window with (at minimum) a palette and a display list child window. FIG. 95 illustrates this application of event-induced selection to drawing tool control flow objects. In FIG. 95 there is a Drawing Tool component for each tool to be presented in the palette; these are grouped into a collection by one or more Indexed Collector components. An Indirect Selector component working in tandem with a Palette choose-one component selects one drawing tool from the collection and feeds it into the sink of the Display List component. The figure shows both the wiring diagram and the user interface of the running program. (Note that the Palette component has employed the icon distinguishers of the tool flow objects.)

Following is a description of what each drawing tool object does in the display list component. As a group the drawing tools have this in common: they are procedural flow objects which begin their work when the user depresses the mouse button, and they end their work when the user lets up the mouse button. Specifically, at the button-down event, the Display List component gives control to the drawing tool, which keeps control until the button-up event, when the drawing tool gives control back to the Display List component. Between the button-down event and the button-up event, the user has probably been dragging the mouse around the Display List child window. Each tool stays in a tight interaction with the mouse during this period (through the agency of the user-interface management system), capturing the successive positions of the drag.

Except for the select tool, each of the drawing tools has a common function: at the start of the mouse drag, it creates an instance of its DisplayObject subclass. During the drag, it modifies the size and/or position of this instance and, for each mouse move, it passes the current instance of the display object to the Display List component for refreshing the display. At the end of the drag, it hands the current instance of the display object to the Display List component for incorporation into the display list.

The select tool does not instantiate a new display object but interacts with the existing display list. At the button-down event, the select tool is handed control, and it conducts a dialog with the Display List component which finds out if the mouse pointer position puts it inside one of the display objects in the display list. If so and that object is not the selected object, it is made the selected object. (That is, the previously selected object is deselected, this object is moved to the front, and this object is selected, causing it to show its "handles.") Then the select tool conducts its dialog with that selected display object during the drag, moving, rotating, or resizing the object, depending on the part of the display object (which one, if any, of its handles) the selection tool is inside. At the end of the drag, the select tool returns control to the Display List component.

A host protocol. Applications such as this object-oriented drawing program frequently have the feature (perhaps as a changeable option within the program) to restore the palette to the select tool position after each use of a drawing tool. An approach to this is described below; it employs the fact that the Indirect Selector has marked itself as a host of the drawing tool flow object which is sitting in the Display List component.

The Display List component has an option, expressed as a Boolean value (which could be a setting or a variable), which means: if true, each single use of a drawing tool returns the palette to the selection tool position. After the drawing tool returns control back to the Display List component this Boolean is tested. If it is true, the Display List component sends a notify hosts message such as "Return to default selection" to the drawing tool flow object. This (by a global design convention) is a message understood only by selectors. The Indirect Selector, being a host of the drawing tool, sees the message and, because it understands it, acts on it. The effect of the message is to force the selection to the first element (say) of the collection of tools. This does two things: it changes the output of the Indirect Selector, and it notifies the Palette, by means of a notify dependents communication act, that the selection has changed.

Note that, even though tool flow objects are procedural, all the procedure code remains in its tool component. Only a reference flows to the Display List component.

Section 6.7 Child Window Projectors

Flow objects can have child window projectors just as they have dialog projectors. (A Dialog Projector component is a combination of a Child Window Projector component and a dialog window component.)

There is an abstract class Projector whose instantiating subclasses create projector objects. FIG. 96 shows schematically the communication paths by means of which a projector mediates between a flow object to be displayed (called the projectee) and a child window.

Projector functions. A projector has the following functions.

1. Maintain display lists and other dynamic state information particular to the display. These are initialized from the value of the projectee.
2. Receive messages from the child window reporting user-interface events in the child window, and interpret these events. (Also, maintain the capacity to undo these interpretations if the user requests.)
3. As part of interpreting child-window events, send messages to the child window requesting user-interface data (such as mouse position).
4. As part of interpreting child-window events, immediately reflect user-interface changes made by the user back into the projectee. (Even after initialization, the dynamic display data maintained by the projector continues to be consistent with the projectee. A Transaction Register component can be used to isolate these changes temporarily from other data in the application.)
5. Send display messages to the child window.
6. A projector may have its own repertoire of operations (such as editing operations) which might show up in menus or buttons.

Generic Projector Child Window Component (FIG. 97) and Projector Engine Component (FIG. 98). These two components work together to generalize the Generic Child Window component and the Display List Child Window component discussed earlier. The present components can be used in configurations simpler than the most general configuration as follows.

The Generic Projector Child Window component alone (FIG. 97), with no input at the projector (lower) sink, acts like a Generic Child Window component.

The two components wired as shown in FIG. 99, with an input only at the tool (lower) sink of the Projector Engine component, act like a Display List Child Window component.

FIG. 100 shows the two components in their general configuration.

The two sources wired to Named Splitters source named collections whose elements the splitters are used to access. The Projector Data Source provides access to the dynamic display structure managed by the projector. The Projector Command Source sources a named collection of DoIts which provide access to the operations of the projector.

FIG. 101 shows the relationships of the objects managed by the two components.

We are now in a position to discuss how the Generic Child Window component works. There is a mechanism (such as is discussed in Section 6.2 under Finding the Default Dialog Projector) which maps every flow object class to a subclass of Projector; this subclass of Projector is called the flow object class's default projector class. (The default projector class is not necessarily useful for all flow object classes in production applications; as a default it might conceivably just project the text name of some flow object classes.) If the Projector Instance sink of the Generic Projector Child Window component is unwired or its input is MO, an instance of the default projector class of the class of the flow object at the Projectee sink is created and used as the projector instance. It is this behavior of the Generic Projector Child Window component which is equated to the behavior of the Generic Child Window component.

The tool is a parameter which the projector uses in interpreting child-window events; the selection tool is the default. A special case of interest is drag-and-drop, in which case a mouse-up event inside the child window needs to be interpreted when the mouse-down which began the drag occurred outside the child window.

A case of particular interest, which has been used in an assembly tool, is addition of components to a wiring diagram by dragging icons from scrolling component-type-display child window to the wiring-diagram child window. We can envision the List Box component with a source connector which outputs a tool when there is a mouse-down in the list box. (The tool is obtained from the selected collection element. In general, if the mouse-down child window is driven by a projector, the tool can be in the projector's data structure, available at the data source connector of the Projector Engine component.) When the mouse-up is received by the Generic Projector Child Window component, the tool is available for interpretation of the event.

The preceding describes a single-shot use of the tool, but the single-shot host protocol discussed in Section 6.6 is not safe in this case, because the mouse-up might occur anywhere, possibly leaving the tool in the Generic Projector Child Window component for too long a time, with risk of misinterpretation of a subsequent mouse-up. In reality there are two cases to consider.

1. If the mouse-up is not an event (that is, if the child window receiving the mouse-down event follows the drag in a loop), the tool is not sent at mouse-down. Rather, if (and only if) mouse-up occurs outside the list box, the list box sources the tool, of which it is a host. The Generic Projector Child Window component acts immediately upon receipt of the tool by sensing the mouse position; if it is in the child window, the projector acts in response to a mouse-up. Afterward (regardless of the mouse position), the Generic Projector Child Window component sends to the tool a notify hosts message such as "Tool use complete", causing the list box to source MO (which causes a default to the selection tool).

2. If the user interface management system (UIMS) manages drag-and-drop, either the tool is communicated to the Generic Projector Child Window component as part of the mouse-up event (or other facility provided by the UIMS), or (if the hook is available) a special-purpose component can extract the tool from the UIMS facility and sent it to the tool sink before the event is sent to the child window.

Section 6.8 Example of Projection

In this example we describe informally the projection, using a Generic Projector Child Window component, of the E-form of the inside of an executable composite component type description <XCTD> such as appears in the example of Section 5.12. In other words, what appears in the child window is a wiring diagram.

What we are providing, therefore, is further elaboration of Section 5.13, "What the Wiring Workspace Does," based on the premise that the assembly tool itself can be built from components.

The inputs are as follows.

Tool: normally, none; the selection tool is implied. Other tool(s) may be used for addition of subcomponents to a wiring diagram; this is not discussed here.

Projector: an instance of the hypothesized Component-Projector class. The Generic Projector Child Window component causes the projector to build its data structure and refresh the display when the component sinks a projectee or when the component receives a dependent be notified oop message (except, of course, when that message is in the scope of a notify owner which the component has sent).

Projectee: an <XCTD> wrapped as a flow object.

We shall describe the function of an instance of ComponentProjector; this description is motivated by the list of projector functions given in Section 6.7.

Display data. The display data maintained by the projector includes the following items.

1. A display list for subcomponents, one subcomponent per list element. This is an array isomorphic to the component's subcomponent reference array <LSFA>. Each element is a data structure consisting of the graphic of the subcomponent type, the region of the subcomponent (including the origin), an array of sinks, and an array of sources. Each connector array element contains origin and region information for its connector. (For simplicity of computation, the component region is such that the region of every connector is inside its component region.)

2. A display list for wires, one wire per list element. This is an array isomorphic to the component's wire description array <LWDA>. Each element is a data structure consisting of two arrays: an array of line segments (the straight-line runs) and an array of points (the vertices).

3. A stacking-order list for components. This is a permutation set of the indexes of the subcomponent display list.

4. A stacking-order list for wires. This is a permutation set of the indexes of the wire display list.

5. An integer stating the number of components selected. If the value is s, the top s components are the ones selected. Zero is admissible. Selecting or deselecting a component changes its stacking order as well as causing this counter to be incremented or decremented.

6. An integer stating the number of wires selected. If the value is s, the top s wires are the ones selected. Zero is admissible. Selecting or deselecting a wire changes its stacking order as well as causing this counter to be incremented or decrements.

7. A vertex number, used when the user creates, moves, or deletes a vertex.

Display behaviors. The following types of entity are displayed by the projector.

1. Unselected component.
2. Selected component.
3. Unselected wire.
4. Selected wire.

Child-window events. The events which the projector can receive from the child window include the following.

1. Mouse button down (with and without shift).
2. Mouse move after button down (this might not be an event but may need to be tested, depending on the user-interface management system).
3. Mouse up (this, too, might not be an event).

Interpretation of events. Here are the definitions of the mouse actions used below.

1. Click: a mouse-down, mouse-up sequence with no intervening movement (or movement less than a small threshold). Operationally, this is a mouse-up which was preceded by a mouse-down such that, in the interval between the two, no mouse movement (or no movement outside of a small region containing the mouse-down point) has occurred.

2. Drag: a mouse-down, mouse-up sequence with intervening movement outside of the small region. Operationally, this is a sequence of mouse moves, preceded by a mouse-down and ending in a mouse-up, which have failed the definition of click. It is discovered on the mouse move which takes the mouse out of the small region containing the mouse-down point.

User behaviors. The projector decodes events to identify the following user behaviors.

1. Click outside a component or wire. This eliminates all selections.
2. Shift-click outside a component or wire. This has no effect on selection.
3. Click inside a component or connector. This deselects all selections and selects this one component.
4. Shift-click inside a component or connector. If component is selected, remove from selection list; otherwise, add to selection list.

5. Click on (or near) a wire or vertex. This deselects all selections and selects this one wire.
6. Shift-click on (or near) a wire or vertex. If wire is selected, remove from selection list; otherwise, add to selection list.
7. Drag beginning outside a component. Deselect all selections. At end of drag, defined rectangle is used to choose the new set of selected components and wires. (There can be differing definitions of whether a component or wire needs to be completely in the rectangle in order to be selected.)
8. Drag beginning inside a component but not inside a connector. If component is unselected, deselect all selections, select this component, then move this component by the amount dragged. If component is selected, drag all selected components.
9. Drag beginning inside a connector. Selections are unchanged. Create a line whose origin is in the connector and whose terminus stays at the mouse point while the mouse button is down. If mouse-up is in a connector (of another component), instantiate a zero-vertex wire if it would meet suitability criteria (such as (1) one source-one sink, (2) at most one wire ending at a sink, (3) perhaps some static flow-object type-checking). If mouse-up is not in a connector, there is no effect of the drag.
10. Drag beginning on (or near) a wire not at (or near) a vertex. Selections are unchanged. Create and drag a new vertex. If mouse-up is sufficiently far away from mouse-down, reconfigure wire with new vertex.
11. Drag beginning on (or near) a vertex. Selections are unchanged. If mouse-up position is on (or near) an adjacent vertex or adjacent wire end, reconfigure wire with vertex removed. Otherwise, if mouse-up position is sufficiently far away from mouse-down, reconfigure wire with vertex moved.

Messages to Projectee. The projectee responds to the following messages from the projector. Most of these messages are for the purpose of obtaining data from a type description.

1. Notify owner.
2. Obtain number of subcomponents.
3. Obtain number of sinks in subcomponent s.
4. Obtain number of sources in subcomponent s.
5. Obtain region of subcomponent s. (Region is displaced by origin of subcomponent in wiring diagram. Regions are used to detect whether mouse point is in region.)
6. Obtain region of sink c in subcomponent s. (Region is displaced by origin of connector and origin of subcomponent.)
7. Obtain region of source c in subcomponent s. (Region is displaced by origin of connector and origin of subcomponent.)
8. Obtain number of wires.
9. Obtain number of vertices in wire w.
10. Obtain region of straight run r in wire w.
11. Obtain region of vertex v in wire w.
12. Obtain graphic of subcomponent s. (Graphic is assumed to contain connector graphics.)
13. Obtain origin of subcomponent s.
14. Supply origin of subcomponent s. This message is usually followed by notify owner.
15. Obtain array of coordinates of vertices in wire w. (If there are V vertices, vertex 0 is source point, vertex V+1 is sink point.)
16. Supply array of coordinates of vertices in wire w. (Source and sink are implied, and each vertex may contain positioning heuristic information.) This message is usually followed by notify owner.
17. Delete. Arguments are two arrays, one of component numbers, one of wire numbers. This message is usually followed by notify owner.

Operations.
1. Clear. Delete the selected components and wires.
2. Cut.
3. Copy.
4. Paste.
5. Undo. Undo and redo can have various interpretations. They usually relate to actions which modify the type description: component, wire, and vertex creation, deletion, and movement; cut, copy, and paste.
6. Redo.

Part 7 Example of a Recursive Algorithm

Section 7.1 Program Description vs. Algorithm Description

Most languages derived from the computer-science tradition are algorithmic languages. They are, by construction, universal. Some recent languages, a portion of the invention included, have been designed primarily to simplify the development of real applications with display- out/event-in user interfaces. Because the universe of these applications is smaller than the universe of all algorithms, these recent application description languages can put ease of description above universality.

The present language looks like a dataflow language, but this paper has put no emphasis at all on computation, which is a natural domain for dataflow languages. This part derives a component which computes factorial recursively, not to show that the language really is a dataflow language, but to demonstrate that some of the concepts developed in the previous part are sufficient to account for recursion.

We shall use the following definition of factorial. First we define the conditional functional Cond, whose last three arguments are functions:

Cond( x, C, T, F )=if C(x) then T(x) else F(x).

In other words, Cond computes the Boolean C(x). If the Boolean is true, the result of Cond is T(x). If the Boolean is false, the result of Cond is F(x).

To define Factorial we first define the following three functions $C(x)=(x \leq 1)$.
One(x)=1
Fact1(x)=x*Factorial(x−1).
Then we define,
Factorial(x)=Cond(x, C, One, Fact1).

(The argument x is assumed to be an integer.) In other words, if x is less than or equal to 1, Factorial(x) has the value 1. If x is greater than one, Factorial(x) is computed as x*Factorial(x−1).

Section 7.2 A Conditional Component

Our derivation with components will parallel the above definition of Factorial. We first define the Cond component by the wiring diagram of FIG. 102.

The C, T, and F sinks of FIG. 102 accept component description flow objects produced by Component Description components (see Section 6.5). The In sink accepts the first argument of the Cond component (call it x), and the Out source sources the result. The computation is started by picking the DoIt sourced by the Start source. When the computation is complete and the result is in place, the DoIt at the Finish sink is picked.

There are three Component Invocation components (see Section 6.5) which, from top to bottom, invoke the C, T, and F functions. (The invocation components should have collector components at their inputs and splitter components at their outputs; these have been omitted for exposition.)

The process starts when the DoIt at the Start source is picked. Because of the clear-before-send rule and/or the MO design convention (see Sections 2.2 and 2.3), all inputs have arrived at their sinks. The Start pick invokes the function C(x), whose result is a Boolean, which finds its way to the center sink of the Boolean Selector component (see Section 4.5). Then the DoIt sourced by the Boolean Selector component is picked, and, depending on whether the result of C(x) is true or false, the DoIt at the first or third sink is picked. This, in turn, invokes the function T(x) or F(x), respectively. After the output of T(x) or F(x) makes its way to the Out source by way of the Pass-through component (see Section 4.5), theDoIt at the Finish sink is picked, at the third sink of the Component Invocation component which invokes either T or F, respectively.

Section 7.3 Computational Components

We introduce a set of components which will perform the computational part of Factorial. The component shown in FIG. 103 sources the constant 1, the component shown in FIG. 104 source the results of computing the arithmetic expression x−1 (where x is its input), the component shown in FIG. 105 sources the Boolean expression $x \leq 1$, and the component shown in FIG. 106 sources the result of computing the expression x*y (where x is the first and y is the second input value).

Now the intermediate components C, T, and F are defined by the wiring diagrams in FIGS. 107, 108, and 109, respectively.

The only thing new here is the Data Change Detector component in FIG. 109. This picks the DoIt at its second sink after it has passed any new value through its top sink-source pair, thus computing and sourcing Factorial(x−1). In this application the Data Change detector permits building asynchronous (unclocked) components from synchronous parts.

Finally, the definition of Factorial is defined by the wiring diagram in FIG. 110.

Section 7.4 Bootstrapping Recursive Definitions

The Factorial component must be bootstrapped into existence in several stages. This is because, when the definition of Factorial is first wired, it will contain a reference to an undefined component, namely Factorial, indirectly through the F component. This bootstrapping is done as follows.

1. Define F as a one-input, one-output component with nothing in it but connector components.
2. Define C and T.
3. Define Factorial.
4. Now redefine F correctly, with its reference to Factorial.

Part 8 A Component Type Market Model

Section 8.1 Component Type Interchange

One of the premises of the present component-based program model is that the person who wires a component into a wiring diagram is not necessarily, indeed is probably not, the person who built the component.[10] Implicit in this premise is the distinction between producers and consumers of components. Furthermore, people who build composite components, who are potentially producers of these composite components, are also consumers of the subcomponents they employ, which subcomponents can themselves be both primitive and composite components. Finally, we define a component market as a channel through which components are passed from producers to consumers. (Note that applications are special cases of composite components, and that application users are component consumers.)

[10] We are really talking about component types, but where it is convenient and clear in this chapter we shall use the abbreviation component to mean component type.

The ideas just presented are summed up in FIG. 111, which describes a model by which components flow from producers to consumers through markets.

The Application Program Market is distinguished from the general Component Market because application programs, as we mean the term here, can run free-standing without the presence of an assembly tool. This distinction is made explicit by the absence of an arrow from Tool Producers to End Users.

FIG. 111 suggests the following conclusions.

1. A standard interchange form for component type descriptions is desirable.
2. The assembly tool, as the enabler of this entire interchange arrangement, must have the following input/outputs.
   a. Import of component type descriptions in interchange form into its component library.
   b. Export of component type descriptions from its library to interchange form
   c. Output of packaged programs in executable form.

Section 8.2 Assembly Tool Structure

We conclude that a high-level block diagram of the assembly tool can look like FIG. 112.

Referring to FIG. 112, we identify the major functional parts of the assembly tool as follows.

Component library accepts, stores, and makes available L-form component type descriptions.

Wiring workspace creates new wiring diagrams, edits wiring diagrams (including the addition of new components from the library), and encapsulates wiring diagrams into the library.

Application packager converts L-form type descriptions of composite components into a form which is executable independent of an assembly tool, and makes that form available outside the assembly tool.

Component type importer accepts from outside the assembly tool a component type description in interchange form, converts it to L-form, and gives it to the library. (This might involve resolving version, timestamp, and naming conflicts with type descriptions already in the library.)

Component type exporter converts an L-form component type description to interchange form and makes it available outside the assembly tool. (This might involve renaming the component type and the types of some subcomponents.)

Section 8.3 The Structure of Restriction

The existence of a component market does not necessarily mean that components in the market carry prices. In order, however, not to constrain the setting of prices for components, we must provide for restrictions on the usage of components. One generally accepted way to restrict the usage of components is through licensing, by means of which the supplier explicitly grants to certain consumers certain use of a component (and, by implication, implicitly denies to others that use of the component).

The use of the component type means access to its information. Any restriction on such use must have a structure to it. If there were not such a structure, it would not be possible to provide certain kinds of partial use, such as (1) wire but don't open, (2) run but don't wire, and (3) examine help but don't use.

In defining a structure of restriction of a specific component type, we take the following steps.

1. Identify all views of a component type which are potentially to be communicated to any consumer.
2. Group these views into classes, called aspects, such that, for all views in the same aspect, the restriction is the same. Specifically, for a particular component type, producer P, consumer C, and aspect A:
   a. Either P grants C access to A, or P does not grant C access to A.
   b. If P grants C access to aspect A of a component type, then P grants C access to all views in A; if P does not grant C access to A, then P grants C access to no views in A.
3. Define a way to implement access which is effective for both producers and consumers.

An advertisement is an aspect of a component type, access to which is usually granted to anybody willing to view it. The views of the advertisement might be printed circulars or entries in a digital component catalog available from an online service. On the other hand, the coding which defines the inside of a primitive type or the wiring diagram which defines the inside of a composite type is an aspect of the type to which access might be denied except to specific consumers. The views of these component insides are probably in digital form for direct use by programming tools.

Part 9 How The Use of Components Is Restricted

Section 9.1 Licensing of Component-type Aspects

The table in FIG. 113 presents nine aspects of every component type. The first two aspects are conventional and not specific to the present program model. The last seven aspects are specific to the present program model.

Each of these last seven aspects is described in terms of the restriction mechanism used to control access to the aspect. Each of these seven restriction mechanisms is called a license.

A license is present/absent in a component type description means that a representation of the license is encoded/not encoded in the <permissions> part of the component type description. Access to an aspect of a component type is granted if and only if the license associated with that aspect is present in the component type description. Component consumer C is licensed for aspect A of component type T means that C rightfully possesses a description of T in which the license for A is present. Here are the seven licenses.[11]

[11] In these descriptions "user" means "user of the assembly tool."

HL Help License. Permits the user to access the help facilities associated with the component type and with each outside connector of the component type. Help facilities may be accessed when the component type description is either in the library or in the wiring workspace. (We do not discuss the user interface of the library.)

RL Running License. The basic execution license. Permits the assembly tool to create, from the component library, any number of components of the licensed type as subcomponents of a named composite component, and to run these subcomponents in the assembly tool. Does not, in itself, permit the user directly to add the component from the library to the wiring workspace or to attach new wires to the component's connectors. Required for encapsulation of a wiring diagram containing this component.

WL Wiring License. In addition to the rights of RL, permits the user to copy, from the component library, any number of references to the licensed type into the assembly tool's wiring workspace and to attach wires to the references' connectors.

OL Opening License. Analogous to disclosure of source code. Permits the user to view (but not modify) the definition of the inside of the component. For a primitive component, this means viewing the source code. For a composite component, this means opening a projection window on the defining wiring diagram.

PL Packaging License. The basic application developer's license. Permits the user to run the packager on a composite component type description containing this component as a subcomponent (at any level). That is, permits the packaging of a freestanding program which, when invoked, instantiates or has the capacity to instantiate this component type.

EL Export License. The basic component producer's license. Permits the user to run the exporter on a composite component type description containing this component as a subcomponent (at any level).

DL Derivation License. In addition to the rights of OL, permits the user to modify the inside of this composite component and to encapsulate the resulting wiring diagram. The assembly tool permits encapsulation 1. of an anonymous wiring diagram created from an empty workspace, when each component contains RL, or
2. of a wiring diagram which is obtained by modifying the inside of a composite component containing DL, when each component contains RL.

Encapsulation creates type descriptions in the library containing DL, so that the user can modify his own creations. (This DL is normally removed on export; see Section 9.2.)

Note that each license is specifically associated with one or more operations of the assembly tool with respect to the component type. By definition, the assembly tool disables each of these operations with respect to the type unless the license associated with the operation is present in the type description. Here is one way to implement license enforcement. Each of the license-enabled operations is performed by a specific user-interface event, such as the picking of a menu command. A menu command, if picked, will be applied to all selected components in the wiring workspace. The menu command is enabled if and only if the license is present in the type description of every selected component. (In the case of events which are not menu commands, such as creation of a wire by dragging, the response to the event is enabled if and only if the license is present.)

FIG. 114 shows the relationships described so far. A specific type description (TD in a circle) travels from its producer to the component library inside the assembly tool of a consumer, via the importer. From the library it can migrate to the wiring workspace, and back to the library and on to the packager or the exporter as a subcomponent of a composite component created by the consumer. (The arrow from TD to TD' represents the creation of the new type TD' by encapsulation of a wiring diagram containing TD.) For each facility of the assembly tool, the dotted lines show what licenses control operations related to this facility.

Section 9.2 Forwarding of Licenses

Assume, as represented in FIG. 115, that component producer P1 creates a composite component type T1 containing component types T2 and T3, for both of which he has export licenses from the producers, P2 and P3. Now assume that P1 exports and licenses T1 to consumer C4. What licenses does C4 have for T2 and T3? (In the figure the licenses for each type are shown below the circle representing the type.) From the statement of the problem, P1 has EL and WL for T2 and T3. In addition to EL and WL, assume that P1 has obtained OL for T2 and PL for T3.

Does C4 obtain WL, OL, and EL for T2 and WL, PL, and EL for T3? We take the position that any licenses (except for RL) which C4 obtains for T2 and T3 must be the result of a direct transaction between C4 and P2 (in the case of T2), and between C4 and P3 (in the case of T3). The exception to this rule is RL: the grant of EL by P2 to P1 implies the right to forward RL on T2.

The rule for subcomponents of an exported composite component: When the exporter is creating a component type in interchange form, it removes WL, OL, PL, EL, and DL from all subcomponents. RL, which is present in all subcomponents, remains, and HL remains when it is present. (If OL is denied for the top-level component, there could be an optimization which removes HL and the help objects themselves from all subcomponents.)

The rule for the exported composite component itself: The user specifies to the exporter whether HL, OL, PL, EL, and/or DL are to be included with the exported component. (WL and RL might also be excluded, in the case of a component built to be licensed in the field by means of an on-line or telephone transaction.)

Note that when C4 receives T2, for example, there might be a conflict with a pre-existing T2 in C4's library. There are three cases.

1. T2 was not in C4's library. T2 is added to C4's library with RL and, if present, HL.
2. T2 was in C4's library, with the same licenses as the one received from P1. If component type descriptions have revision dates and/or version numbers and there is a conflict between the library copy and the imported copy, C4 should be presented with the choice of leaving or replacing the existing version of T2.
3. T2 was in C4's library, with different licenses. C4 should be presented with the choice of leaving or replacing the existing version of T2.

What is claimed is:

1. A method of processing data comprising
providing a flow object,
providing a network of interconnected processing components none of which is a flow object and at least one of which is not a user-interface component,
associating the flow object with data that has been or is to be processed,
enabling a flow within the network which transports from one processing component to another a reference which provides access to the flow object,
enabling processing components to use the reference to obtain access to the flow object for the purpose of processing the flow object or the data associated with the flow object, and
maintaining consistency across the network, as the flow object or the data associated with it are processed, of the components' views of the flow object and its data, by a sequence of communications which comprises
a communication from a sending processing component to the flow object, and
a communication from the flow object to a receiving processing component.

2. The method of claim 1 wherein
an interconnection touches a pair of processing components associated with the interconnection, and
a reference which provides access to the flow object is transported across the interconnection.

3. The method of claim 2 wherein references which provide access to the same flow object are transported across different interconnections.

4. The method of claim 2 wherein the reference which provides access to the flow object is transported in only one direction across the interconnection, from a sending component associated with the interconnection, which component sends the flow, to a receiving component associated with the interconnection, which component receives the flow.

5. The method of claim 4 wherein the sending processing component is the processing component associated with the flow object's owner.

6. The method of claim 4 comprising a selector processing component, wherein
the selector processing component is a receiving component of a reference which provides access to an input flow object whose associated data comprises a base collection, and
the selector processing component is a sending component of a reference which provides access to a list flow object whose associated data comprises a selected collection instance based on the base collection.

7. The method of claim 6 in which the selector processing component is a sending component of a reference which provides access to an output flow object, wherein
the associated data of the output flow object provides access to the subcollection of the base collection specified by the selected collection instance associated with the list flow object, and
a modification to the selected collection instance causes the value of the associated data of the output flow object to update to provide access to the subcollection specified by the modified selected collection instance.

8. The method of claim 7 wherein
the output flow object has an owner, and
the selector processing component is associated with the owner of the output flow object.

9. The method of claim 6 wherein
the list flow object has an owner, and
the selector processing component is associated with the owner of the list flow object.

10. The method of claim 4 comprising a launcher processing component, wherein
the launcher processing component is configured to be a receiving component of a reference which provides access to an argument flow object,
the launcher processing component is configured to be a receiving component of a reference which provides access to a flow object whose associated data denotes an instantiable processing component type,
an instance of the instantiable processing component type is configured to be a receiving component of a reference which provides access to a flow object, and
the launcher processing component is configured to perform an instantiation processing operation, wherein
the instantiation processing operation causes to be created an instance of the instantiable processing component type, and
if the launcher processing component is a receiving component of a reference which provides access to an argument flow object, then the created instance is a receiving component of a reference which provides access to said argument flow object.

11. The method of claim 4 wherein, when the receiving component receives a reference which provides access to the flow object, then the receiving component is enabled to process the flow object or its associated data.

12. The method of claim 4 wherein,
when a processing component of the network which is configured to be both a receiving component and a sending component receives a flow of a reference which provides access to the flow object,
then the processing component is enabled to send a flow of a reference which provides access to the flow object.

13. The method of claim 4 wherein
a processing component A of the network is a sending component with respect to the flow object and with respect to interconnection I, and
a processing component B of the network is a receiving component with respect to the flow object and with respect to interconnection J, wherein
interconnection I is different from interconnection J.

14. The method of claim 4 comprising a composite processing component which comprises an internal network of interconnected processing components, wherein
if the composite processing component receives a flow which transports a reference A which provides access to flow object F, then there exists a processing component of the integral network which receives a flow which transports a reference B which provides access to flow object F, and
if the composite processing component sends a flow which transports a reference C which provides access to flow object G, then there exists a processing component of the internal network which sends a flow which transports a reference D which provides access to flow object G.

15. The method of claim 4 comprising
a processing component configured to be a sending component with respect to an interconnection, and
a processing operation of the processing component, a result of which processing operation is a result object, wherein
upon completion of the processing operation, the processing component is enabled to initiate a flow of a reference which provides access to a flow object whose associated data comprises the result object.

16. The method of claim 1 wherein processing comprises modification of an aspect of the flow object or of the data associated with the flow object.

17. The method of claim 1 wherein a reference which provides access to the flow object is used by one of the processing components to communicate to the flow object.

18. The method of claim 1 wherein a reference which provides access to one of the processing components is used by the flow object to communicate to the processing component.

19. The method of claim 1 wherein
the flow object has an owner and comprises a reference which provides access to the owner, and
the owner is associated with one of the processing components.

20. The method of claim 19 wherein the owner comprises the owner's associated processing component and an interconnection which touches that processing component.

21. The method of claim 19 wherein one of the processing components which is processing the flow object or the data associated with the flow object maintains consistency between itself and the processing component associated with the owner of the flow object.

22. The method of claim 19 wherein the processing component associated with the owner maintains consistency between itself and the processing component associated with a dependent of the flow object.

23. The method of claim 22 wherein the processing component associated with the dependent is configured to ignore an aspect of a received communication.

24. The method of claim 19 wherein the owner comprises a processing component of the network.

25. The method of claim 19 wherein the owner is associated with exactly one processing component of the network.

26. The method of claim 19 wherein the owner is configured to interact with its associated processing component.

27. The method of claim 1 wherein the flow object has one or more dependents and comprises one or more references which provide access to the one or more dependents, wherein
each of the dependents is associated with one of the processing components.

28. The method of claim 27 wherein a dependent comprises the dependent's associated processing component and an interconnection which touches that processing component.

29. The method of claim 27 wherein the flow object communicates to the processing component respectively associated with each of its dependents.

30. The method of claim 27 wherein a dependent comprises a component of the network.

31. The method of claim 1 wherein a flow comprises copying a reference which provides access to the flow object.

32. The method of claim 1 wherein at least one of the communications comprises giving notice that processing has occurred.

33. The method of claim 1 wherein processing comprises projecting an aspect of the flow object or data associated with the flow object onto a user interface.

34. The method of claim 33 wherein for every displayed element of the user interface there exists a flow object wherein the displayed element is a projection of an aspect of the flow object or of data associated with the flow object.

35. The method of claim 1 wherein one of the processing components is configured to receive an event.

36. The method of claim 35 wherein the event comprises a signal originated by a device.

37. The method of claim 1 wherein the components of the network are arranged hierarchically.

38. The method of claim 1 wherein the data associated with the flow object comprises an object.

39. The method of claim 38 wherein the object comprises a process.

40. The method of claim 1 wherein the data associated with the flow object comprises a flow object.

41. The method of claim 1 wherein the data associated with the flow object comprises a collection of flow objects.

42. The method of claim 1 wherein the association between the flow object and its associated data comprises the flow object comprising a reference which provides access to the associated data.

43. The method of claim 1 wherein more than one flow object is associated with the same data.

44. The method of claim 33 wherein the associated data of the created flow object is created other than by the processing component which creates the flow subject.

45. The method of claim 1 wherein the data associated with a first flow object has a nonempty intersection with the data associated with a second flow object.

46. The method of claim 1 wherein at least some of the processing components of the network are organized in types, instances of which comprise these processing components.

47. The method of claim 1 wherein at least some of the processed data are organized in types, instances of which comprise these processed data.

48. The method of claim 47 wherein one of the data instances denotes a processing component type.

49. The method of claim 48 wherein one of the processing components of the network creates an instance of the denoted processing component type.

50. The method of claim 49 wherein the processing component initiates the execution of the created component instance.

51. The method of claim 47 comprising a selected collection processed data type, an instance of which comprises
   a reference which provides access to a base collection on which the selected collection instance is based, and
   a selection on the base collection, which selection comprises a specification of a possibly empty subcollection of the base collection.

52. The method of claim 51 comprising a flow object associated with an instance of the selected collection processed data type, wherein
   there is an editor processing component of the network which is configured to modify the selection in the flow object's associated selected collection instance, and
   there is a projector processing component of the network which is configured to project onto a user interface an aspect of the selected collection instance.

53. The method of claim 52 wherein a modification to the selected collection instance causes the projector processing component to respond by updating its projection to be consistent with the resulting value of the selected collection instance.

54. The method of claim 1 comprising a flow object whose response to processing is consistent with the response to said processing of a null object.

55. The method of claim 1 wherein one of the processing components is configured to create a flow object.

56. The method of claim 43 wherein the processed data comprises the settable processing component's setting value.

57. The method of claim 56 wherein
   there is a flow object whose associated processed data comprises an aspect of the settable processing component's setting value, and
   there is an operating processing component of the network configured to process said flow object or associated processed data.

58. The method of claim 57 wherein
   the flow object has an owner associated with an owning processing component of the network, a dependent associated with a user processing component of the network, and a dependent associated with the operating processing component, and
   the owning processing component, the operating processing component, and the user processing component participate in a consistency-maintaining sequence of coordinations.

59. The method of claim 58 wherein the owning processing component is the settable processing component.

60. The method of claim 55 wherein a creator processing component which creates the flow object is configured to send a flow of a reference which provides access to the flow object.

61. The method of claim 60 wherein the created flow object has an owner and the owner is configured to enable performance of a processing operation by a user processing component of the network which comprises a reference which provides access to the flow object.

62. The method of claim 61 wherein the owner is associated with the creator processing component.

63. The method of claim 1 wherein the flow object yields an identifier which is distinctive of the flow object.

64. The method of claim 63 wherein the distinctive identifier may be data or an object.

65. The method of claim 63 wherein one of the processing components uses the identifier in processing.

66. The method of claim 65 wherein processing comprises projection of an aspect of the identifier onto a user interface.

67. The method of claim 65 wherein processing comprises a table lookup.

68. The method of claim 1 wherein the flow object comprises a reference which provides access to a processing component of the network.

69. The method of claim 1 wherein the processing components of the network include a settable processing component which comprises a setting value.

70. The method of claim 69 wherein the setting value becomes persistent when the network is encapsulated.

71. The method of claim 70 wherein the setting value may be changed either before or after encapsulation.

72. The method of claim 1 wherein at least some of the flow objects are organized in types, instances of which comprise these flow objects.

73. The method of claim 1 wherein there is a proxy object which is in relationship to the flow object.

74. The method of claim 73 wherein a processing component of the network communicates to the flow object by communicating to the proxy object which forwards the communication to the flow object and returns the result to the processing component.

75. The method of claim 73 wherein the flow object communicates to the processing component by communicating to the proxy object, which forwards the communication to the processing component and returns the result to the flow object.

76. The method of claim 75 wherein the flow object has an owner and communicates to the processing component associated with the owner via the proxy object.

77. The method of claim 75 wherein the flow object has a dependent and communicates to the processing component associated with the dependent via the proxy object.

78. The method of claim 73 wherein
   at least one communication is sent via a proxy object.

79. The method of claim 1 wherein
   there is an editor processing component of the network which is configured to modify aspect A of the flow object or the flow object's associated processed data, and
   there is a user processing component of the network which is configured to employ aspect B in processing of the flow object or of the flow object's associated processed data.

80. The method of claim 79 wherein there occurs a consistency-maintaining sequence of coordinations comprising
   coordination between the editor processing component and a relay processing component of the network, wherein the editor processing component notifies the relay processing component, by a sequence of communications, that modification has occurred, and coordination between the relay processing component and the user processing component wherein the relay processing component notifies the user processing component, by a sequence of communications, that modification has occurred.

81. The method of claim 80 wherein the user processing component is configured so that, in response to notice that modification has occurred, the user processing component employs in its processing the modified flow object or its associated modified data.

82. The method of claim 1 comprising a command flow object which has an owner associated with an actuator processing component of the network, configured to perform a designated processing operation, and a dependent associated with an initiator processing component of the network, configured to receive a signal, wherein when the initiator processing component receives the signal it notifies the actuator processing component, by a sequence of communications, that the signal has been received, and the actuator processing component performs the designated processing operation.

83. The method of claim 82 wherein the signal arises in consequence of a processing operation.

84. The method of claim 82 comprising a projector processing component which projects an aspect of the command flow object or its associated data on a user interface, wherein the occurrence of an event at the user interface causes the initiator processing component to receive a signal.

85. The method of claim 84 wherein the projector processing component is the initiator processing component.

86. A tool for developing a software program, the tool comprising a program under development and a possibly null flow object, the program under development comprising a network comprising components and interconnections, the tool being configured to restructure the network, an interconnection denoting a flow object and being attached to two components, one of the attachments being asource and the other being a sink, the source being associated with a source function, an output from the source function determining the flow object denoted by the interconnection, an input to the source function comprising a flow object denoted by a sink of the source's component, and a nonnull flow object comprising a processed object, wherein a component is configured to send a processing message to the processed object, a component is configured to communicate to the nonnull flow object denoted by an interconnection attached to the component, and a component is configured to enable the nonnull flow object denoted by an interconnection attached to the component to communicate to the component.

87. The tool of claim 86 comprising a program control mechanism configured to stop and start the program under development, wherein when the program under development is stopped, the interconnection denotes a null flow object.

88. The tool of claim 86 wherein a network computation comprises a source function, the network computation being configured so that execution of the network computation is begun when the program under development is started, wherein if the network computation terminates without error and then the network is restructured then the network computation is reconfigured based on the resultant network structure, and execution of the resultant network computation is begun if the program is not stopped.

89. The tool of claim 88 wherein the network computation is iterative.

90. The tool of claim 88 wherein all functions of the network computation are performed, one function at a time.

91. The tool of claim 90 wherein, if the value of a function is dependent on the value of at most one input, then the function is evaluated whenever that input value changes.

92. The tool of claim 90 wherein, if the value of a function is dependent on the value of more than one input there is a pending status associated with the function, wherein the pending status of the function is set to pending if the value of an input on which the value of the function is dependent changes when the pending status of the function is not pending, the pending status of the function is set to not pending when the program under development is stopped, and the pending status of the function is set to not pending when the function's evaluation is complete.

93. The tool of claim 92 wherein the network computation does not terminate until the pending status of every function of the network computation is not pending.

94. The tool of claim 93 comprising a network computation control mechanism which seeks to minimize the total number of function evaluations.

95. The tool of claim 92 wherein a designator of the function is placed at the rear of a first-in first-out queue when the pending status of the function is set to pending, and the function designator is removed when it reaches the front of the queue, after which removal the function is evaluated.

96. The tool of claim 95 wherein the network computation has terminated when the queue is empty after completion of evaluation of the function.

97. The tool of claim 95 comprising loop detection to determine nontermination of the computation.

98. The tool of claim 88 comprising a network computation control mechanism which seeks to minimize the total network computation time.

99. The tool of claim 88 wherein the network computation also comprises a state function.

100. The tool of claim 88 wherein the network computation comprises all source functions and all state functions of the network.

101. The tool of claim 88 wherein a function of the network computation is configured to query a database.

102. The tool of claim 86 comprising a connector, wherein the connector is attached to a component, the connector comprises either a sink connector or a source connector, wherein either the source connector comprises a source, in which case the source connector is attached to the source's interconnection, the source connector denotes the flow object denoted by the interconnection, and the source connector comprises the source's source function, or else the source connector is not attached to an interconnection, and either the sink connector comprises a sink, in which case the sink connector is attached to the sink's interconnection and the sink connector denotes the flow object denoted by the interconnection, or else the sink connector is not attached to an interconnection.

103. The tool of claim 86 wherein the program under development comprises a user interface.

104. The tool of claim 86 comprising a composite component type which comprises a network of component templates and interconnection templates, wherein each interconnection template has two attached component templates, said composite component type being configured to create an instance which is a composite component comprising a network of components and interconnections, wherein a component template creates a component an interconnection template creates an interconnection, and the components attached to the interconnection are created by the component templates attached to the interconnection template which creates the interconnection.

105. The tool of claim 104 wherein a component template comprises either a composite component template or a primitive component template.

106. The tool of claim 105 wherein a composite component template comprises a composite component type, and a primitive component template comprises a primitive component type.

107. The tool of claim 106 wherein a component type comprises either a composite component type or a primitive component type.

108. The tool of claim 107 comprising a restriction mechanism wherein the component type comprises a restriction.

109. The tool of claim 108 wherein an instance of the type comprises the restriction.

110. The tool of claim 104 wherein the instance is attached to an outside sink connector.

111. The tool of claim 110 wherein the network of the instance comprises a component attached to an inside sink connector, wherein the inside sink connector and the outside sink connector denote the same flow object.

112. The tool of claim 104 wherein the instance is attached to an outside source connector.

113. The tool of claim 112 wherein the network of the instance comprises a component attached to an inside source connector, wherein the inside source connector and the outside source connector denote the same flow object.

114. The tool of claim 86 in which the program under development comprises an instance of a composite component type.

115. The tool of claim 86 configured to create an instance of a component type.

116. The tool of claim 86 whose program under development comprises at least one component with a source connector which, upon commencement of the program, denotes a nonnull flow object.

117. The tool of claim 86 wherein every component of the program under development is created by a component template.

118. The tool of claim 117 wherein a component's template's type determines the number of sink and source connectors and the identity of each sink and source connector of the component.

119. The tool of claim 118 wherein the type of the component determines the source function of each source connector of the component.

120. The tool of claim 119 wherein the source function's input comprises either or both of a flow object denoted by a sink of the source's component or a state variable of the component.

121. The tool of claim 86 wherein the program under development comprises a component which comprises a state variable.

122. The tool of claim 121 wherein the identity and initial value of the state variable are determined by the component's type.

123. The tool of claim 122 wherein the state variable is set to its initial value when the program is stopped.

124. The tool of claim 122 wherein the state variable is associated with a state function, determined by the components type, the output from the state function determining the state variable's value and the input to the state function comprising either or both of a flow object denoted by a sink of the source's component or a state variable of the component.

125. The tool of claim 121 wherein the state variable provides access to a storage system external to the component.

126. The tool of claim 86 wherein the state variable provides access to the result of a database query.

127. The tool of claim 121 wherein the component projects an aspect of the state variable onto the user interface of the program under development.

128. The tool of claim 86 in which the program under development comprises a component which comprises a setting variable.

129. The tool of claim 128 wherein the component's type determines the identity of the setting variable.

130. The tool of claim 128 wherein the initial value of the setting variable is determined by the template from which the component is created.

131. The tool of claim 130 wherein the setting variable is set to its initial value when the program is stopped.

132. The tool of claim 128 wherein a source function's input comprises a flow object denoted by a sink of the source's component or the value of a state variable of the component or the value of the setting variable, and a state function's input comprises a flow object denoted by a sink of the source's component or the value of a state variable of the component or the value of the setting variable.

133. The tool of claim 86 wherein the processed object comprises a state variable.

134. The tool of claim 86 wherein the processed object comprises a setting variable.

135. The tool of claim 86 wherein a component is configured to receive an event.

136. The tool of claim 135 wherein the event is sent by the tool.

137. The tool of claim 135 wherein the event is sent by the user interface of the program under development.

138. The tool of claim 135 wherein the component comprises a state variable whose value is modified by the component's receipt of the event.

139. The tool of claim 86 wherein the program under development comprises a communication mechanism in which an aspect of one component is configured to communicate with an aspect of another component.

140. The tool of claim 86 wherein a function of the network computation is configured to modify an aspect of the processed object.

141. The tool of claim 86 comprising a developer interface.

142. The tool of claim 142 wherein the developer interface comprises the user interface of the program under development.

143. The tool of claim 142 comprising a selection mechanism configured to choose a portion of the network on which an operation is to be performed.

144. The tool of claim 143 wherein the restriction mechanism interacts with the menu mechanism to modify either the availability of an opportunity to perform an operation on the portion of the network or the behavior of the operation.

145. The tool of claim 142 comprising a menu mechanism configured to present an opportunity to perform an operation.

146. The tool of claim 86 comprising a data inspection mechanism wherein an aspect of any of a state variable, a setting variable, or a flow object is projected onto the developer interface.

147. The tool of claim 86 comprising a program inspection mechanism wherein an aspect of the network is projected onto the developer interface.

148. The tool of claim 86 comprising a stepping mechanism configured to control and inspect the progress of the network computation.

149. The tool of claim 148 wherein the stepping mechanism cooperates with the program inspection mechanism to project on the developer interface information which visually depicts the state changes of the program under development.

150. The tool of claim 86 comprising a type library comprising a component type.

151. The tool of claim 86 wherein an input of a function of the network computation comprise an aspect of the processed object.

* * * * *